(12) United States Patent
Kuhns

(10) Patent No.: US 9,957,975 B2
(45) Date of Patent: May 1, 2018

(54) ANGULAR VELOCITY STEPPING AND METHODS OF USE IN TURBOMACHINERY

(71) Applicant: Corey B. Kuhns, New London, CT (US)

(72) Inventor: Corey B. Kuhns, New London, CT (US)

(*) Notice: Subject to any disclaimer, the term of this patent is extended or adjusted under 35 U.S.C. 154(b) by 484 days.

(21) Appl. No.: 14/991,487

(22) Filed: Jan. 8, 2016

(65) Prior Publication Data

US 2016/0348684 A1 Dec. 1, 2016

Related U.S. Application Data

(60) Provisional application No. 62/169,016, filed on Jun. 1, 2015, provisional application No. 62/183,816, filed on Jun. 24, 2015.

(51) Int. Cl.
| | |
|---|---|
| *F04D 25/04* | (2006.01) |
| *F04D 29/44* | (2006.01) |
| *F04D 17/12* | (2006.01) |
| *F01D 1/06* | (2006.01) |
| *F01D 17/16* | (2006.01) |

(52) U.S. Cl.
CPC ............. *F04D 29/441* (2013.01); *F01D 1/06* (2013.01); *F01D 17/165* (2013.01); *F04D 17/122* (2013.01); *Y02T 50/672* (2013.01)

(58) Field of Classification Search
CPC ...... F04D 17/12; F04D 17/122; F04D 19/022; F04D 25/045
See application file for complete search history.

(56) References Cited

U.S. PATENT DOCUMENTS

| | | | | |
|---|---|---|---|---|
| 3,071,313 | A * | 1/1963 | Weisel | F04D 29/441 415/204 |
| 3,093,084 | A * | 6/1963 | Derderian | F04D 13/043 415/175 |
| 3,232,043 | A * | 2/1966 | Birmann | F02B 37/24 417/406 |
| 4,009,972 | A * | 3/1977 | Sarle | F01D 25/186 184/6.11 |
| 5,454,646 | A * | 10/1995 | Reisdorf | F01D 25/164 384/901 |
| 6,062,028 | A * | 5/2000 | Arnold | F02C 6/12 417/407 |
| 2017/0022887 | A1* | 1/2017 | Oakes | F02B 37/004 |

* cited by examiner

*Primary Examiner* — Patrick Hamo
(74) *Attorney, Agent, or Firm* — Merek, Blackmon & Voorhees, LLC

(57) ABSTRACT

Provided is an improved architecture for rotary kinetic fluid motors and pumps, in which working fluid gains or loses pressure by flowing through an alternating sequence of radial-flow impellers and radial-flow fluid vortices, the impellers and fluid vortices all rotating around a single axis and in a common direction at staggered speeds, each vortex being the product of rotating fluid that is flowing radially through a bladeless annular volume.

22 Claims, 39 Drawing Sheets

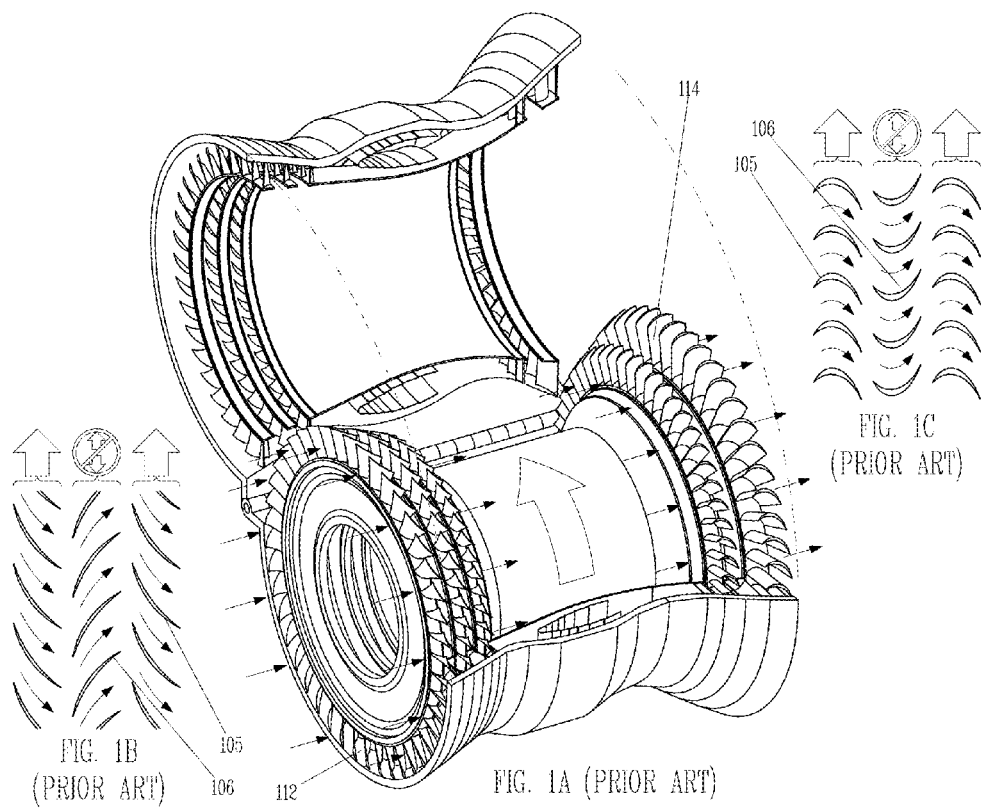
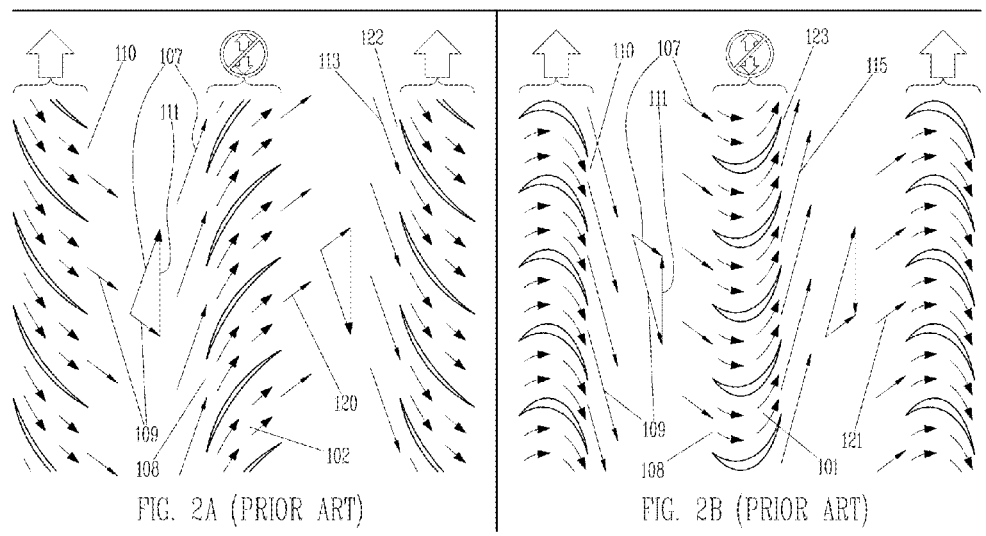

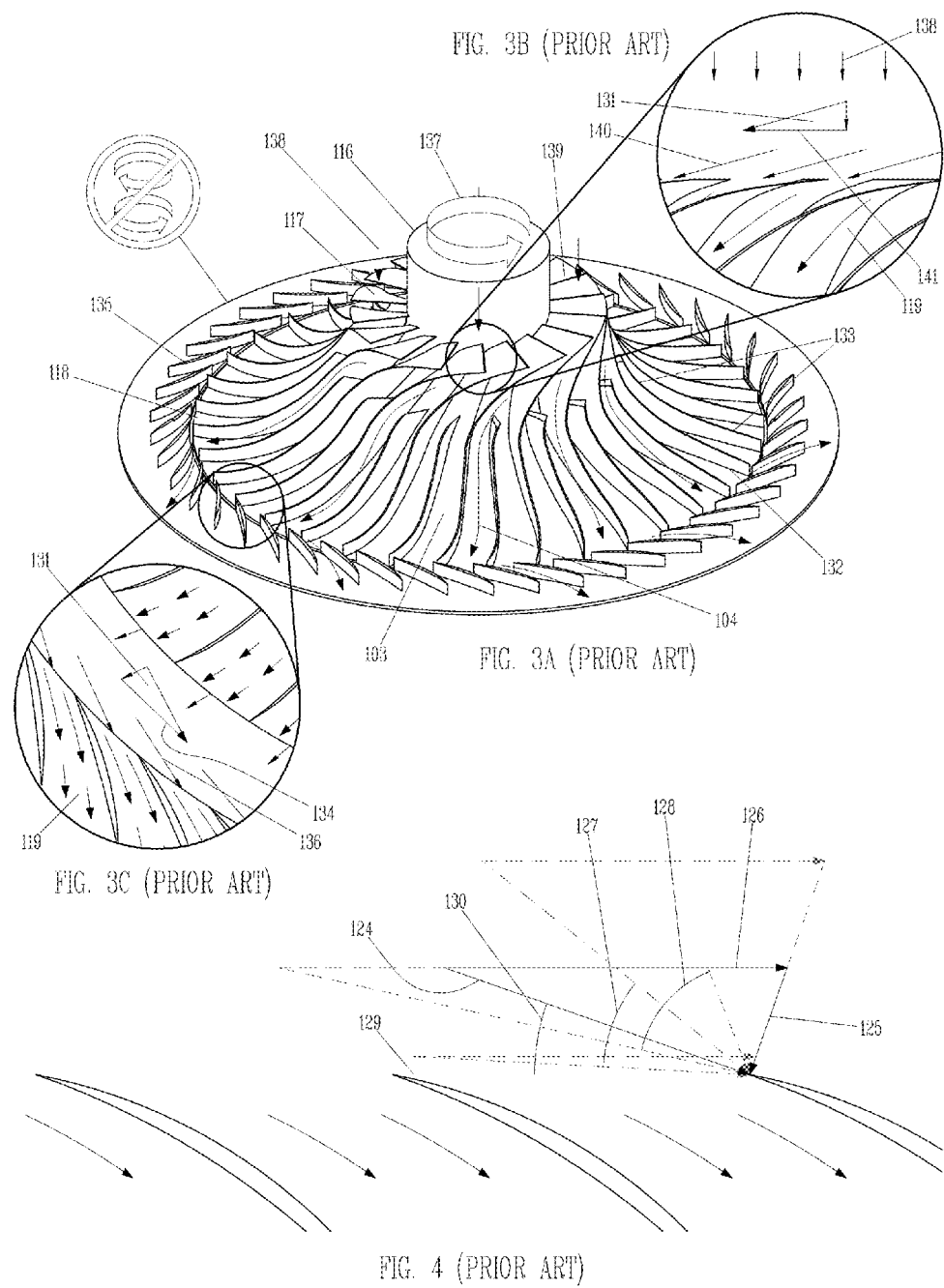

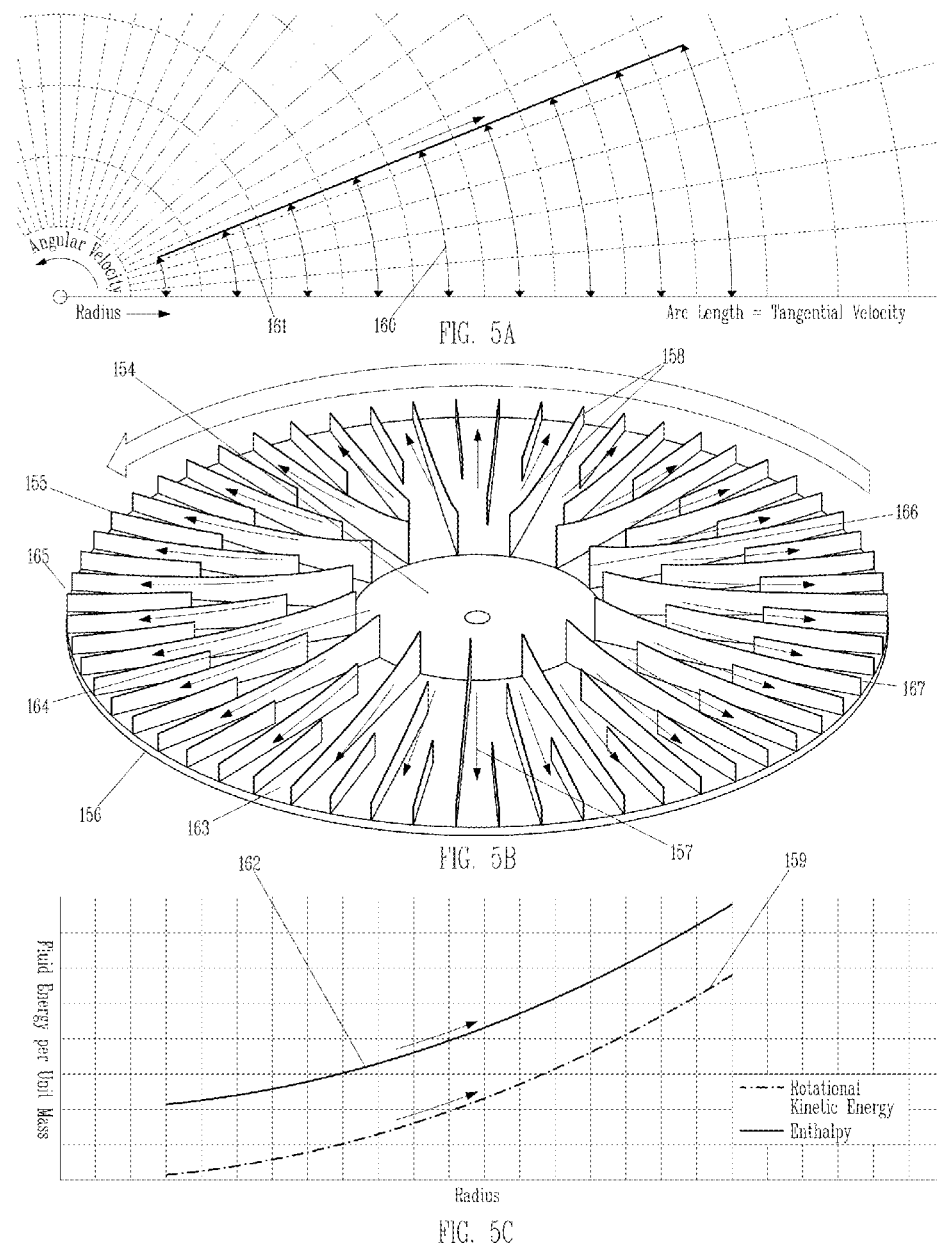

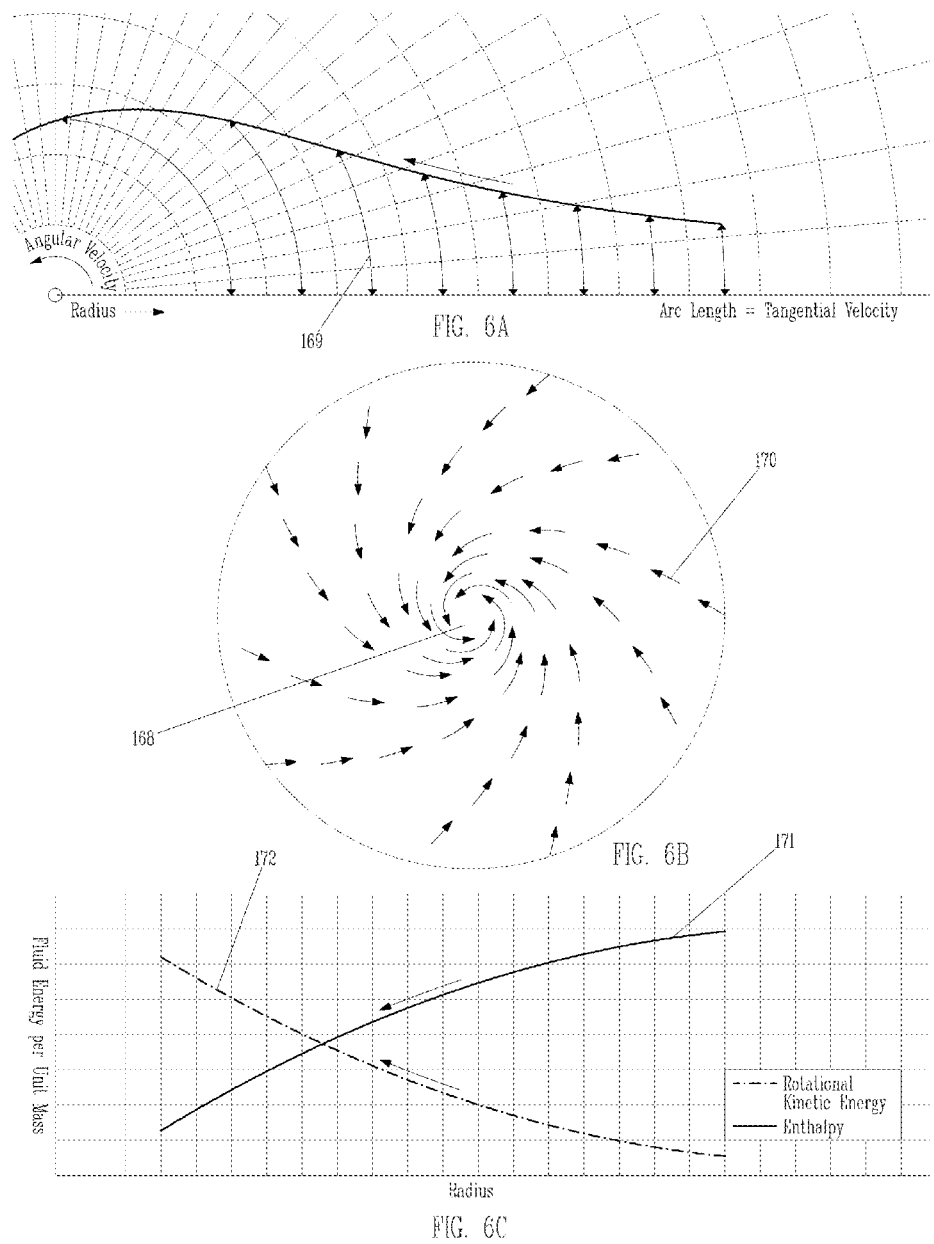

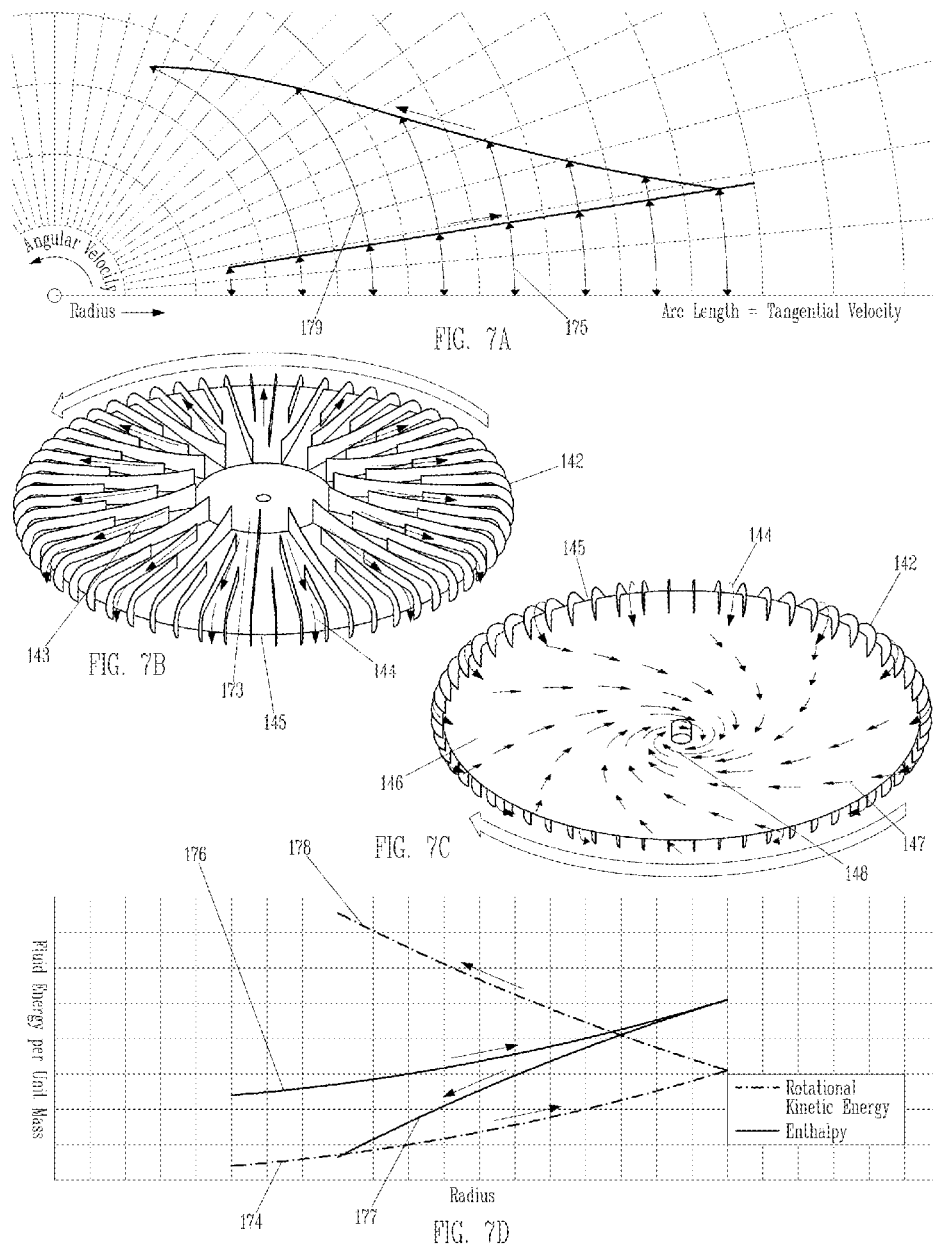

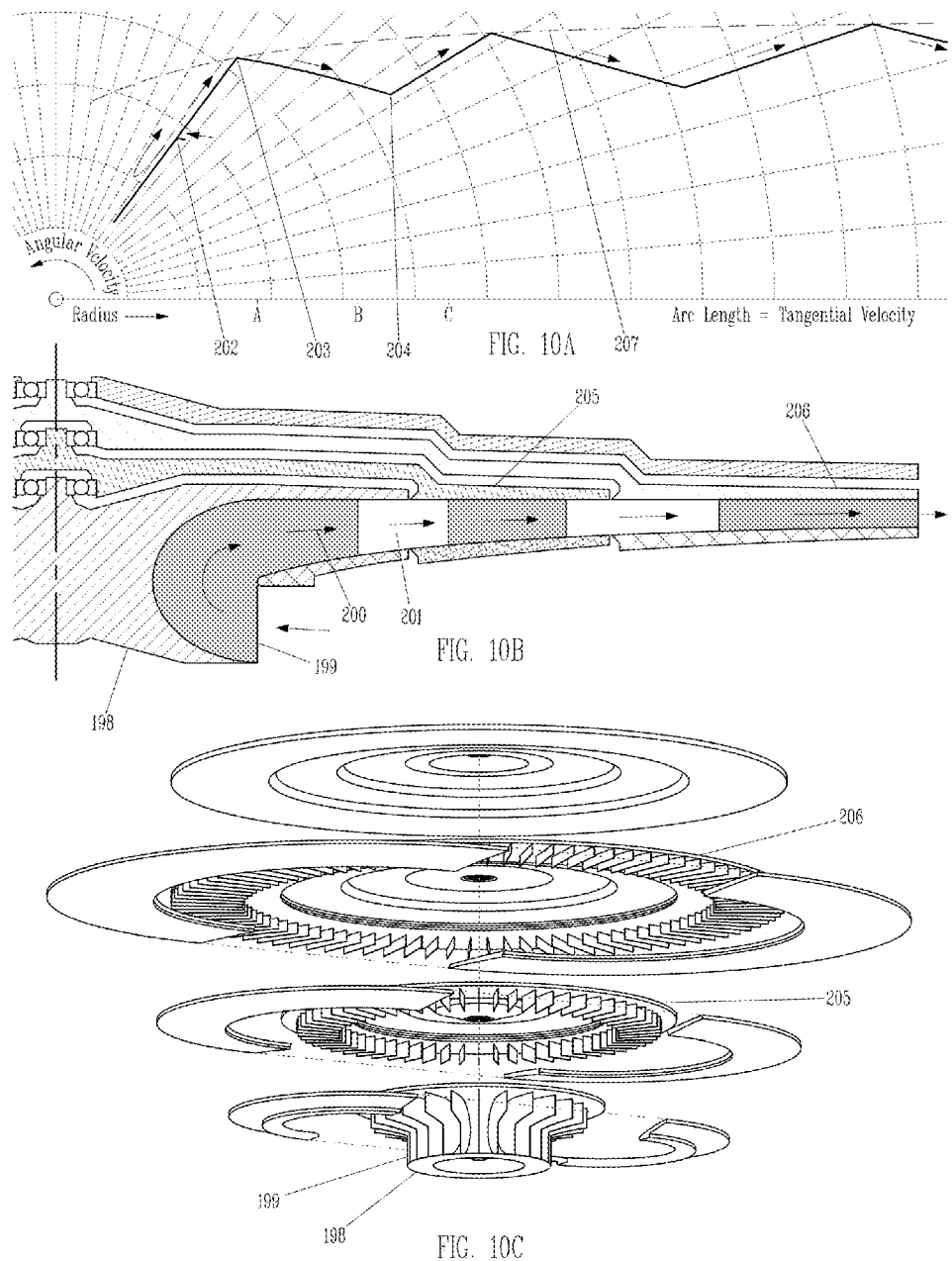

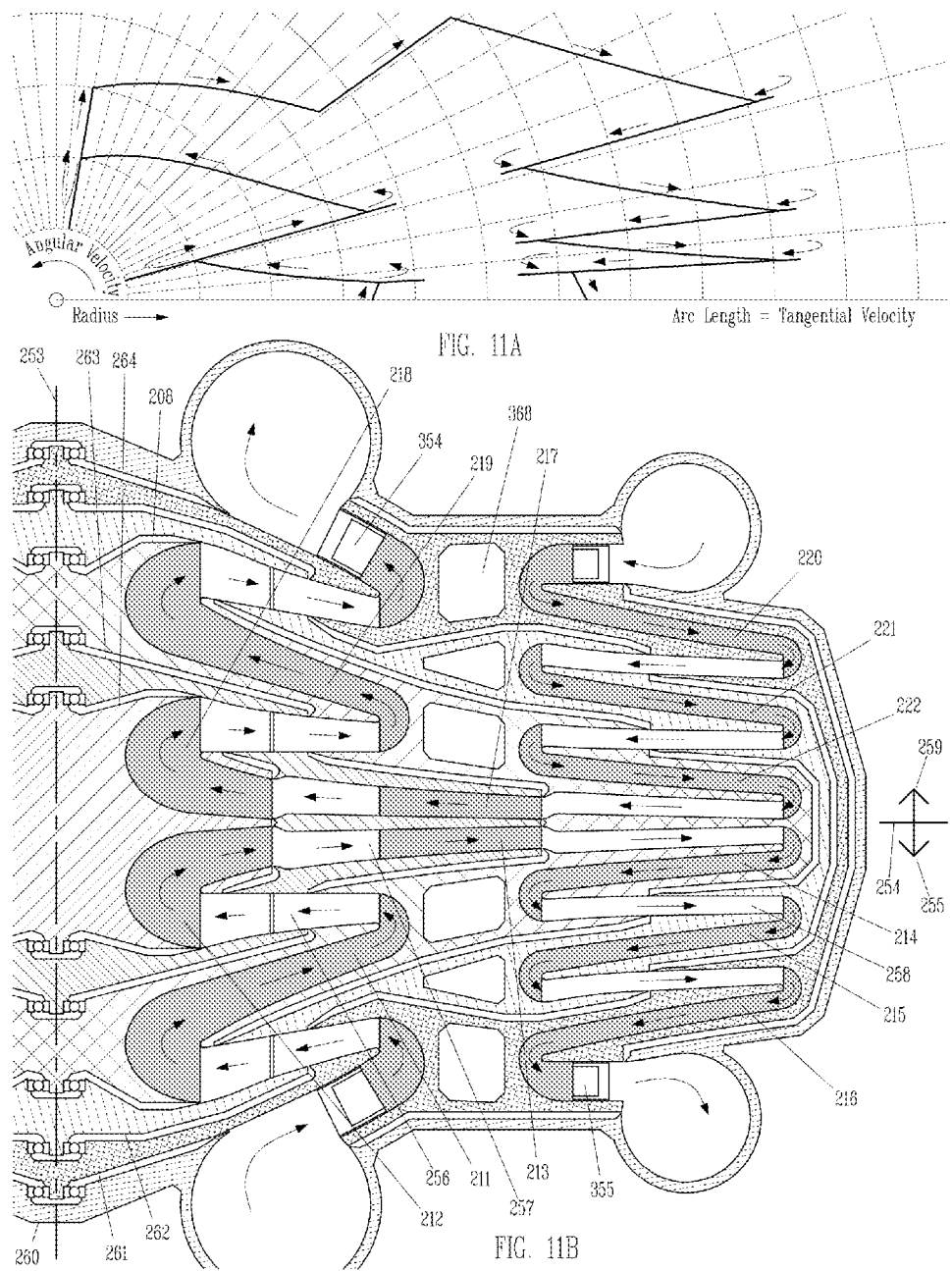

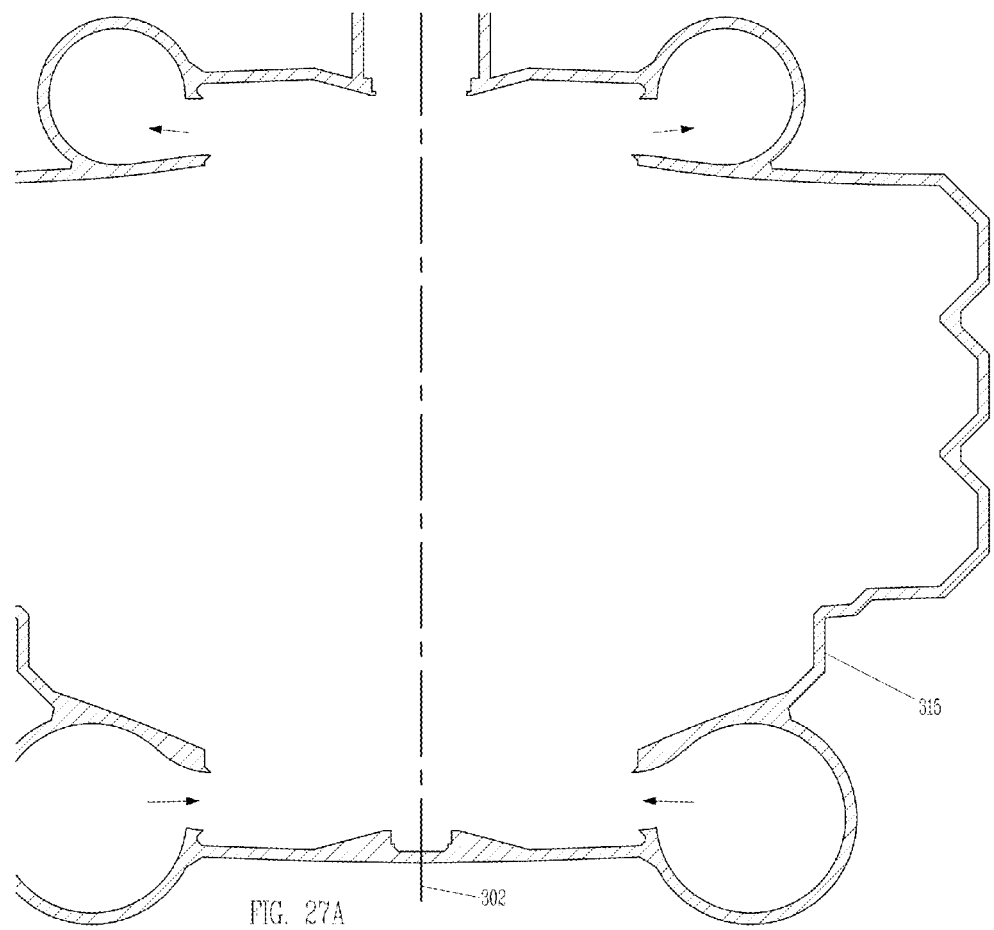
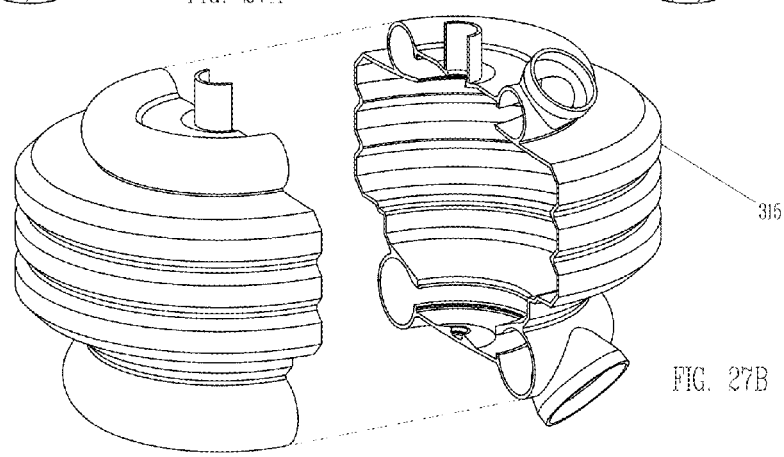
FIG. 27A
FIG. 27B

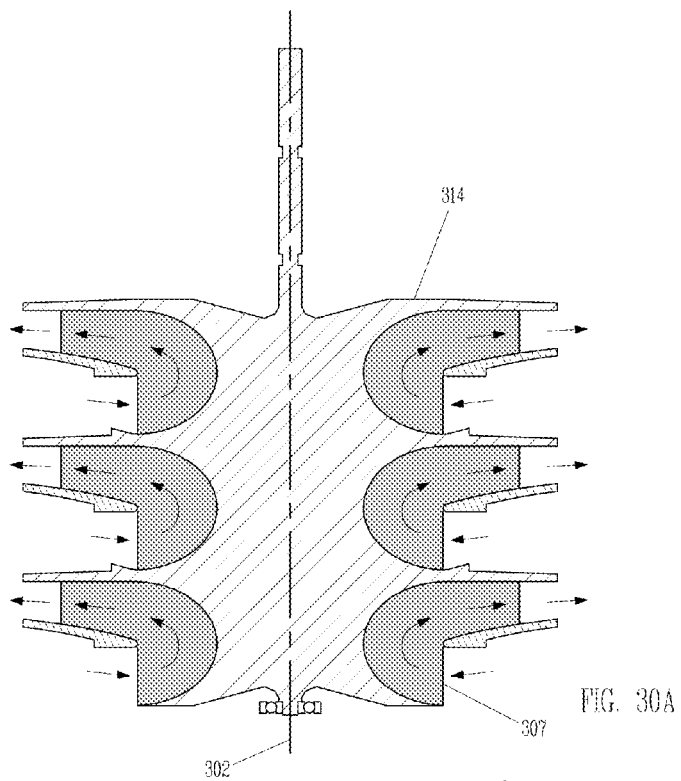
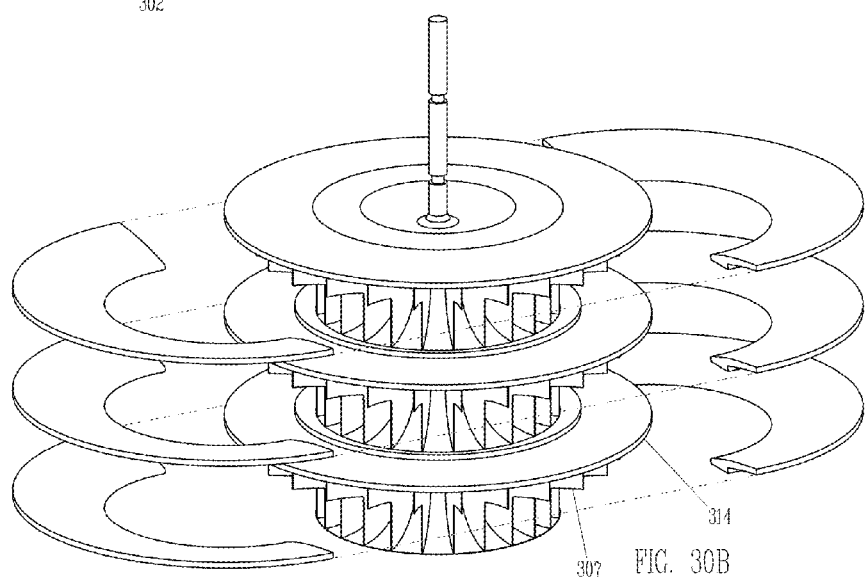
FIG. 30A
FIG. 30B

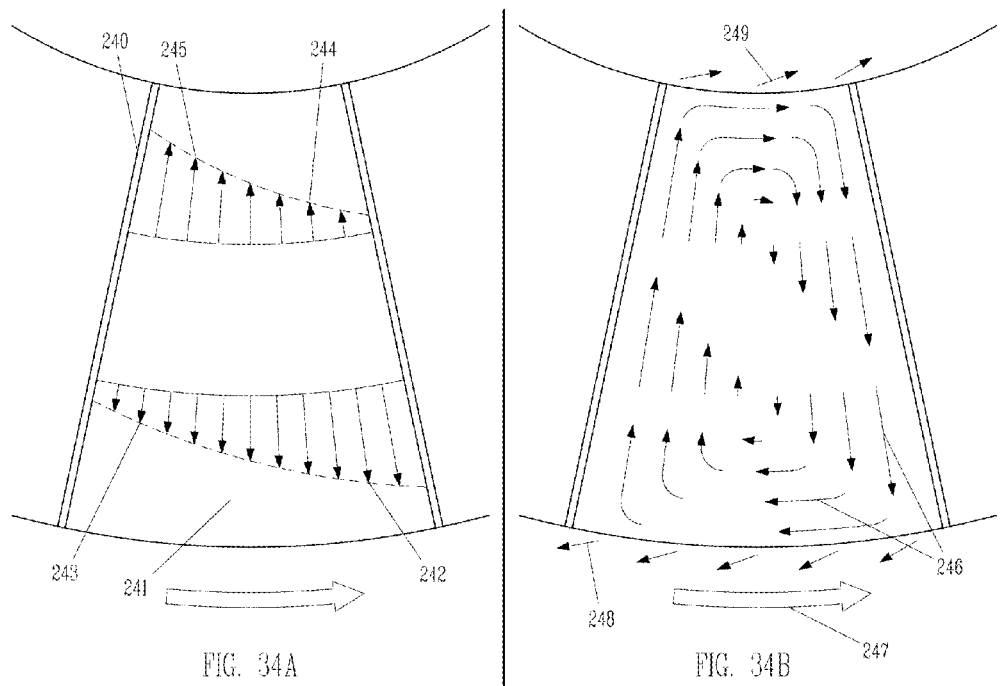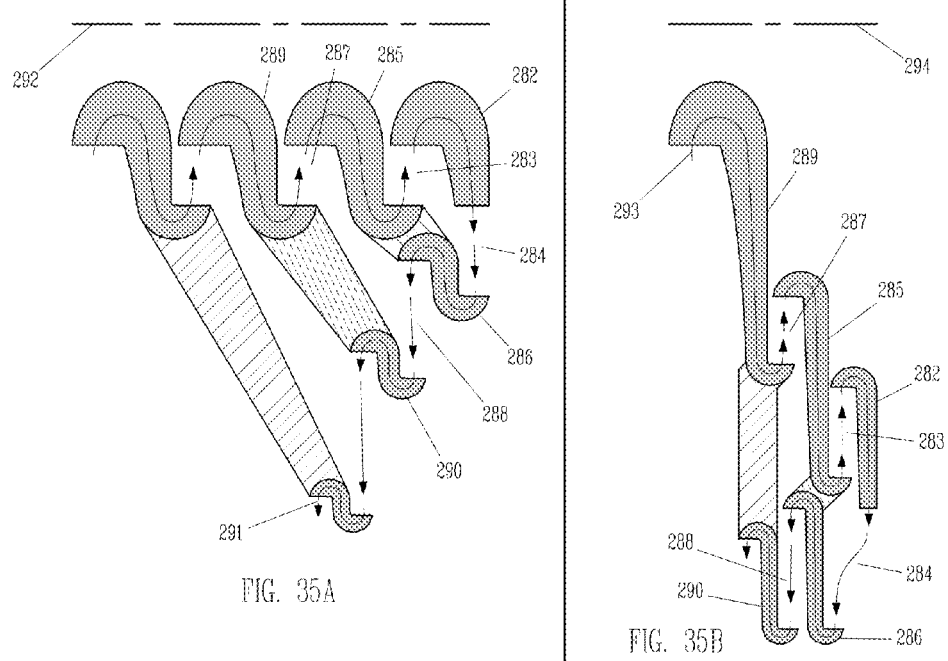

ANGULAR VELOCITY STEPPING AND METHODS OF USE IN TURBOMACHINERY

CROSS REFERENCE TO RELATED APPLICATION

This application claims the benefit of U.S. Provisional Application 62/169,016, filed Jun. 1, 2015, entitled Angular Velocity Stepping and Methods of Use in Turbomachinery. This application also claims the benefit of U.S. Provisional Application 62/183,816, filed Jun. 24, 2015, entitled Angular Velocity Stepping and Methods of Use in Turbomachinery. Each of these applications is incorporated herein by reference.

1.) INTRODUCTION

Structure

Provided is an improved architecture for rotary kinetic fluid motors and pumps, in which working fluid gains or loses pressure by flowing through an alternating sequence of radial-flow impellers and radial-flow fluid vortices, the impellers and fluid vortices all rotating around a single axis and in a common direction at staggered speeds, each vortex being the product of rotating fluid that is flowing radially through a bladeless annular volume.

Function

Each impeller directs working fluid into a radial flow through an axisymmetric set of substantially radial blades, which requires torque exchange and therefore power exchange between impeller and fluid. Each bladeless annular volume directs working fluid flow in a radial direction through a vortex of substantially uniform fluid angular momentum, which transitions the fluid's rotational speed from that of an upstream impeller to that of a faster or slower downstream impeller. The alternating sequence of impeller, vortex, impeller, etc. can transition working fluid up to, and down from, the high rotational speeds needed to produce substantial centripetal pressure change. This architecture offers significantly higher isentropic efficiencies and a dramatically expanded operational envelope, relative to existing technologies.

2.) BACKGROUND OF THE INVENTION

2.1) Basic Principles of the Technology

In this specification, the term turbomachine refers to any machine that: (1) ingests, contains and discharges a continuous flow of liquid, vapor and/or gas, known as working fluid, (2) uses rotating components in contact with the flow of working fluid to generate localized regions of accelerating fluid, and (3) aligns these localized fluid accelerations and their associated fluid pressure gradients to sustain an overall fluid pressure difference between the device's intake and discharge sections. By using rotating parts to sustain a pressure rise or drop within a steady flow, turbomachines continuously transfer energy between shafts and fluid. Examples include: primary components of gas turbines and aerospace turbine engines of any type, steam turbines, turbochargers, axial or centrifugal compressors, hydroelectric turbines, air turbines, dynamic pumps for water or other liquids, etc. NOTE: the term acceleration as used here refers to any type of change in velocity over time.

Equilibrium requires that any volume of accelerating fluid contain a pressure gradient that is aligned with the direction of acceleration, just as Earth's atmosphere and oceans contain vertical pressure gradients caused by its gravity. Severity, or slope, of a pressure gradient is equal to local fluid density multiplied by local acceleration—within turbomachines local acceleration is proportional to local blade speed. Mathematical integration of the slope function with respect to distance along the acceleration vector yields the total fluid pressure difference across the gradient: this forms the unit basis for total pressure differences across entire machines. The size of fluid pressure rise or drop that can be generated across a given machine is therefore a function of how fast its blades can spin.

(FIGS. 2A, 2B and 3A) Turbomachines can be broadly divided into two types: (1) pumps or compressors that consume shaft power to add energy to fluid flows, by ingesting low-pressure fluid and discharging high-pressure fluid, and (2) motors or turbines that extract energy from fluid flows to produce shaft power, by ingesting high-pressure fluid and discharging low-pressure fluid. Within both broad types, two distinct methods are used for creating localized regions of accelerating fluid: (1) Linear Acceleration—Converging 101 or diverging 102 flow passages, whose cross-section areas get larger or smaller along the flow direction to force inverse flow velocity changes as needed to satisfy mass continuity, are used throughout axial-flow devices and in the impeller intake and discharge sections of centrifugal devices. Fluid pressure drops during flow through a converging passage, and rises during flow through a diverging passage. (2) Centripetal Acceleration—Rotating radial flow passages 103 displace fluid mass through a centripetal acceleration field and are used within the rotors of centrifugal devices. Fluid pressure rises during radially outward flow 104, and drops during radially inward flow. Fluid flow passages are generally delineated by axisymmetric blade sets or their equivalent, end walls, shrouds and casings: blades are the primary structure responsible for exchanging energy with the fluid, while end walls, shrouds and casings direct and constrain flow as it enters, transits and exits each set of blades. NOTE: within this disclosure, the term converging or diverging flow passage refers only to flow conduits that are intended to manipulate flow velocities, not those intended to accommodate varying fluid densities.

(FIGS. 1A through 3C) Turbomachines generally use an alternating pattern of rotating 105 and stationary 106 blade sets such that working fluid flows through a stationary set before or after it flows through each rotating set. This alternating pattern is associated with the use of converging or diverging flow passages, for reasons best illustrated using vector geometry: A vector 107 describing the angle and speed at which fluid approaches the leading edges of a given set of blades 108 is deviated from the vector 109 at which that fluid left the trailing edges of the immediate upstream blade set 110, that deviation being equal to the vector 111 describing the speed and direction of the rotating blade set. This is vector addition: the upstream blade departure vector plus the blade rotation vector equals the downstream blade approach vector. In compressors 112, the flow vector deviation occurring between adjacent blade sets is a means for boosting the flow velocity 113 entering each blade set so as to boost the pressure rise that can be produced across the curved diverging flow passages 102 within each blade set. In turbines 114, the vector deviation between blade sets is a means for consuming the excess flow velocity 115 leaving the curved converging flow passages 101 within each blade set. Converging or diverging flow passages within turbomachines are always associated with the interface between rotating and stationary blade sets, and they exist in every type of turbomachine. Even radial-flow devices that employ regions of centripetal fluid acceleration 103 within their impellers 116 must also address flow vector deviation due to impeller rotation at impeller intake 117 and discharge 118 sections, and must therefore employ converging or diverging 119 flow passages at or near those locations.

2.2) A Need for Improvement 2.2.1—Two Basic Problems (FIGS. 2A and 2B) Total dependence on converging or diverging flow passages creates two major problems. First, all turbomachines suffer substantial loss of energy by the action of velocity-dependent mechanisms. This is referred to as the velocity-dependent energy loss problem in this specification. This type of flow passage generates fluid pressure rise or drop by converting flow kinetic energy into pressure or vice-versa: the generation of a large pressure rise across a diverging flow passage 102 requires a large drop in flow velocity (113 vs. 120) across that passage, while a large pressure drop in a converging flow passage 101 corresponds to a large flow velocity boost (121 vs. 115). Large fluid pressure changes across individual flow passages are desirable or even necessary for many turbomachinery applications; the corresponding large flow velocity changes require the presence of high flow velocities somewhere in these passages. Highest flow velocities are typically near leading edges 122 of compressor blades and near trailing edges 123 of turbine blades. High flow velocities across adjacent solid surfaces impose high rates of shear within fluid boundary layers at the fluid-solid interface. High fluid shearing rates cause substantial viscous energy loss and may result in the formation of turbulent boundary layers that make the problem worse. Where compressible fluids move past solid structures at transonic or supersonic velocities, shock waves will form that cause further energy loss. To top it off, the diverging flow passages in compressors can suffer the counter-productive effects of fluid boundary layers thickening and possibly separating from their fluid-solid interfaces, creating zones of flow reversal and re-circulation and generally causing unacceptable flow instability. Turbulent boundary layers can only partially mitigate the boundary layer separation problem. To prevent separation, fluid pressure rise within individual flow passages must be kept below a modest limiting value, so more blade sets are needed to produce a given overall pressure rise. This is why compressors are generally larger and less efficient than equivalent turbines. The net result of viscous shear loss, turbulent loss, shock loss and boundary layer thickening/separation is a substantial reduction in machine efficiency. The most efficient turbomachines in existence suffer total losses in the range of 10-20% of total energy exchanged. Although 10-20% may sound relatively small, such losses can have major consequences for the operation of these devices, as will be demonstrated.

The second major problem caused by converging or diverging flow passages is the relative inability of turbomachines to handle widely varying fluid flow rates without also changing blade RPM proportionately. Put another way, use of converging or diverging flow passages in a turbomachine limits to what extent the blade RPM and the machine flow rate can vary independently of one another. Since blade RPM determines the amount of total fluid pressure rise or drop that can be produced across a given machine, this problem is therefore referred to as the flow-pressure coupling problem in this specification. Because of it, the amount of total pressure rise or drop any turbomachine can produce is at least partially dependent on how much fluid is flowing through that machine. There are two reasons for this coupling.

(FIGS. 2A, 2B and 4) The primary reason converging or diverging flow passages cause flow-pressure coupling is their association with the alternating patterns of rotating and stationary blade sets detailed above. Vector geometry again offers useful explanation: as before, the fluid's approach vector 124 at downstream blades is equal to the vector sum of (1) that fluid's departure vector 125 at upstream blades and (2) the blade rotation vector 126 of either upstream or downstream blades. The magnitude of the blade rotation vector is a direct function of blade RPM, while the magnitude of the upstream blade departure vector is a direct function of fluid flow rate through the machine. The vector triangles (e.g., 107-109-111) shown in the drawings represent vector addition: the reader can see that the direction of the downstream approach vector 124 is heavily dependent on the relative magnitudes of the other two vectors 125, 126, since the triangle must always close. The angle at which fluid flow approaches blade leading edges is therefore heavily dependent on relative values of machine flow rate and blade RPM. If either the upstream departure vector 125 or the blade rotation vector 126 shortens or lengthens significantly while the other remains unchanged, the downstream flow approach angle changes significantly 127, 128. This becomes a problem because smooth flow into a blade set requires that blade entry surfaces 129 near leading edges be substantially aligned with flow approach vectors. Although some newer turbomachinery designs incorporate variable-angle stationary blades to accommodate variable flow approach vectors, orientations of rotating blades cannot realistically be altered. Fixed blade orientations limit the permissible variation in flow approach angle 130, because severe flow turbulence and flow instability will form near leading edges 129 if flow approach vectors 124 come substantially out of alignment with blade entry surfaces. This will cause unacceptable energy losses and, in the case of compressors, could de-stabilize operation. Efficient and reliable turbomachinery operation therefore requires that any significant variations in machine flow rate be accompanied by some proportional variation in blade RPM and therefore in total fluid pressure rise/drop.

The secondary reason converging or diverging flow passages cause flow-pressure coupling in turbomachines is the very nature of the task they perform: conversion of the kinetic energy of flow into fluid pressure or vice-versa. Because these flow passages generally have fixed geometries, mass continuity requires that the ratio of inlet-to-outlet flow velocities across a given passage also be fixed, assuming constant fluid density. In contrast, the quantity of fluid pressure rise/drop that can be produced across one of these passages is a function of the difference between inlet and outlet flow velocities, not the ratio of the two. This distinction is important: higher fluid flow rates through a converging or diverging passage dictate proportionately higher flow velocities at every point along that passage and therefore a larger inlet-to-outlet flow velocity difference for a fixed passage geometry. Similarly, lower flow rates dictate proportionately lower flow velocities at every point and therefore a smaller inlet-to-outlet flow velocity difference. Pressure change within the machine therefore becomes dependent on fluid flow rate through the machine.

2.2.2—Consequences of the Two Problems

Major operational constraints result from the problem of velocity-dependent energy loss in turbomachines. Perhaps the best example to demonstrate these constraints is the Brayton cycle heat engine. All gas turbine type engines use some variation of the Brayton thermodynamic cycle. This cycle's sequence of events is: (1) an isentropic compression of a gas such as air, (2) a constant-pressure heat addition to the gas at high temperatures, (3) an isentropic expansion of the gas, and (4) a constant-pressure heat rejection from the gas at low temperatures to finish the cycle. The isentropic expansion generally occurs within a turbine and results in the production of shaft power. The isentropic compression generally occurs within a turbocompressor and requires consumption of the shaft power produced by the turbine. The cycle's net useful output can take the form of leftover turbine shaft power not used by the compressor, or it can take the form of higher gas pressures exiting the engine than entering it, such as in aircraft jet propulsion. The ideal thermal efficiency of this cycle is proportional to the ratio of the highest to lowest gas pressures in the cycle. Several industries that use gas turbines, such as air transport and electric utilities, experience significant market pressure to operate machines of the highest possible thermal efficiency. Since thermal efficiency is tied to cycle pressure ratio, the long-term trend in gas turbine design has been toward greater and greater cycle pressure ratios and therefore larger pressure rise across the compressor and larger drop across the turbine. This trend has compounded the energy loss problem in those components, because at higher cycle pressure ratios the shaft power transmitted from turbine to compressor can be very large relative to the thermal power input at the high-temperature heat addition. Total energy losses in turbine and compressor are proportional to transmitted shaft power but are deducted from thermal power input, which is the only energy input to the system. So if a particular gas turbine engine suffers 10% losses in both turbine and compressor and transfers twice as much power between the two as it takes in at the high-temperature heat addition, that engine will suffer a thermal efficiency penalty of approximately 2×(10%+11.1%)=42% purely as a result of the losses in turbine and compressor. If the same engine transmits three times as much power on shafts as it takes in as thermal input, the 10% losses will manifest as an efficiency loss of roughly 63% to the engine. In this way the efficiency gains realized by higher cycle pressure ratios can be diminished or even wiped out by compounded energy losses in turbomachine elements.

To counter the problem of compounded losses, a second long-term trend in gas turbine design has followed in lock-step with the first: increasing thermal power input to the cycle to offset compounded energy losses from higher cycle pressure ratio. Increasing thermal power input to a fixed-flow Brayton cycle means a larger temperature rise across the heat addition section and therefore a higher gas temperature at the turbine intake. Very high turbine intake temperatures are a reality in almost all modern gas turbine designs and are one of the primary drivers of design and manufacturing costs, of maintenance/overhaul requirements and of lifespan limitations for turbine-type engines. To understand why, one need only appreciate that first-stage turbine blades are required to withstand tens or hundreds of thousands of gees of centripetal acceleration while being subjected to high-pressure, high-velocity gas flows at temperatures often well above the melting points of common metals, and are required to do so for as many operating hours as possible. Such an engineering feat can only be accomplished through use of exotic metallurgy and materials technologies, intricate film cooling techniques, exacting structural design and testing, active engine management, rigorous inspection and maintenance schedules, etc. All this is made necessary by the pursuit of higher engine thermal efficiencies in light of existing energy loss mechanisms in the compressor and turbine.

It is true that an 'ideal' gas turbine engine having zero losses in its turbomachinery components would still experience increased turbine intake temperatures in the course of achieving higher engine thermal efficiencies, since the required higher cycle pressure ratios would dictate a larger temperature rise across its compression section. It can be demonstrated, however, that such an ideal engine has little need to maintain a large temperature rise across its heat addition section and can therefore achieve much higher engine thermal efficiencies than those achieved by today's real-world gas turbines at a given turbine intake temperature. Although an ideal engine is impossible to build, large reductions in turbomachinery component losses can translate into very large gains in engine efficiency before turbine intake temperatures again become a serious issue.

The Brayton cycle engine also provides an example of the operational constraints associated with flow-pressure coupling in turbomachines. As previously detailed, Brayton cycle thermal efficiency is a function of the total pressure rise across the compressor and total drop across the turbine. Also as previously detailed, fixed blade orientations and converging/diverging flow passages mean that quantities of compressor pressure rise & turbine pressure drop to be dependent on their respective flow rates. Furthermore, it can be understood that an engine's flow rate is generally linked to its power setting, since more gas flow is needed to absorb greater thermal power input if peak cycle temperature is to remain constant. Together these facts result in turbine engine thermal efficiency being dependent on engine power setting. Such a power-efficiency coupling is a deal-breaker for many would-be applications of this engine type, which is why so many modern air vehicles are powered by gas turbines while almost all modern ground vehicles are still powered by reciprocating engines. Air vehicle engines spend most of their running time at or near their maximum power output, a very efficient mode for a gas turbine. Ground vehicle engines typically spend most of their running time at a setting well below their maximum output, a mode in which a gas turbine cannot operate near peak efficiency.

Beyond Brayton cycle engines, all other end uses of turbomachines are impacted in some way by velocity-dependent energy loss mechanisms and by flow-pressure coupling. The diminished efficiencies and constrained operational envelopes that result can be tolerable shortcomings or major obstacles depending on the specifics of the end use in question. In general, any new technology that manages to solve these two fundamental problems would substantially improve the capabilities of turbomachines and dramatically expand their real-world use.

2.3) Barriers to Improvement

2.3.1—Advantages of Centripetal Acceleration

A reasonable way to address velocity-dependent energy loss and flow-pressure coupling might be to eliminate their root cause: use of converging or diverging flow passages. Perhaps a machine can be devised that instead relies completely on the other available method for generating fluid pressure change: rotating radial flow passages.

(FIGS. 2A through 3A) In contrast to a converging 101 or diverging 102 flow passage, which generates fluid pressure change through linear acceleration or deceleration of flow, a rotating radial flow passage 103 subjects fluid to centripetal acceleration while directing flow toward or away from the axis of rotation. The centripetal acceleration creates a radial gradient of fluid pressure, locating higher pressures at outer radii 118 and lower pressures at inner radii 117. Fluid flowing radially outward 104 through this gradient will be subject to pressure rise, while fluid flowing inward will be subject to pressure drop. Where centripetal acceleration is the sole mechanism of fluid pressure change, the severity of the pressure gradient is a function of rotational velocity only and is unaffected by the flow velocities relative to passage walls. This is a critical distinction: rotating radial flow passages can produce significant pressure rise or drop without resorting to high flow velocities and associated high fluid shear rates at fluid-solid interfaces. And these flow passages can reliably produce that same pressure rise or drop regardless of variations in fluid flow rate through the passage, because the fluid motion that determines pressure change (tangential) is largely perpendicular to the fluid motion that is determined by fluid flow rate (radial). It would seem that rotating radial flow passages could theoretically provide a solution to both velocity-dependent energy loss and flow-pressure coupling.

2.3.2—The Problem with Centrifugal Machines (FIGS. 3A through 3C) Unfortunately, the advantages of this type of flow passage are not fully leveraged. Existing centrifugal compressors and turbines generate less than half of their total fluid pressure rise/drop within rotating radial flow passages 103. As previously mentioned, impeller rotation causes flow vector deviation 131 where fluid enters 117 and leaves 118 the impeller of any centrifugal turbomachine, so converging/diverging flow passages 119 must be used at those locations. Those flow passages generate the remainder of the machine's pressure rise or drop. This is referred to as the impeller entry and exit problem in this specification. A closer look at this type of turbomachine will explain it.

(FIGS. 3A through 3C) A typical single-stage centrifugal compressor or turbine consists of a single radial-flow impeller 116 enclosed within a casing. The impeller is a solid disc or disc-like structure to which an axisymmetric set of blades 132 are attached. The blades run from the impeller's hub 117 out to its rim 118 in a generally radial direction. The casing is shaped to provide a close-fitting shroud over the free edges 133 of the blade set so as to limit fluid leakage past those edges. The empty spaces 103 between each adjacent pair of blades and between impeller disc and casing are the rotating radial flow passages. In a centrifugal compressor, fluid enters the impeller 117 near the hub, flows radially outward 104 through the impeller from lower to higher pressures, and exits 118 at the outer rim. The energy needed for fluid compression comes from the consumption of shaft power by the impeller. In a centrifugal turbine, fluid enters the impeller at the outer rim, flows radially inward from higher to lower pressures, and exits at the hub. The energy liberated by fluid expansion is used to produce shaft power. Since the impeller is a single solid object that rotates with uniform angular velocity, fluid near its outer rim has a great deal of kinetic energy. In fact, about half of the energy that is transferred from impeller to fluid (compressor) or from fluid to impeller (turbine) takes the form of fluid kinetic energy associated with the high tangential velocities 134 at the rim.

(FIGS. 3A through 3C) This large kinetic energy fraction at the outer rim is the primary cause of the impeller entry and exit problem. In a centrifugal compressor, fluid at the rim 118 is leaving the impeller and entering stationary diffuser vanes 135 that surround the rim, which slow it down. Vector addition 131 at the rotating/stationary interface translates the high fluid tangential velocities 134 at the rim into high flow velocities 136 entering the diffuser vanes, and the diverging flow passages there 119 must convert that large fluid kinetic energy fraction (half of the total energy exchanged in the machine) into fluid pressure. In a centrifugal turbine, fluid at the rim is entering the impeller after having been brought up to that same high tangential velocity by accelerating through the stationary converging flow passages around the impeller rim, so the large fluid kinetic energy fraction at the outer rim is produced by the pressure drop across these converging passages. In both of these cases, the stationary converging or diverging flow passages 119 that surround the impeller's outer rim are responsible for about half of the fluid pressure rise or drop across the device. The reader should note that although the drawings show a typical centrifugal compressor, a turbine would have more or less the same appearance, the major differences between compressor and turbine being the direction of flow 104 through the device and the direction of the impeller's rotation 137.

(FIGS. 3A through 3C) The secondary cause of the impeller entry and exit problem is the kinetic energy fraction at the hub. At the impeller hub 117, fluid flow must also enter (compressor) or exit (turbine) the impeller blades 132. The fluid upstream of the compressor impeller entry 138, or downstream of the turbine impeller exit, is assumed not to be rotating. This is another rotating/stationary flow interface that involves vector addition 131 and so requires converging or diverging flow passages. At the hub these passages 119 are located between the impeller blades where the blades curl over from a radial direction toward a tangential one. In a compressor, fluid flow entering the impeller 138 first passes the blade leading edges 139 and then enters diverging flow passages 119, which act to slow the entry flow velocity 140 that resulted from the vector addition 131. In a turbine, fluid flowing toward the impeller exit passes through converging flow passages (the compressor's diverging passages in reverse) through which the fluid accelerates in a tangential direction before passing the blade trailing edges, that tangential velocity opposing and canceling the impeller's rotational motion via vector addition. Again in both cases, fluid tangential kinetic energy due to the impeller's rotation is converted into, or from, fluid pressure by converging or diverging flow passages. Impeller tangential velocities 141 are lower near the hub radius, so the kinetic energy fraction there is significantly smaller than the fraction at the outer rim.

Together, the respective kinetic energy fractions at impeller hub and outer rim add up to well over half of the total amount of energy that is exchanged between centrifugal impeller and fluid. Well over half of the useful output of a centrifugal compressor or turbine is produced within converging or diverging flow passages, and is therefore subject to the same velocity-dependent energy loss and flow-pressure coupling that plague axial-flow machines. A solution to the impeller entry and exit problem is needed, because the advantages of rotating radial flow passages cannot be fully realized if those passages do less than half the total work.

2.4) Critical Features of Improved Technology

To reduce or eliminate velocity-dependent loss and flow-pressure coupling, turbomachines must use rotating radial flow passages only to generate fluid pressure rise or drop. This cannot be done with current radial-flow technology due to the impeller entry and exit problem. Some means must be found to exploit the benefits of radial-flow impellers without suffering the associated drawbacks. Use of centripetal acceleration must be retained, but established centripetal methods must be improved upon.

To that end, a new architecture for radial-flow turbomachinery is needed. To fully exploit the advantages of centripetal fluid pressure gradients, it must be capable of transitioning fluid to and from high rotational speeds in a manner that minimizes fluid shearing rates at all fluid-solid interfaces and does not use converging or diverging flow passages to handle any significant fluid energy quantities. The present invention seeks to achieve these goals, to lay a foundation for turbomachines that operate at significantly higher isentropic efficiencies and with enormously increased tolerance to variations in flow rate, even to the point of complete flow reversal.

3.) SUMMARY OF THE INVENTION

To generate fluid pressure rise or drop using only rotating radial flow passages, the new architecture provided by the present invention must rely on radial-flow impellers, and must therefore provide a solution to the impeller entry and exit problem.

The solution is radial-flow fluid vortices.

A radial-flow fluid vortex is a mass of fluid that is rotating about an axis line while generally moving toward or away from that line. A fluid vortex that contains radial mass transfer will tend toward having uniform angular momentum. Where fluid angular momentum is uniform, fluid tangential velocity is inversely proportional to fluid radius. This inverse speed-radius relationship is the key to the solution.

(FIGS. 7B and 7C) Consider a hypothetical radial-flow impeller 142 that is rotating slowly and is handling a radially outward fluid flow 143 that is being discharged at its outer rim. The flow at the impeller exit is re-directed axially 144 around the rim edge 145 to the backside of the impeller disc 146, which has no blades or other means of exchanging torque with the flow. At the backside this flow is directed radially inward, creating a fluid vortex that is co-axial to the impeller, in which fluid rotational speeds rise (147 vs. 148) as fluid flows radially inward. At some inner radius the fluid flow is again re-directed axially around a corner, this time to enter the hub of a second radial-flow impeller (not shown). The second impeller is co-axial to, and axially spaced from, the first impeller and is also rotating faster than the first. No converging or diverging flow passages are used to manipulate fluid tangential velocities between the two impellers. No vector addition is in play at impeller entries and exits. The transition of fluid rotational speeds is accomplished using radial flow and conserved angular momentum.

After flowing outward through the second impeller, the fluid can then turn to flow inward through a second fluid vortex on the backside of the second impeller, and then turn again into a third impeller and so on. Each subsequent impeller along the flow path spins faster and faster, until the fluid that started at a relatively slow rotational speed is traversing a high-speed impeller and is subject to the associated steep centripetal fluid pressure gradients.

(FIG. 8B) Consider also a second hypothetical radial-flow impeller 149 that is rotating at high speed and is handling a radially outward fluid flow 150 that is being discharged at its outer rim. Here, fluid leaving the impeller continues radially outward through a bladeless flow region 151, creating a fluid vortex in which fluid rotational speeds drop (152 vs. 153) as fluid flows radially outward. At some outer radius the flow enters the hub of a second, much larger radial-flow impeller (not shown). The second impeller encircles the first impeller and is also rotating more slowly than the first. Again as before, the transition of fluid rotational speed between the first and second impellers is accomplished using radial flow and conserved angular momentum.

Why is this second scenario important? Because a larger pressure rise can be generated across an outward-flow impeller-vortex-impeller sequence than can be generated across a single, large outward-flow impeller of the same overall diameter.

In both scenarios, the fluid flows through a vortex before or after flowing through each impeller. Whereas existing turbomachines generally direct working fluid through an alternating pattern of rotating and stationary blade sets, the present invention directs working fluid through an alternating pattern of blade sets and fluid vortices. Each blade set represents an angular velocity 'step' and each fluid vortex represents a transition between 'steps'.

The sequences outlined in both scenarios above are completely reversible. Fluid that has left a high-speed impeller can come back to slow rotation by flowing through an outward-flow vortex, then a slower inward-flow impeller, then an outward-flow vortex, and so on. Fluid can be directed through a large centripetal fluid pressure drop by flowing through an inward-flow impeller, then an inward-flow vortex, then a faster inward-flow impeller, and so on.

These two reversed sequences, plus the two original scenarios, perform four basic operations: fluid spin-up, outward radial displacement to build pressure, inward radial displacement to lose pressure, and fluid spin-down. These four operations together make up the entire invention and each of its embodiments. All are based on various combinations of impellers and fluid vortices.

This specification provides three primary embodiments along with secondary variations on each. The first primary embodiment provides a machine consisting of two symmetrical halves: a compressor half and a turbine half, in which each impeller that adds energy to the compressor flow is powered by its symmetrical counterpart which is extracting energy from the turbine flow. The second primary embodiment provides a compressor in which one impeller receives external shaft power input, or alternately a turbine in which one impeller produces net shaft power as the machine's output. All other impellers in the second primary embodiment power each other. The third primary embodiment, like the first, provides a machine having symmetrical compressor and turbine halves. In the third embodiment, centripetal fluid pressure rise or drop is generated in stages across multiple inward and outward radial displacements at high rotational speeds, instead of across a single high-speed radial displacement as is done in the first and second embodiments. The third primary embodiment could also be capable of single-shaft power input/output if provided with a mechanical gearing system to transfer shaft power between two of its rotors.

Since angular velocity stepping can only claim to transition fluid between low and high speed rotation, not between zero and high speed rotation, supplementary devices called angular velocity regulators are disclosed and their role in transitioning fluid between zero and low speed rotation is discussed. In addition, the adverse effects of pressure-driven fluid leakage between rotors and of conductive heat transfer through rotors are considered, as are methods for mitigation. Failure containment, noise and bearings are discussed. Finally, possible end uses of angular velocity stepping are listed, including end uses that may be currently impractical with existing technologies.

4.) BRIEF DESCRIPTION OF THE DRAWINGS

NOTES: (1) In all drawings that show arrows indicating working fluid flow (excluding FIGS. 1A thru 4, FIGS. 34A-B, 41A-B, and 43) arrow directions may be considered reversible, consistent with the present invention's bi-directional flow capability. (2) In all cross-section drawings, light gray shading indicates a blade surface.

FIG. 1A (Prior Art) is a perspective view of a simplified gas turbine engine with casing opened, showing compressor at left and turbine at right.

FIG. 1B (Prior Art) is a plan view of the compressor blades of FIG. 1A

FIG. 1C (Prior Art) is a plan view of the turbine blades of FIG. 1A.

FIG. 2A (Prior Art) is a close-up plan view of the compressor blades of FIG. 1A and the flow vectors between rotating and stationary blade rows, showing the vector addition caused by blade rotation.

FIG. 2B (Prior Art) is a close-up plan view of the turbine blades of FIG. 1A and the flow vectors between rotating and stationary blade rows, showing the vector addition caused by blade rotation.

FIG. 3A (Prior Art) is a perspective view of a typical centrifugal compressor minus its casing, showing a rotating impeller surrounded by a stationary diffuser.

FIG. 3B (Prior Art) is a close-up view of the flow vectors entering the leading edges of the impeller blades, showing the vector addition caused by blade rotation.

FIG. 3C (Prior Art) is a close-up view of the flow vector transition between impeller blade trailing edges and diffuser blade leading edges, showing the vector addition caused by blade rotation.

FIG. 4 (Prior Art) is an enlarged diagram of the vector addition that determines relative flow approach angle into a row of blades, showing the effect of flow rate variations on approach angle.

FIG. 5A is a polar coordinate plot of fluid angular velocity vs. fluid radius representing flow though the impeller of FIG. 5B FIG. 5B is a perspective view of an outward-flowing impeller with flat radial blades.

FIG. 5C is a dual plot of fluid kinetic energy and enthalpy vs. fluid radius representing flow through the impeller of FIG. 5B.

FIG. 6A is a polar coordinate plot of fluid angular velocity vs. fluid radius representing flow through the fluid vortex of FIG. 6B.

FIG. 6B is a vector field representing steady inward radial flow through a fluid vortex of uniform angular momentum.

FIG. 6C is a dual plot of fluid kinetic energy and enthalpy vs. fluid radius representing flow through the fluid vortex of FIG. 6B.

FIG. 7A is a polar coordinate plot of fluid angular velocity vs. fluid radius representing flow through the impeller and vortex of FIGS. 7B & 7C.

FIG. 7B is a perspective view of an outward-flowing impeller with flat radial blades that re-directs exiting flow at its rim around toward its underside.

FIG. 7C is a perspective view of the bladeless underside of the impeller of FIG. 7B, showing fluid from its topside entering at the rim into an inward-flowing fluid vortex.

FIG. 7D is a dual plot of fluid kinetic energy and enthalpy vs. fluid radius representing flow through the impeller and vortex of FIGS. 7B & 7C.

FIG. 10A is a polar coordinate plot of fluid angular velocity vs. fluid radius representing flow through the assembly of FIG. 10B.

FIG. 10B is a cross-section of an assembly that provides a flow path through an alternating sequence of outward-flowing impellers and outward-flowing fluid vortices.

FIG. 10C is an exploded perspective view of the assembly of FIG. 10B.

FIG. 11A is a polar coordinate plot of fluid angular velocity vs. fluid radius representing flow through the compressor half of the first primary embodiment of the present invention.

FIG. 11B is a cross-section of the first primary embodiment of the present invention, showing five independent rotating structures and a casing.

FIG. 27A is a cross-section of the casing of the third primary embodiment of the present invention.

FIG. 27B is an exploded perspective view of the casing of FIG. 27A.

FIG. 30A is a cross-section of the rotating structure of the high-speed inner impellers of the third primary embodiment.

FIG. 30B is an exploded perspective view of the rotating structure of FIG. 30A.

FIG. 34A is a typical flow passage within a typical impeller, showing the tangential gradients of flow velocity that are imposed on inward or outward radial flows by the coriolis acceleration.

FIG. 34B is the flow passage of FIG. 34A, showing the equivalent coriolis secondary flow and resultant fluid 'slip' vectors at both radial exits.

FIG. 35A is a schematic view of the impellers of the second primary embodiment, showing outward radial spread.

FIG. 35B is the impellers of FIG. 35A, showing inward radial spread.

5.) GLOSSARY OF TERMS

Figure 8A:
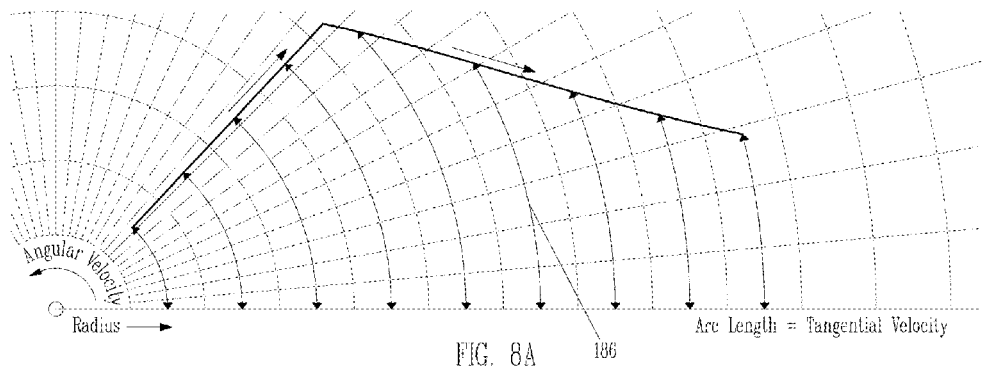
FIG. 8A is a polar coordinate plot of fluid angular velocity vs. fluid radius representing flow through the impeller and vortex of FIG. 8B.

Radial-Flow Impeller: A rotating component consisting of an axisymmetric set of blades that are attached to one or more solid discs or similar structures, the blades shaped to guide a flow of fluid in a substantially radial direction while exchanging torque, and therefore power, with that flow, the disc or discs securing the blades against centrifugal forces and transferring shaft power to or from the blades. In the present invention, impeller blades can be straight and radial, or can be oriented at some angle from the radial direction when viewing the disc face-on. Straight radial blades offer complete flow-pressure de-coupling, while angled blades retain some degree of coupling which may be advantageous for certain end uses. Impeller blades in the present invention have leading and trailing edges that are generally, but not necessarily, parallel to the rotational axis. Radial-flow impellers transfer energy from rotor to fluid during outward radial flow, and transfer energy from fluid to rotor during inward radial flow. Energy lost or gained by the fluid consists of two equal parts: rotational kinetic energy which varies with fluid tangential velocity as flow moves radially at semi-constant angular velocity, and enthalpy which varies with fluid pressure as flow moves radially through a centripetal pressure gradient.

Impeller Power: The rate at which energy is consumed by a compressor impeller or produced by a turbine impeller. For radial-flow impellers with straight radial blades, assuming the fluid's angular velocity equals that of the impeller as it enters the impeller, neglecting slip or viscosity:

impeller power=(fluid mass flow rate)×(blade angular velocity)$^2$×((blade outer edge radius)$^2$− (blade inner edge radius)$^2$)

For blades that are angled to the radial direction, impeller power calculations are more complicated.

Process Impeller: The highest-speed impeller(s) and the one(s) performing the bulk of the fluid compression and expansion processes. In compressors, the process impellers are always outward-flow. In turbines, the process impellers are always inward-flow.

Spin-Up Impeller: Any impeller that transitions fluid from the low rotational speeds at machine intake to the high-speed process impeller. Spin-up impellers are always outward-flow.

Spin-Down Impeller: Any impeller that transitions fluid from the high-speed process impeller back to the low rotational speeds at machine exhaust. Spin-down impellers are always inward-flow.

Bladeless Annular Volume: A ring-shaped volume encircling the common rotational axis, which contains fluid that is rotating about that axis and is also flowing radially inward or outward. This volume is contained axially between rotating structures or between casing sections and is contained radially between upstream impeller blade trailing edges and downstream impeller blade leading edges. This volume contains no blades or other structures that would apply torque to the fluid, neglecting wall friction. The radial fluid flow within this volume forms a fluid vortex. The radial spacing between upstream impeller blade trailing edges and downstream impeller blade leading edges is defined as that which is sufficient to allow fluid that is leaving the upstream impeller at some initial angular velocity to speed up or slow down to some faster or slower angular velocity in the course of reaching the downstream impeller, due to partial or complete conservation of fluid angular momentum across the radial spacing.

Radial-Flow Fluid Vortex: The fluid structure contained within the bladeless annular volumes in the present invention. A fluid vortex is a mass of fluid that is rotating about an axis line, typically in the absence of external torque once rotation has started. A radial-flow fluid vortex is a mass of fluid that is rotating about an axis line while generally moving toward or away from that line. A fluid vortex that contains radial mass transfer will tend toward uniform angular momentum (a free vortex), neglecting fluid viscosity. Where fluid angular momentum is uniform, fluid tangential velocity is inversely proportional to fluid radius. In the present invention, fluid vortices form where rotating fluid is made to flow in a radial direction through a bladeless annular volume. These vortices have the same rotational axis and spin direction as the impellers, and are used to speed up or slow down fluid rotation between upstream and downstream impellers of different speeds. Total fluid energy is conserved across each vortex. During outward radial flow, fluid tangential velocity drops and fluid pressure rises as rotational kinetic energy is converted into enthalpy (pressure energy). During inward radial flow, fluid tangential velocity rises and fluid pressure drops as enthalpy is converted into rotational kinetic energy.

Vortex Exit/Entry Spin Ratio: The ratio of the respective fluid angular velocities at exit from, and entry to, a radial-flow fluid vortex. Equals the ratio of speeds of the two impellers that are immediately downstream and upstream of the vortex, assuming no coriolis slip at the upstream impeller exit. Neglecting fluid viscosity, the ratio is:

$$\frac{\text{(fluid angular velocity @ exit)}}{\text{(fluid angular velocity @ entry)}} = \left(\frac{\text{(radius @ entry)}}{\text{(radius @ exit)}}\right)^2$$

Entry into a fluid vortex in the present invention occurs where flow passes blade trailing edges to leave the upstream impeller. Vortex exit occurs where flow passes blade leading edges to enter the downstream impeller. The vortex's entry/exit radius ratio (the square root of its exit/entry spin ratio) is therefore equal to the ratio of upstream impeller trailing edge radius to downstream impeller leading edge radius.

6.) DETAILED DESCRIPTION OF THE INVENTION

6.1) Features of the Basic Invention

6.1.1—Fundamental Elements

The present invention provides a turbomachinery architecture in which working fluid gains or loses pressure by flowing through a radial-flow impeller, then a radial-flow fluid vortex, then another impeller, another vortex, and so on. All impellers and fluid vortices rotate around a single axis and in a common direction. Each impeller rotates at a somewhat higher or lower speed than the impeller upstream of it. Each fluid vortex transitions fluid from the rotational speed of the upstream impeller to the higher or lower speed of the downstream impeller. The alternating sequence of impeller, vortex, impeller, etc. can transition working fluid to and from the high rotational speeds needed to produce substantial centripetal pressure change. This architecture offers significantly higher isentropic efficiencies and a dramatically expanded operational envelope, relative to existing technologies.

Within this specification, working fluid is generally assumed to be compressible. However, the present invention is intended to handle incompressible and compressible fluids alike. Any descriptions of working fluid as having compressible characteristics should not be interpreted as a narrowing of the invention scope to exclude the use of incompressible fluids.

All fluid compression and expansion processes in this specification are assumed to be adiabatic. This assumption is based on: (1) structural separation of hot and cold machine sections, (2) a reasonably high ratio of fluid mass flow rate to flow path surface area.

The impeller and the fluid vortex are the two fundamental building blocks of the present invention in all its embodiments. Every machine configuration that is proposed in this specification can be described as a flow path through an alternating series of impellers and fluid vortices. A thorough understanding of the present invention starts with a thorough understanding of these two fundamental elements.

(FIGS. 5A through 5C) A radial-flow impeller 154 consists of an axisymmetric set of blades 155 that are attached to one or more solid discs 156 or similar structures, the blades guiding a flow of fluid 157 in a substantially radial direction while exchanging torque and therefore power with that flow, the disc or discs securing the blades against centrifugal forces while transferring shaft power to or from the blades. Impeller blades can be straight and radial 158, or can be oriented at some angle from the radial direction when viewing the disc face-on. Radial-flow impellers transfer energy from rotor to fluid during outward radial flow 157, and transfer energy from fluid to rotor during inward radial flow. Energy gained by the fluid during outward radial flow, or lost during inward radial flow, consists of two equal parts: rotational kinetic energy 159 which varies with fluid tangential velocity 160 as flow moves radially at semi-constant angular velocity 161, and enthalpy 162 which varies with fluid pressure as flow moves radially through a centripetal pressure gradient.

(FIG. 5B) The radial-flow impellers of the present invention are generally similar to impellers used in existing centrifugal turbomachinery, but have the following specific features: (1) flow passages 163 between blades 155 do not typically have significant convergence or divergence near impeller entry 164 or exit 165, and (2) blade leading 166 and trailing edges 167 are generally parallel to the rotational axis but may use other orientations as well, perhaps to set up desirable three-dimensional flow effects, e.g. controlled re-circulation patterns within bladeless annular volumes.

Since all working fluid particles generally cross each threshold between impellers and vortices at or near a single radius, physical properties of the working fluid will be substantially uniform at any given radial position along the flow path, and can therefore be defined and referenced as a function of radius. For this reason, all polar and Cartesian coordinate plots of fluid properties in this document use radius as the independent variable.

(FIGS. 6A through 6C) A fluid vortex is a mass of fluid that is rotating about an axis line, typically in the absence of external torque (once rotation has started). A radial-flow fluid vortex 168 is a mass of fluid that is rotating about an axis line while generally moving toward or away from that line. A fluid vortex that contains radial mass transfer will tend toward a uniform radial distribution of angular momentum (a free vortex), neglecting fluid viscosity. Where fluid angular momentum is uniform, fluid tangential velocity 169 is inversely proportional to fluid radius. Total fluid energy is conserved across a vortex. During outward radial flow, fluid tangential velocity decreases and fluid pressure increases as rotational kinetic energy is converted into enthalpy (energy of pressure and temperature). During inward radial flow 170, fluid tangential velocity 169 increases and fluid pressure decreases as enthalpy 171 is converted into rotational kinetic energy 172.

Fluid vortices are common and well-understood flow structures. They occur within the wakes of moving vehicles and anywhere that one mass of fluid is sliding past another. They also occur where a slowly rotating mass of fluid is converging on a drain or intake. Fluid vortices also form at the tips of aircraft wings, propeller blades, sails, canoe or kayak paddles, etc, as an inevitable consequence of producing aerodynamic or hydrodynamic lifting force. In weather, atmospheric fluid vortices exist as hurricanes, cyclones, tornados, etc. In all of these examples, the vortex exists within a larger fluid volume. In the present invention, vortices are contained in empty chambers and are enclosed by rotating or stationary structures. These chambers are referred to as bladeless annular volumes in this specification.

A bladeless annular volume is a ring-shaped volume encircling the common rotational axis, which contains fluid that is rotating about that axis and is also flowing radially inward or outward. This volume is contained axially between rotating structures or between casing sections, and is contained radially between upstream impeller blade trailing edges and downstream impeller blade leading edges. This volume contains no blades or other structures that would apply torque to the fluid, neglecting wall friction. The radial spacing between upstream impeller blade trailing edges and downstream impeller blade leading edges is defined as that which is sufficient to allow fluid that is leaving the upstream impeller at some initial angular velocity to speed up or slow down to some faster or slower angular velocity in the course of reaching the downstream impeller, due to partial or complete conservation of fluid angular momentum across the radial spacing.

6.1.2—Basic Impeller-Vortex Combinations

Radial-flow impellers and radial-flow fluid vortices are paired into flow paths in one of two arrangements: (1) direction of radial flow through each vortex is opposite that through each impeller, or (2) vortices and impellers all have the same radial flow direction. Both arrangements will be considered in turn.

(FIGS. 7A through 7D) Consider a single radial-flow impeller 142 that is rotating relatively slowly and is carrying a fluid flow 143 radially outward from an entry point at its hub 173 to an exit point at its outer rim 145. During its trip through the impeller, the fluid gains kinetic energy 174 as it gains tangential velocity 175, and its enthalpy increases 176 as its pressure builds across the centripetal pressure gradient. Once at the rim, the flow does not enter stationary diffuser vanes as it would in existing devices, but rather is re-directed axially 144 around the rim edge 145 to the backside 146 of the impeller disc. A bladeless annular volume is formed in the axial spacing between the impeller backside and another adjacent disc-like structure. Once in the bladeless annular volume, the flow is directed radially inward while retaining most or all of the angular momentum it possessed at the impeller exit, creating a fluid vortex. Enthalpy 177 is converted into rotational kinetic energy 178 within this vortex, so fluid pressure starts dropping and fluid tangential velocity 179 begins to rise (147 vs. 148) as fluid flows radially inward from the impeller rim. At some inner radius of the bladeless annular volume the fluid flow is again re-directed axially around a corner, this time to enter the hub of a second radial-flow impeller (not shown) and perhaps to repeat the entire cycle. The second impeller is co-axial to, and axially spaced from, the first impeller. The second impeller is also rotating faster than the first. As fluid flows radially inward through the bladeless annular volume, angular momentum conservation causes the fluid to pick up rotational speed until it has reached the speed of, and can flow straight into, the faster second impeller. No converging or diverging flow passages are used to manipulate fluid tangential velocities near either impeller's entry or exit. No vector addition is in play at impeller entries and exits. The transition of fluid rotational speeds is accomplished using radial flow and conserved angular momentum.

After flowing outward through the second impeller, the fluid can then turn again to flow inward through a second bladeless annular volume on the backside of the second impeller, and then turn again into a third impeller and so on. Each subsequent impeller along the flow path spins faster and faster, until the fluid that started at a relatively slow rotational speed is traversing a high-speed impeller and is subject to the associated steep centripetal fluid pressure gradients.

Figure 8B:
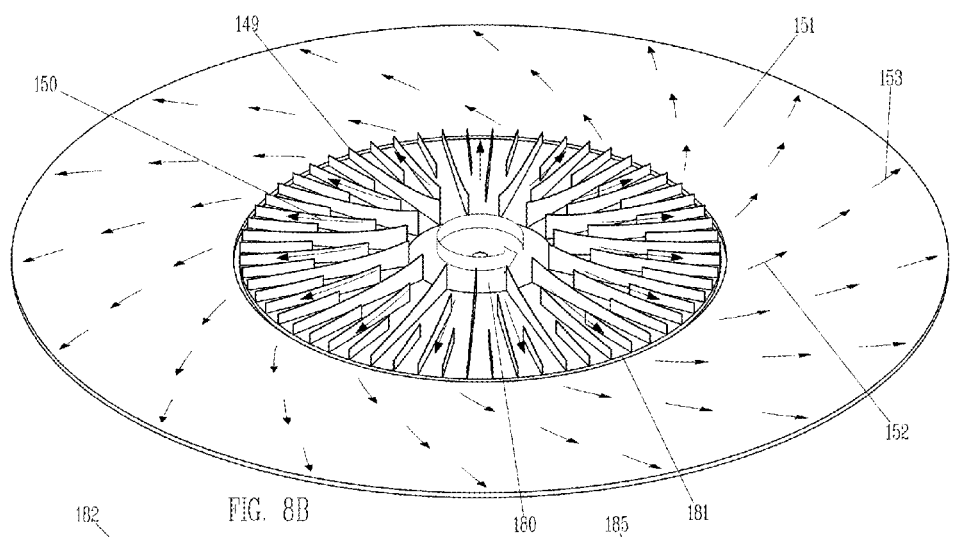
FIG. 8B is a perspective view of an outward-flowing impeller discharging fluid into an outward-flowing fluid vortex.
Figure 8C:
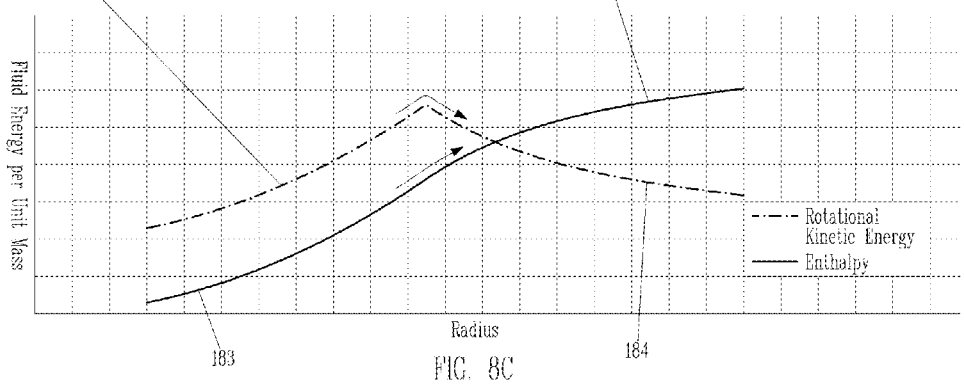
FIG. 8C is a dual plot of fluid kinetic energy and enthalpy vs. fluid radius representing flow through the two-part flow system of FIG. 8B.

(FIGS. 8A through 8C) Consider also a second scenario in which a single radial-flow impeller 149 is rotating at high speed and is again carrying a fluid flow 150 radially outward from an entry point at its hub 180 to an exit point at its outer rim 181. Again, the fluid gains kinetic energy 182 and enthalpy 183 across the impeller. Instead of turning a corner to flow radially inward, fluid leaving the impeller rim continues radially outward through a bladeless annular volume 151 while retaining most or all of the angular momentum it possessed at the impeller exit, again creating a fluid vortex. Here fluid kinetic energy 184 is converted into enthalpy 185, so fluid pressure starts rising and fluid tangential velocity 186 begins to drop (152 vs. 153) as fluid flows radially outward from the impeller rim. At some radius outside the first impeller exit, the flow enters the hub of a second, much larger radial-flow impeller (not shown), perhaps to repeat the entire cycle. The second impeller encircles the first impeller, and is rotating more slowly than the first. Again as before, the transition of fluid rotational speeds between the first and second impellers is accomplished using radial flow and conserved angular momentum.

Why is this second scenario important? Because the severity of a centripetal fluid pressure gradient is proportional to the square of fluid tangential velocity. To maximize centripetal fluid pressure rise across a given radial displacement, radial distribution of fluid tangential velocity must be maximized. A single radial-flow impeller provides maximum stress-limited tangential velocity at its outer rim, but has slower tangential velocities at inner radii. In the second scenario, fluid flow reaches a maximum stress-limited tangential velocity at the outer rim of a smaller impeller, then slows down across a fluid vortex and speeds back up to that same stress-limited tangential velocity at the outer rim of a larger, slower impeller (same tangential velocity at larger radius means slower RPM). An outward-flow impeller-vortex-impeller sequence can therefore generate greater overall pressure rise than a single, large outward-flow impeller of the same overall diameter.

Some existing types of centrifugal turbomachine also use bladeless annular spaces that surround the impeller. These spaces help to slow down and pressurize the fluid that has left the rim of a compressor impeller, or help to speed up the fluid that is about to enter the rim of a turbine impeller. Their function is to transition fluid between rotating impeller and stationary casing, not between impeller and faster/slower impeller The sequences outlined in both scenarios above are completely reversible. Fluid that has left a high-speed impeller can come back to slow rotation by flowing through an outward-flow vortex, then a slower inward-flow impeller, then another outward-flow vortex, and so on. Fluid can be directed through a large centripetal fluid pressure drop by flowing through an inward-flow impeller, then an inward-flow vortex, then a faster inward-flow impeller, and so on.

These two reversed sequences, plus the two original scenarios, perform four basic operations: fluid spin-up, fluid spin-down, outward radial displacement to build pressure, and inward radial displacement to lose pressure. Impellers that are involved in the fluid spin-up and spin-down operations are called spin-up impellers and spin-down impellers, respectively. Impellers that are involved in either of the two radial displacement operations are called process impellers. These four operations together make up the entire invention and each of its embodiments. All are based on various alternating sequences of impellers and fluid vortices.

Figure 9A:
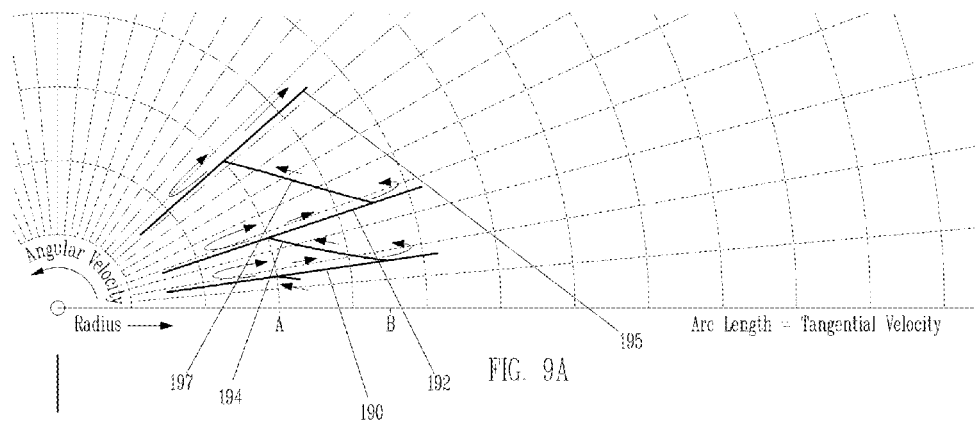
FIG. 9A is a polar coordinate plot of fluid angular velocity vs. fluid radius representing flow through the assembly of FIG. 9B.
Figure 9B:
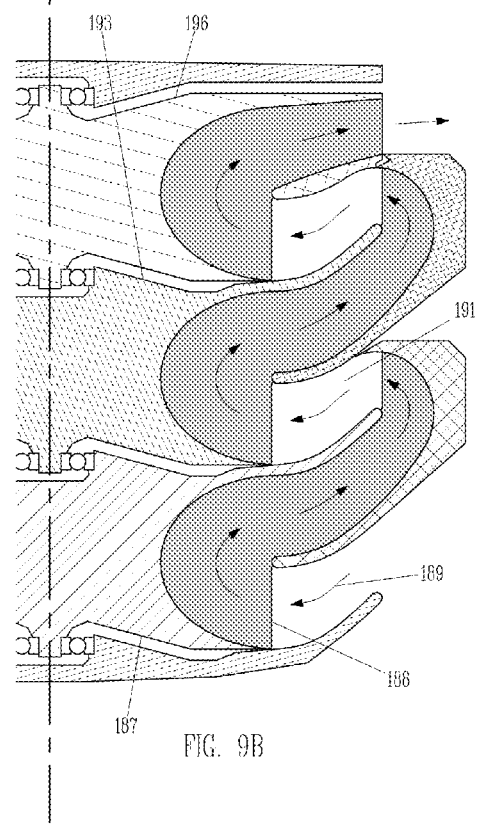
FIG. 9B is a cross-section of an assembly that provides a flow path through an alternating sequence of outward-flowing impellers and inward-flowing fluid vortices.
Figure 9C:
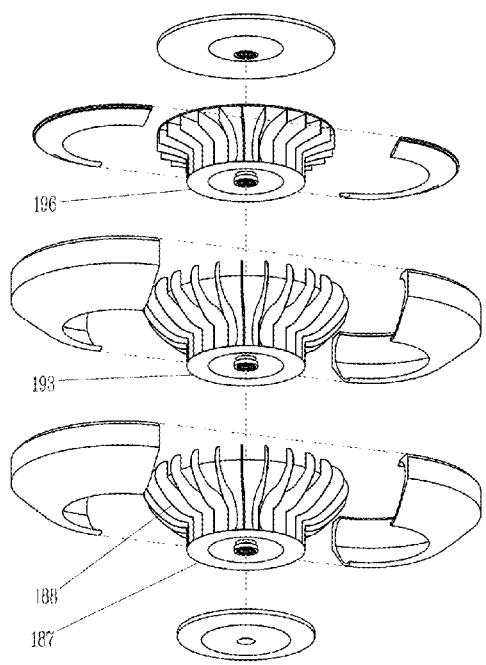
FIG. 9C is an exploded perspective view of the assembly of FIG. 9B.

(FIGS. 9A through 9C) Throughout each of these four basic operations, rotational speeds of fluid and impellers are largely (or completely, in the case of straight radial impeller blades) determined by the entry and exit radii of each bladeless annular volume and by the first impeller's speed. If a spin-up impeller 187 having straight radial blades 188 carries fluid flow 189 from radius A to radius B at uniform angular velocity 190, and if that fluid enters the impeller with tangential velocity T, it will exit the impeller at tangential velocity $(T \times (B/A))$. If that fluid is then directed into a bladeless annular volume 191 from radius B back to radius A, it will exit that volume at tangential velocity $(T \times (B/A)^2)$. The term $(B/A)^2$ is the vortex exit/entry spin ratio of a radial-flow fluid vortex from radius B to radius A. This ratio is equal to: (1) the ratio of fluid angular velocity leaving the vortex to that entering it, and (2) the ratio of downstream impeller speed to upstream impeller speed, if both have straight radial blades. Fluid rotational speed is stepped up if B is greater than A, and is stepped down if B is less than A. The speed 192 of the second spin-up impeller 193 equals the vortex exit/entry ratio of the first vortex 194 multiplied by the speed 190 of the first spin-up impeller 187. In turn, the speed 195 of the third spin-up impeller 196 equals the vortex exit/entry ratio of the second vortex 197 multiplied by the speed 192 of the second spin-up impeller 193. Working fluid that flows through multiple impellers and vortices in series will essentially be sped up or slowed down in distinct steps of angular velocity, hence the title.

(FIGS. 10A through 10C) Blade leading and trailing edge radii determine fluid and impeller rotational speeds in the two radial displacement operations as well. If a process impeller 198 having straight radial blades 199 carries flow 200 from radius A to radius B and from tangential velocity T to $(T \times (B/A))$, and if that flow then passes through a bladeless annular volume 201 from radius B to radius C, its tangential velocity changes from $(T \times (B/A))$ to $((T \times (B/A)) \times (B/C))$ which simplifies to $(T \times (B^2/(AC)))$. Note that if $(CB)=(B/A)$, then $(T \times (B^2/(AC)))=T$. Since all radial flow is in one direction, either C>B>A and fluid is flowing outward 200 from lower to higher pressure (compressor), or C<B<A and fluid is flowing inward from higher to lower pressure (turbine). Fluid tangential velocity increases from impeller entry 202 to exit 203, and then decreases from vortex entry 203 to exit 204, or vice-versa. If the ratio of impeller exit radius to entry radius equals the ratio of vortex exit radius to entry radius, the amount of fluid tangential velocity rise across the impeller will equal the amount of tangential velocity drop across the vortex, or vice-versa. As before, the speed of each successive process impeller 198, 205, 206 equals the speed of the immediate upstream process impeller multiplied by the intermediate vortex exit/entry spin ratio. Since a transit of each impeller-vortex pair involves both an increase and a decrease in fluid tangential velocity, the resultant tangential velocity distribution across several elements can approximate a consistent value 207.

The reader should note that some degree of fluid shear must occur within a radial-flow fluid vortex due to its non-uniform distribution of fluid angular velocities. Fluid shear will generate some amount of viscous energy loss in any real-world fluid. Although that loss need not appreciably impact machine efficiency, it will cause a minor flattening of the radial gradient of fluid angular velocity within each vortex and a small adjustment of its exit/entry spin ratio toward unity. The exact amount of exit/entry spin ratio adjustment will be proportional to fluid viscosity and to severity of the radial gradient of fluid angular velocity, and will likely be inversely proportional to fluid flow rate through the vortex. This effect must be taken into consideration when designing a velocity-stepping turbomachine.

6.1.3—Rotating Structures, Impellers, and Blades (FIGS. 11B, 16A, 16B, 19B, 22A, 22B, 25B, 28A and 28B) Embodiments of the present invention use one or more spin-up impellers to perform fluid spin-up, one or more process impellers to generate pressure rise or drop, and one or more spin-down impellers on top of that to perform fluid spin-down. This can add up. To keep the number of independent rotating structures (rotors) per machine to a minimum, multiple impellers can be carried on each structure. The drawings show several rotating structures 208, 209, 210 that include more than one impeller (per symmetrical half). Where two adjacent rotors are connected to each other by more than one flow path, each fluid vortex between the two must have an exit/entry spin ratio that equals the ratio of downstream rotor speed to upstream rotor speed. If impeller B on rotor 1 is immediately downstream of impeller A on rotor 2, and impeller D on rotor 2 is immediately downstream of impeller C on rotor 1, then the fluid vortex between impellers A and B must have the same exit/entry spin ratio as the vortex between impellers C and D. If that is true, then the ratio of impeller B leading edge radius to impeller A trailing edge radius must equal the ratio of impeller D leading edge radius to impeller C trailing edge radius. In this way design choices about impeller speeds and configurations of rotating structures determine radial proportions of the machine, or vice-versa.

Because working fluid is spun up by crossing one or more spin-up impellers in series, and then spun down again by crossing one or more additional spin-down impellers, and because similar-speed impellers should be joined together on common rotating structures, it turns out that the most effective configuration in which to arrange the multiple rotating structures of a complete machine is to 'nest' them, one inside another. The fastest and smallest structure is in the center and is enclosed by the second fastest, itself enclosed by the third fastest and so on out to the machine casing. Fluid spins up as it penetrates each successive 'shell' in turn until reaching the high-speed interior, and then spins back down as it passes back through each shell to exit the machine.

(FIGS. 11B, 14A through 18B) Although it is generally true that compressors transfer energy from shafts to fluid flows and that turbines transfer energy from fluid flows to shafts, the embodiments each contain one or more impellers that reverse those energy flow trends. In the first primary embodiment, for example, spin-up impellers 211 and process impellers 212, 213 in the compressor transfer energy from shaft to fluid, but spin-down impellers 214, 215, 216 in the compressor transfer energy from fluid to shaft (act as turbine impellers). In the same manner, spin-down impellers 219 and process impellers 217, 218 in the turbine transfer energy from fluid to shaft, but spin-up impellers 220, 221, 222 in the turbine transfer energy from shaft to fluid (act as compressor impellers). This contrast of function becomes important for embodiments of the present invention that involve a turbine driving a compressor, where the normal flow of power from turbine side to compressor side is reversed between some impellers.

6.1.4—Velocity-Dependent Loss & Flow-Pressure Coupling

The key elements of the present invention's solution to the impeller entry and exit problem are: (1) flow paths that cross multiple staggered-speed impellers in series, and (2) radial-flow vortices that speed up or slow down fluid rotation between impellers. Working together, these two elements take fluid from a resting state up to high-speed rotation and back to rest, without involving converging or diverging passages, vector addition, or high fluid shearing rates along flow surfaces.

The velocity-dependent losses that do exist within impellers are due largely to flow velocities and to coriolis effects. Because flow velocities are proportional to machine flow rate, and can be reduced at a given flow rate by use of flow passages with larger cross-sections, energy losses within blade sets are controllable and need not appreciably impact machine efficiency unless machine size is severely constrained for a given flow rate.

Figure 32:
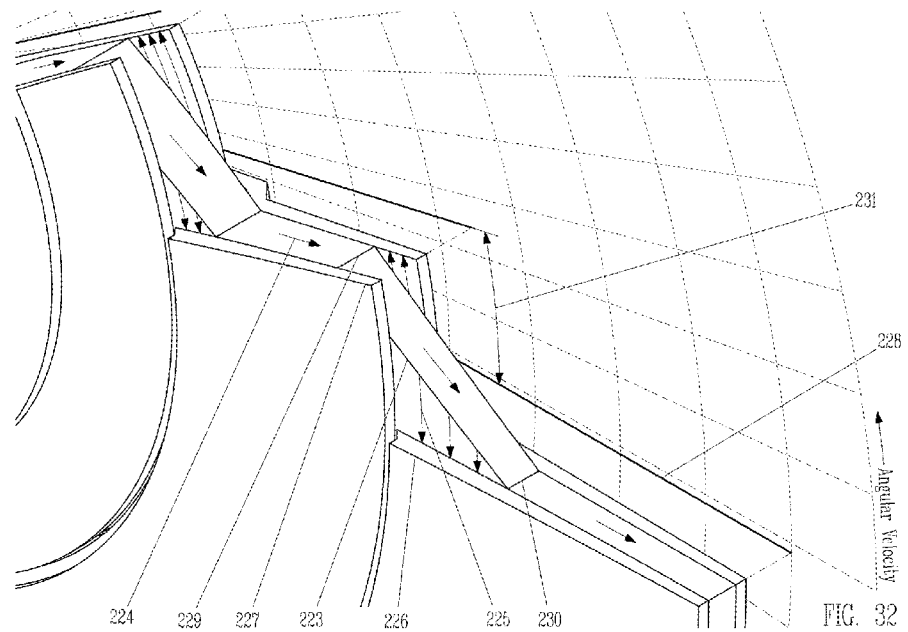
FIG. 32 is a perspective view of a 3D projection of the relative rotational speeds of impellers and fluid vortices along a flow path.

(FIG. 32) Losses are slightly larger within bladeless annular volumes 223, where radial flow velocities 224 are accompanied by a mismatch of angular velocities 225 between fluid and annular walls 226 due to the fact that rotating structures 227 have uniform angular velocities 228 while radial-flow vortices do not. Respective angular velocities of fluid and walls can be equal only at entrance 229 and exit radii 230 of each bladeless annular volume, and must be unequal at all other radii within those volumes. The resulting fluid shearing rates at the annular walls can be limited by reducing the vortex exit/entry spin ratios, and so also reducing the speed differences 231 between upstream and downstream impellers and using more steps to achieve a given overall angular velocity maximum. Fluid shearing rates can also be reduced if upstream rotor walls 227 meet downstream rotor walls 226 at some radial midpoint in each bladeless annular volume 223. Doing so restricts fluid shear velocities on the annular walls to half or less of the total rotational speed difference across the vortex. NOTE: the high-speed process impellers in the machine might not be able to extend rotor walls outside the tip radius of their outer blade edges due to centrifugal stress concerns.

Unlike energy loss mechanisms, certain types of flow-pressure coupling may be advantageous for machines performing certain tasks. The relationship between flow and pressure can be optimized or eliminated altogether, by modifying impeller blade shapes. Because vector addition and converging-diverging flow passages (as they apply to the existing technology) have been eliminated from the present invention, the only remaining design parameter that determines the degree of flow-pressure coupling in a velocity-stepping turbomachine is the shape of the impeller blades.

Impeller blades that are straight and aligned with the radial direction provide complete flow-pressure de-coupling, because variations in flow rate have no effect on fluid tangential velocity distributions within impellers and vortices, and therefore have no effect on total centripetal fluid pressure rise or drop across the machine.

The importance of complete flow-pressure de-coupling is difficult to overstate: fluid pumps and motors, heat engines, heat pumps, etc. can operate at steady pressure differences or cycle pressure ratios while handling a very wide range of working fluid flow rates, and are even capable of handling a complete reversal of flow direction altogether. Fluid pumps can operate under reversed flow to function as motors, and heat engines can be reversed to function as heat pumps (without changing temperature distributions within the machine or within other cycle components such as heat exchangers). This broad tolerance of variation in fluid flow rate and flow direction gives velocity-stepping turbomachines enormous utility and flexibility compared to existing technology, as no existing type of turbomachine can make these claims.

Impeller blades that are angled to the radial direction when viewing the disc face-on will produce some degree of flow-pressure coupling, because the resultant flow velocities through such blades will have some tangential component. By manipulating the blade angle with respect to the radial direction, the designer can control what kind of flow-pressure coupling is produced within impellers, if any is desired. This design feature could prove valuable for specific end uses.

The reader should note that if fluid enters an impeller with some tangential velocity component relative to that impeller, that tangential component must be factored in along with the exit/entry spin ratio of the upstream fluid vortex when calculating the speed ratio between that impeller and the immediate upstream impeller. If fluid leaves an impeller with some tangential velocity component relative to that impeller, that component must be factored in along with the exit/entry spin ratio of the downstream fluid vortex when calculating the speed ratio between that impeller and the immediate downstream impeller. Since tangential components of flow velocity vary with flow rate, impeller speed ratios will also vary with flow rate.

6.1.5—Structural Considerations

If straight radial blades are used in a velocity-stepping turbomachine, they provide additional structural benefits to the present invention. Straight radial blades align their structure with the direction of centrifugal force application, so the blade material can carry centrifugal loads as a combination of tensile and shearing internal stresses. Bending stresses in blades can be limited to those caused by fluid reaction loads, which are much smaller than centrifugal loads unless blade rotational speed is low or fluid density is high. Where bending stresses are a minor factor, blades can be made fairly thin and lightweight. Lightweight blades impose less centrifugal loading on the impeller hubs or discs to which they attach, so those components can also be smaller and lighter. The reader should note that the bending stresses that do occur in blades are not only caused by the fluid reaction loads acting directly on blade surfaces but are also caused by shaft power transfer through rotating structures (fluid reaction loads acting on other blades).

Figures 33A, 33B:
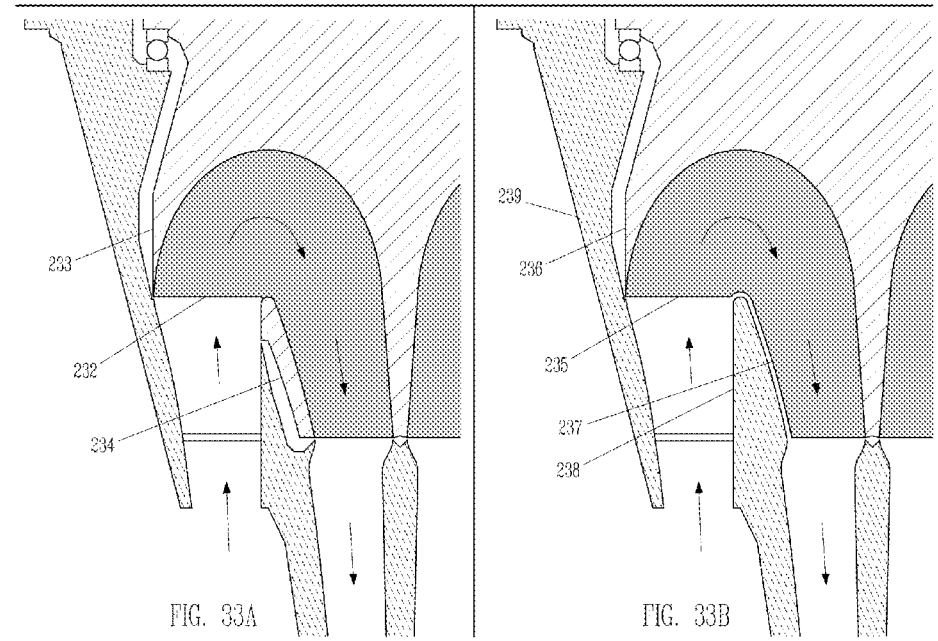
FIG. 33A is a cross-section of a high-speed impeller with shrouded blades.
FIG. 33B is a cross-section of the impeller of FIG. 33A without a blade shroud.

(FIGS. 33A and 33B) The previous statement that velocity-dependent losses within impellers are due largely to flow velocities is based on the assumption that all impeller flow passages are fully enclosed, meaning the blades 232 attach to a rotating structure on both sides of the flow path 233, 234, so that all flow surfaces within impeller flow passages are rotating at impeller speed. This is in contrast to a configuration in which blades 235 are attached on one side only 236 and have a free side 237, with the other end wall 238 being part of an adjacent rotating structure 239 that turns at a different speed. If the second end wall turns at a different speed, fluid shearing rates within impeller flow passages are increased.

In most sets it is essential that blades be attached to both walls to provide mechanical attachment between rotating structures on both sides of the flow path, and to carry shaft power between those structures. The fastest process impeller in the machine, however, is generally a stand-alone structure and therefore might not include a second end wall, for stress reasons. The high centrifugal loading that is imposed on high-speed impeller blades can be carried by the impeller hub. However that same loading acting on a second end wall, one that is rotating at impeller speed and is essentially a disc with a large central hole, could subject it to unacceptably large circumferential stresses. The second wall of the fastest blade set might therefore need to be part of the next slower rotor, with efficiency considerations taking a back seat to structural necessity.

6.1.6—Coriolis Effects (FIG. 34A) The subject of coriolis effects must be considered in this specification. Any mass that rotates about an axis at constant angular velocity while moving radially toward or away from that axis is subjected to a coriolis acceleration acting in the tangential direction that equals twice the mass's angular velocity multiplied by its radial velocity. The flows within each impeller of the present invention experience this situation, and are therefore subjected to the coriolis acceleration. In fact the reaction loading on the impeller blades 240 resulting from this acceleration is the basis for how energy transfer between shaft and fluid occurs within every impeller. As always, a fluid volume responds to an applied acceleration by forming an internal pressure gradient that is aligned with the acceleration vector. In this case, the acceleration vector and the resultant pressure gradient are perpendicular to the direction of fluid flow through the impellers, resulting in a tangential gradient of flow velocity. Impeller flow passages 241 in which fluid is moving away from the rotational axis will have higher flow velocities 242 toward the spinward side of the passage and lower flow velocities 243 toward the anti-spinward side, while passages in which fluid is moving toward the rotational axis will have lower flow velocities to spinward 244 with higher velocities to anti-spinward 245. The tangential gradient of flow velocity is independent of fluid flow rate: at sufficiently low flow rates the fluid on the slow side of the passage will reverse its radial flow direction.

(FIG. 34B) This pattern may be simply thought of as a coriolis-induced secondary flow: a fluid rotation 246 opposite the direction of impeller rotation 247 that is superimposed on the radial fluid motion within each flow passage. The secondary flow creates an exit deviation: fluid flow exiting an impeller will 'slip' 248 to an angular velocity slightly less than that of the impeller if it is moving away from the rotational axis during exit, or it will 'slip' 249 to an angular velocity slightly greater than that of the impeller if it is moving toward the axis during exit. The percentage slip that occurs is proportional to the blade spacing in the impeller. With regard to the present invention, the reader should note that the ratio of rotational speeds of a downstream impeller and an upstream impeller is determined not only by the intermediate vortex exit/entry spin ratio, but is also determined by the amount of coriolis slip that occurs as fluid exits the upstream impeller. Toward the goal of facilitating larger speed ratios between adjacent pairs of impellers, all flow sections in which outward radial flow turns around to become inward radial flow, or vice-versa, are shown as being contained within impeller blades and not within bladeless annular volumes. In placing each outward/inward radial flow switchback within the blades of an impeller, a performance advantage might be gained: coriolis slip that is added to vortex exit/entry spin ratios instead of being subtracted from them.

(FIGS. 16B, 22B, 28B) The reader should note that excessive coriolis-induced secondary flows within impeller flow passages are undesirable, because very large tangential gradients of flow velocity can create high fluid shearing rates at passage walls. The best way to control these secondary flows is by increasing the number of blades per impeller to decrease blade spacing, but blades that are too closely spaced together present excessive solid surface areas to the flow, thereby magnifying losses caused by flow velocities. At a given overall flow rate, optimal blade spacing exists at the ideal trade-off between minimal secondary flow strength and minimal surface area. For impellers 211, 219, 250, 251 that have large outer/inner radius ratios, achieving optimal blade spacing may require the insertion of partial blades 252 that extend from the impeller's outer radius to halfway to its inner radius. These partial blades reduce the large blade spacing at outer radii without creating unnecessarily close blade spacing at inner radii.

6.1.7—Materials

Material selection for fabrication of the present invention is informed by the operating conditions being imposed on machine components. The primary conditions of concern are (1) high centrifugal loading on moving parts resulting from high rotational speeds, and (2) possible temperature extremes, both high and low, resulting from use of certain thermodynamic cycles or working fluids. For end uses that demand the largest possible pressure change or ratio from a single machine, the fastest impellers in that machine must rotate at the highest possible speed allowed by material stress limits. For impellers and rotating structures that are subject to high centrifugal loads and to high-temperature fluids, material selection is well informed by the best practices used by manufacturers of gas turbine engines. Suitable choices include stainless steels, alloys of titanium, nickel or cobalt, ceramic composites, etc. Where high centrifugal loads are experienced at cooler temperatures, the primary qualifying criteria is the ratio of material strength to density. Suitable choices include carbon, Kevlar or glass fiber composites and other composite materials. Some exotic carbon fiber composites may be suitable for high temperatures. For impellers and related structures that rotate more slowly at cooler temperatures, cheaper materials such as aluminum alloys, steel, and even high-density plastics are suitable. Components that are subjected to cryogenic environments should be fabricated from materials appropriate for use at those temperatures, such as aluminum, copper, nickel, titanium and the alloys thereof, austenitic stainless steels, glass fiber composites, etc. Anticipated operating temperatures can generally determine material selection for machine casings, as casing stresses are primarily a function of internal fluid pressure distributions and need not be as severe as centrifugal stresses.

6.2) Variations on the Basic Invention

6.2.1—First of Three Primary Embodiments (FIGS. 11A, 11B, 13A through 18B) Using various permutations of the alternating impeller-vortex flow path, and encompassing the four basic operations, three primary embodiments are established here. The first primary embodiment is a compressor being driven by a turbine. The turbine and compressor have a common rotational axis 253 and are essentially mirror images of each other across a plane of symmetry 254, creating two symmetrical halves of a complete machine. This embodiment is useful as a heat engine, heat pump, or other machine that performs a thermodynamic cycle, or simply one that transfers energy from one fluid flow to another. The compressor half 255 of this embodiment (1) spins up working fluid at inner radii through one or more outward-flow spin-up impellers 211 and one or more inward-flow vortices 256, (2) generates centripetal pressure rise through one or more outward-flow process impellers 212, 213 and one or more outward-flow vortices 257, and (3) slows fluid rotation back down at outer radii through one or more inward-flow spin-down impellers 214, 215, 216 and one or more outward-flow vortices 258. The turbine half 259 performs these exact steps in reversed flow: spin-up at outer radii, pressure drop through inward flow, and slow-down at inner radii. Every inward-flow impeller in one half of the machine powers its outward-flowing symmetrical counterpart in the other half of the machine. Shaft power is transferred from the inner and mid-radii impellers of the turbine half to their symmetrical counterparts, and a smaller amount of energy is transferred in the other direction, from the outer-radii impellers of the compressor half to their symmetrical counterparts. Impellers are grouped by speed so that each group can be carried on a single rotating structure. These structures span both symmetrical halves and provide the physical means for shaft power transfer between halves. Each rotating structure is enclosed within the next structure out, and each spins faster than the one enclosing it, with the outermost structure being enclosed by the casing 260. The complete assembly shows 5 independent rotating structures 261, 262, 208, 263, 264, which each have their own drawing sheet. The quantity of total fluid pressure rise and drop that can be provided by the first primary embodiment is limited by allowable machine outer diameter and by allowable rotor speeds.

Figure 12:
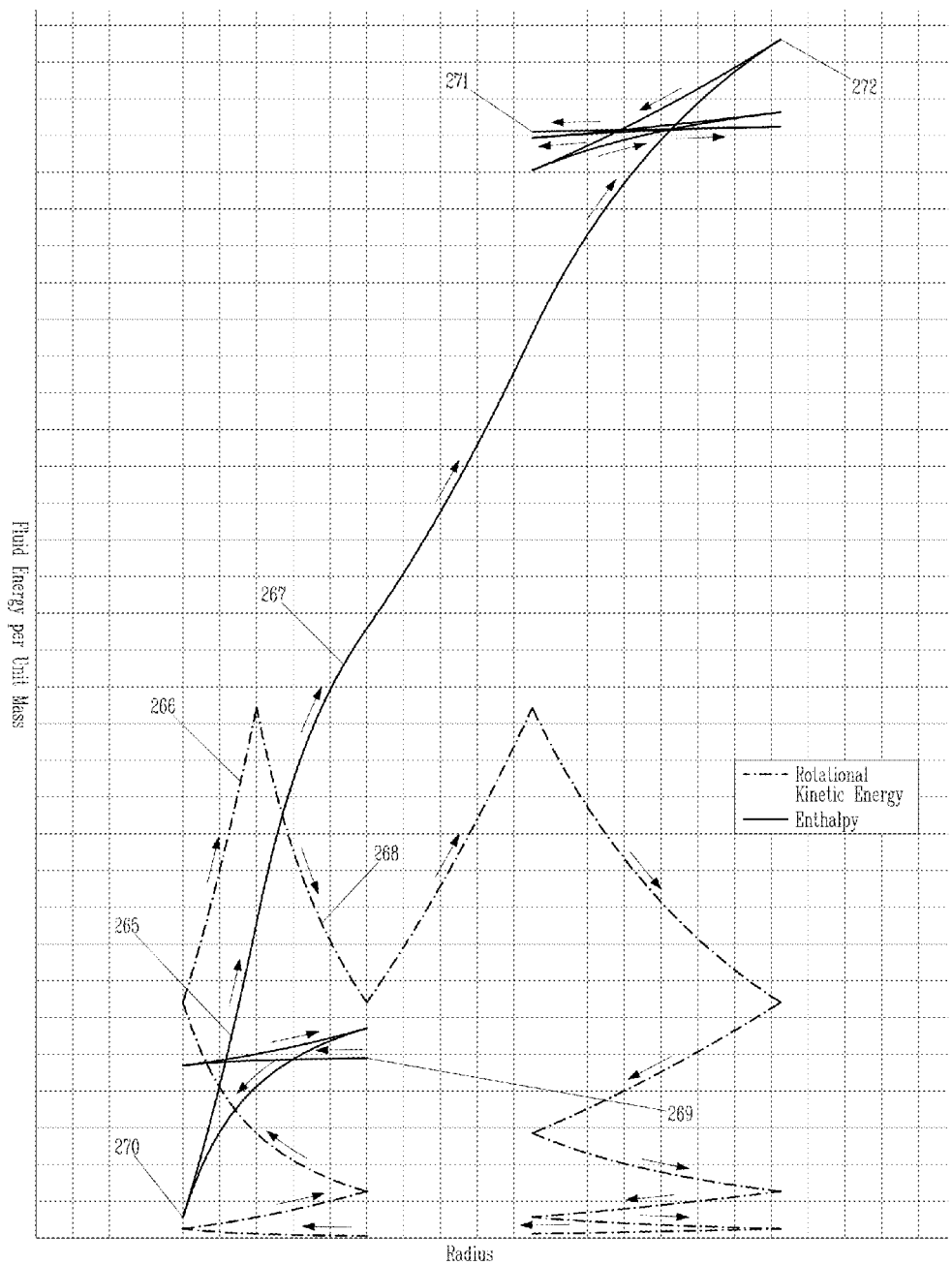
FIG. 12 is a dual plot of fluid kinetic energy and enthalpy vs. fluid radius representing flow through the compressor half of the first primary embodiment of the present invention.
Figure 13A:
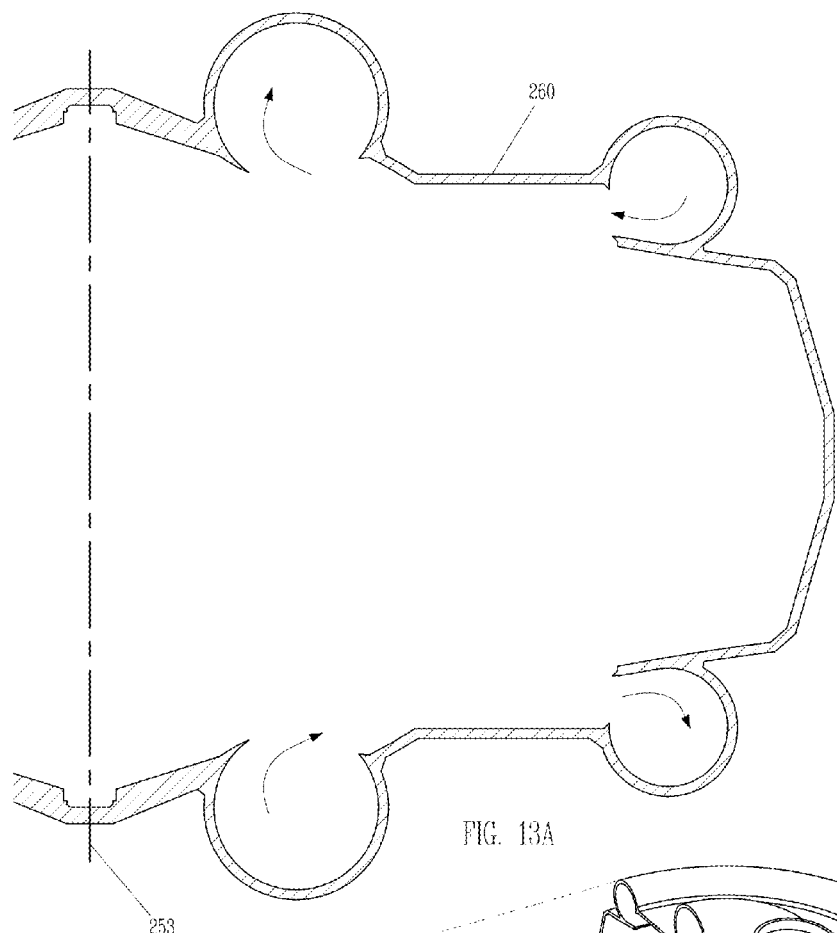
FIG. 13A is a cross-section of the casing of the first primary embodiment.
Figure 13B:
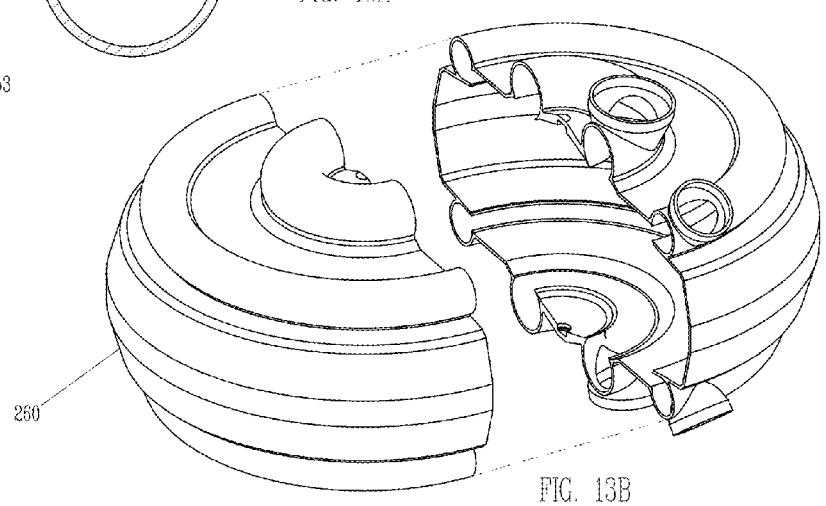
FIG. 13B is an exploded perspective view of the casing of FIG. 13A.
Figures 14A, 14B:
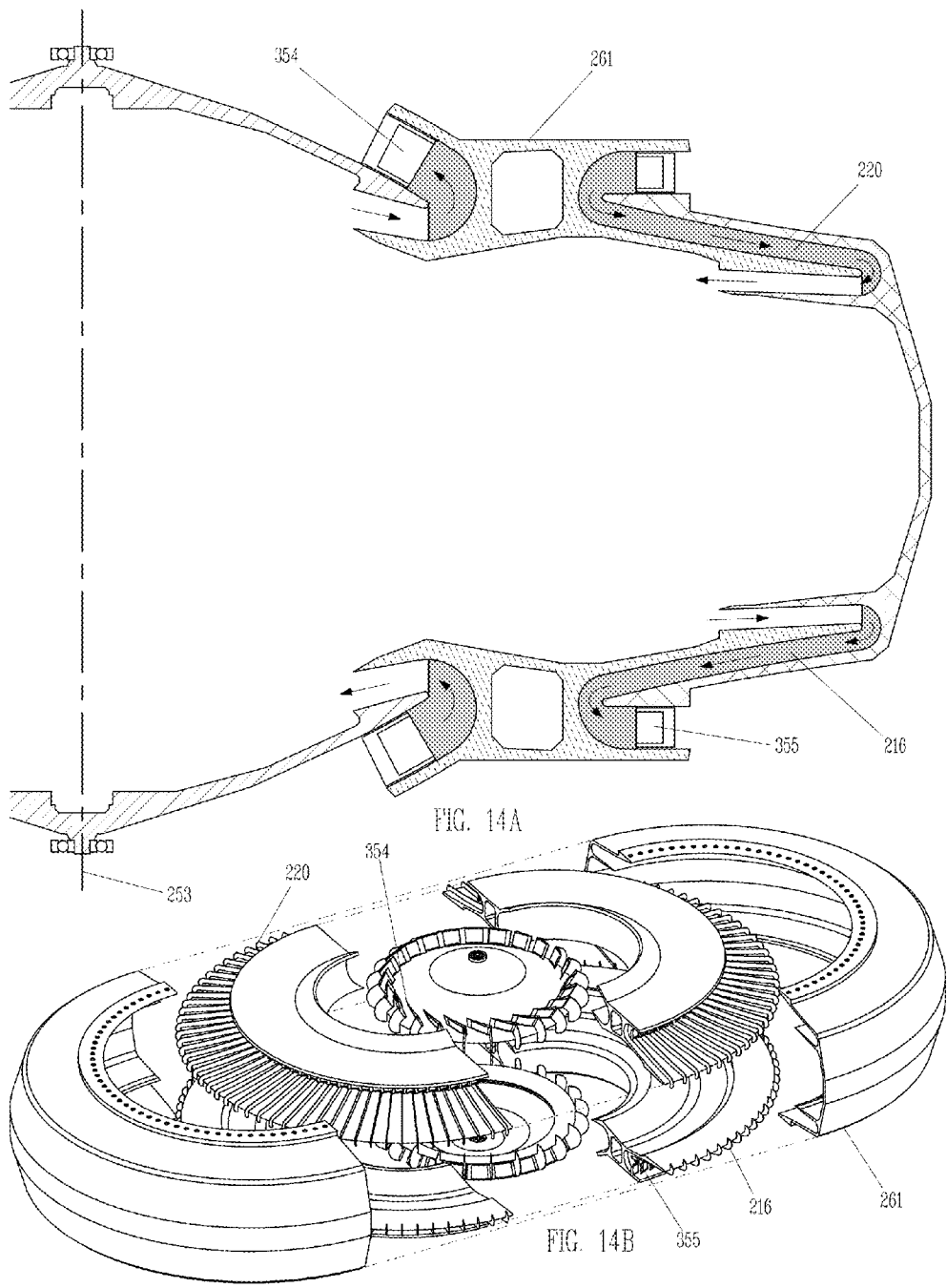
FIG. 14A is a cross-section of the rotating structure of the outermost and slowest impellers of the first primary embodiment.
FIG. 14B is an exploded perspective view of the rotating structure of FIG. 14A.
Figure 15A:
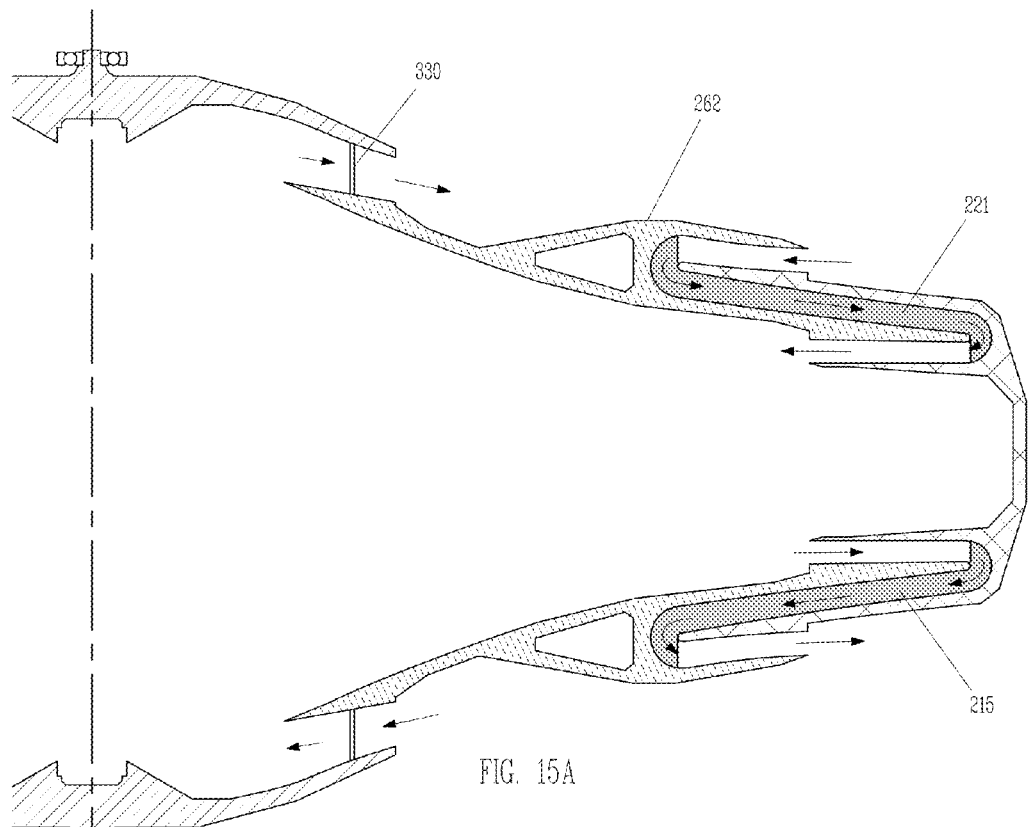
FIG. 15A is a cross-section of the rotating structure of the second-slowest impellers of the first primary embodiment.
Figure 15B:
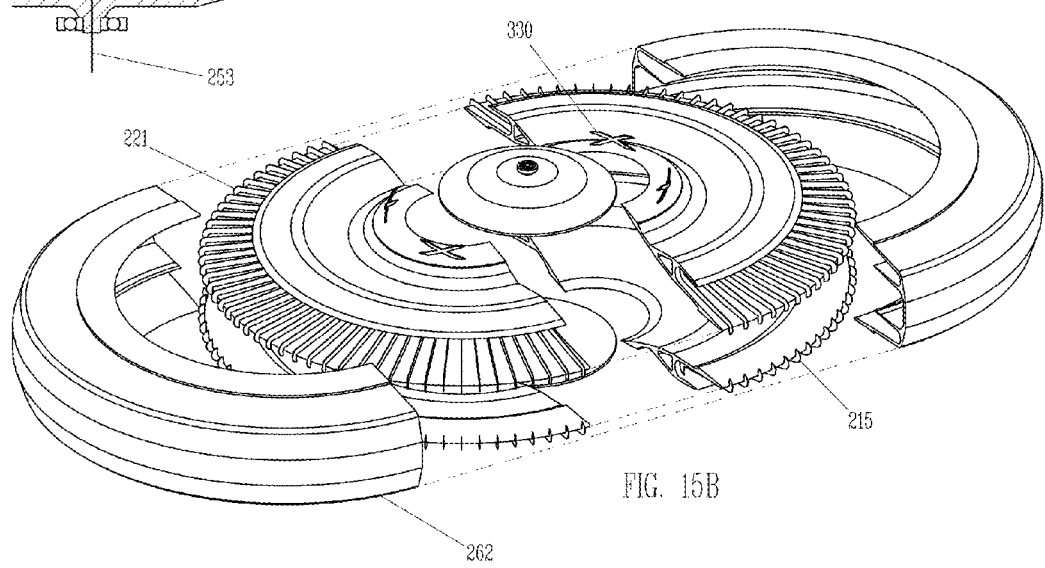
FIG. 15B is an exploded perspective view of the rotating structure of FIG. 15A.
Figure 16A:
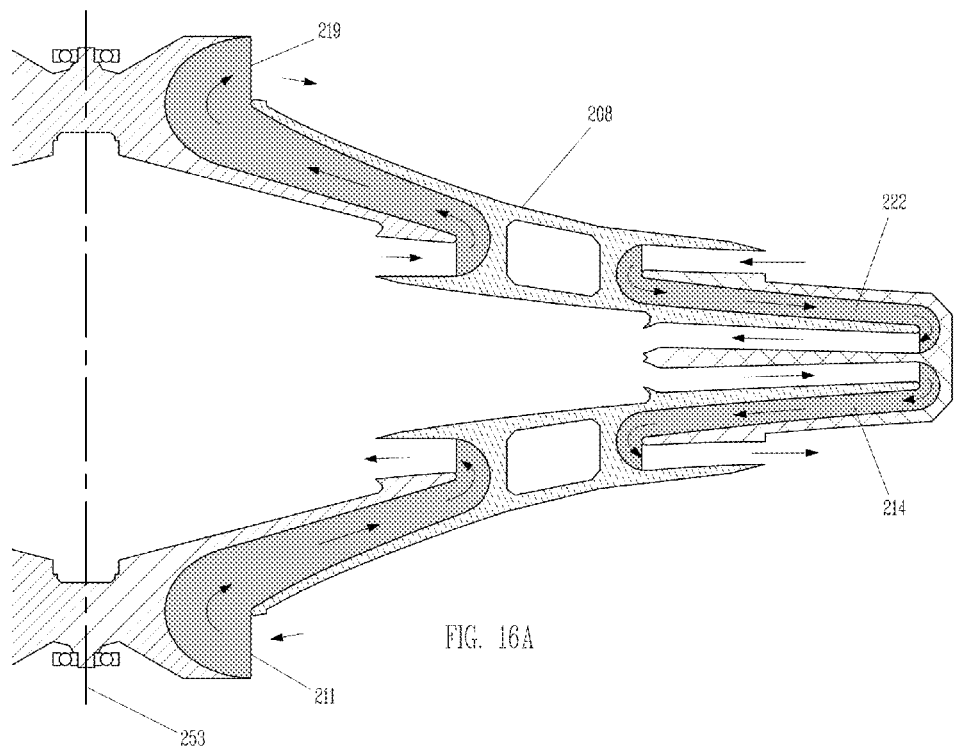
FIG. 16A is a cross-section of the rotating structure of the mid-speed impellers of the first primary embodiment.
Figure 16B:
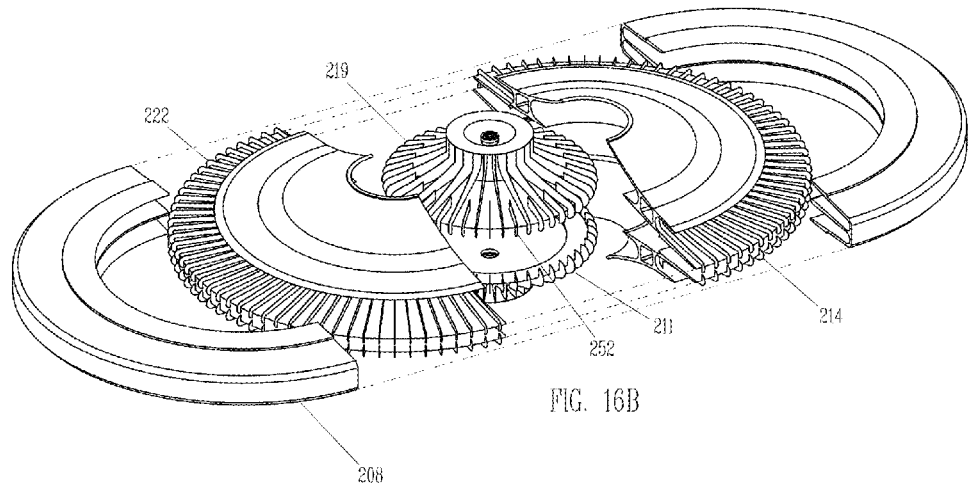
FIG. 16B is an exploded perspective view of the rotating structure of FIG. 16A.
Figure 17A:
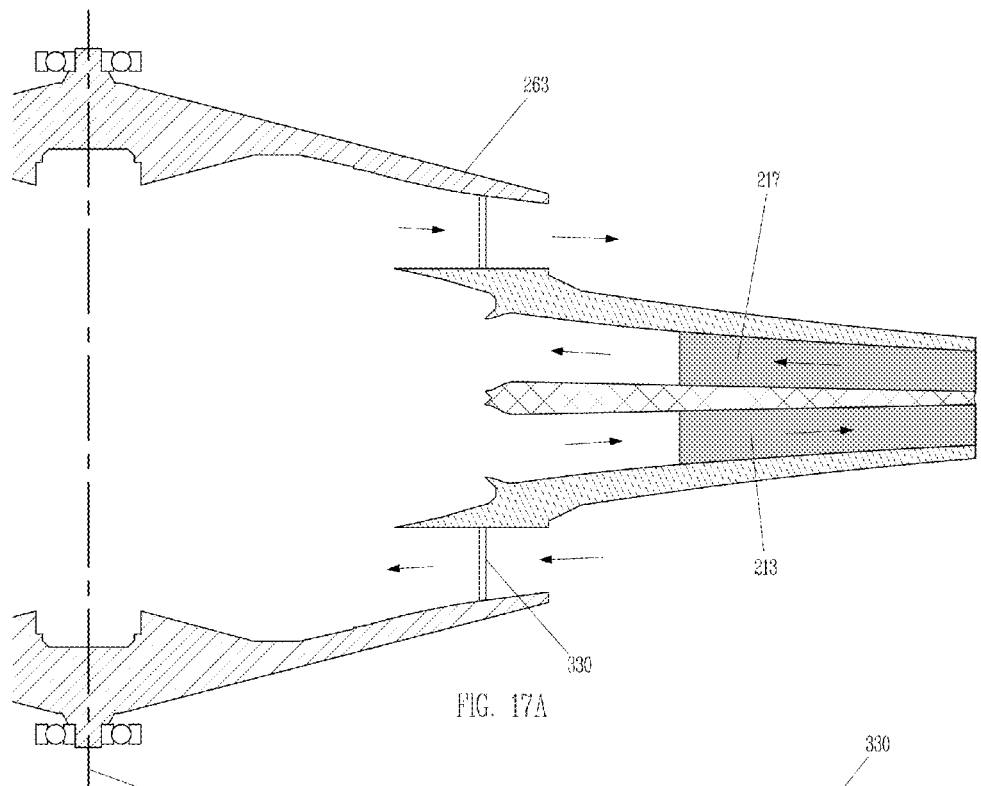
FIG. 17A is a cross-section of the rotating structure of the second-fastest impellers of the first primary embodiment.
Figure 17B:
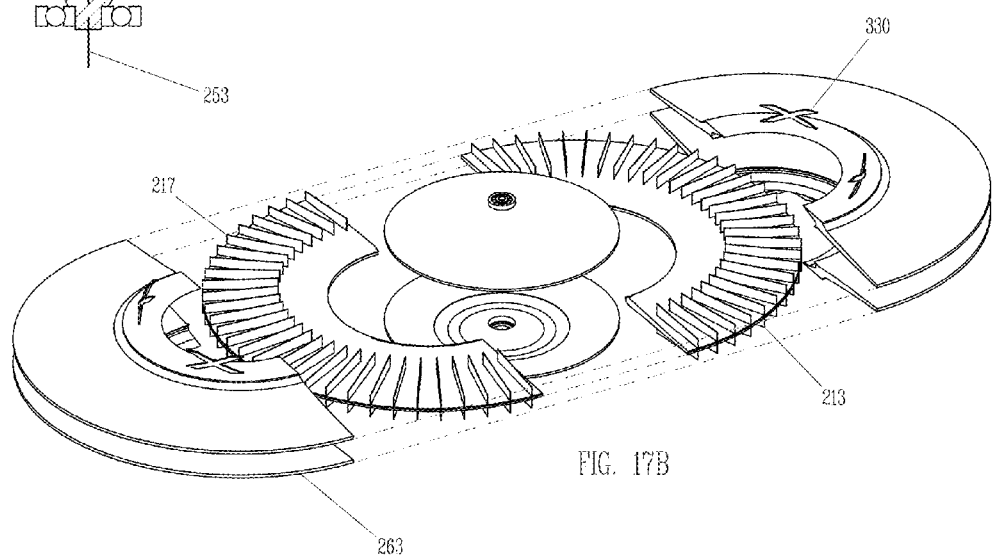
FIG. 17B is an exploded perspective view of the rotating structure of FIG. 17A.
Figures 18A, 18B:
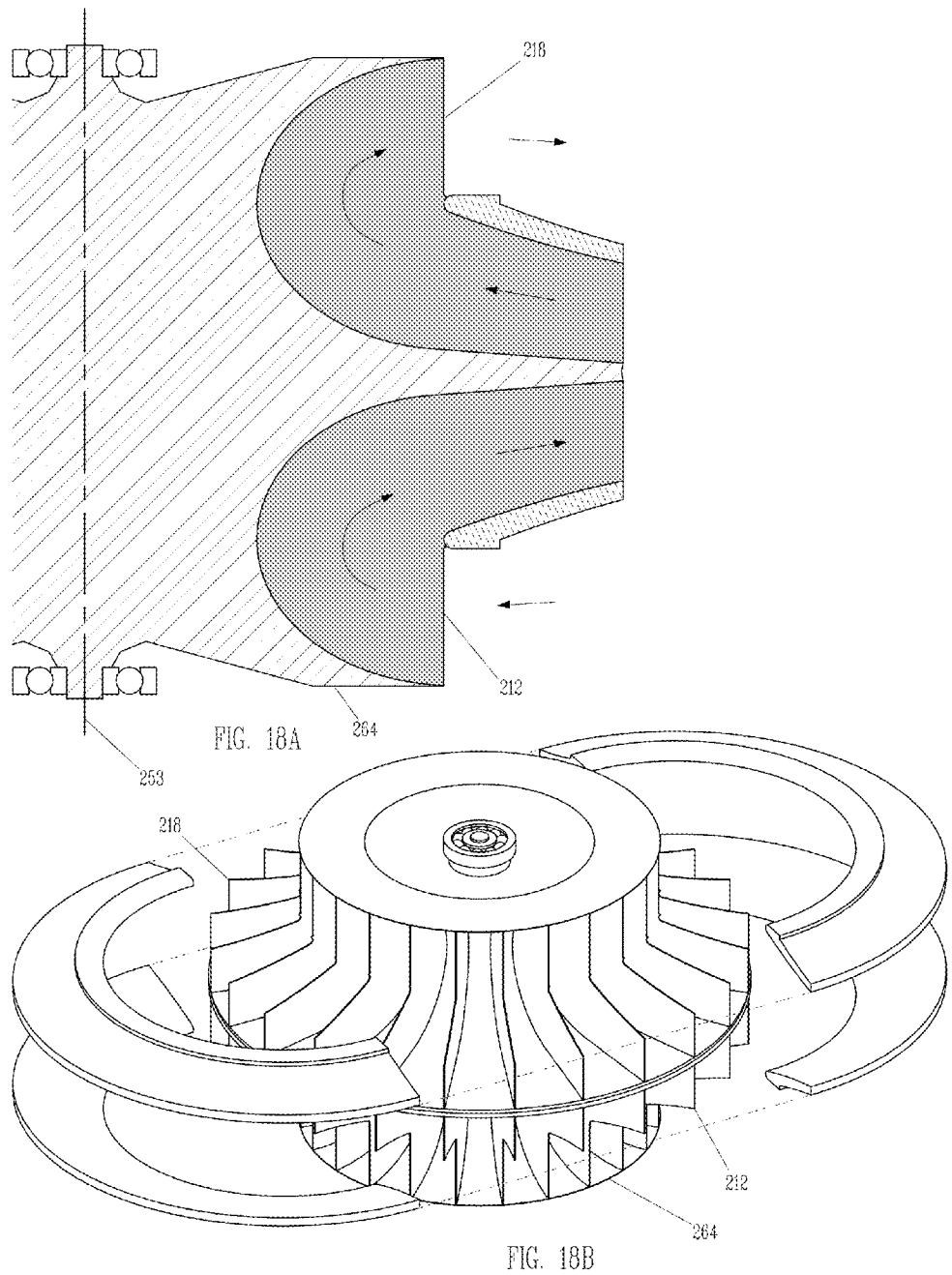
FIG. 18A is a cross-section of the rotating structure of the fastest and innermost impellers of the first primary embodiment.
FIG. 18B is an exploded perspective view of the rotating structure of FIG. 18A.
Figure 19A:
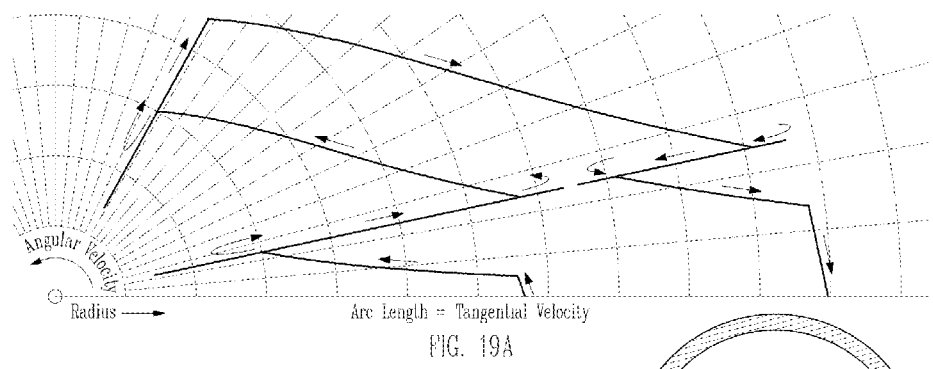
FIG. 19A is a polar coordinate plot of fluid angular velocity vs. fluid radius representing flow through the second primary embodiment of the present invention.
Figure 19B:
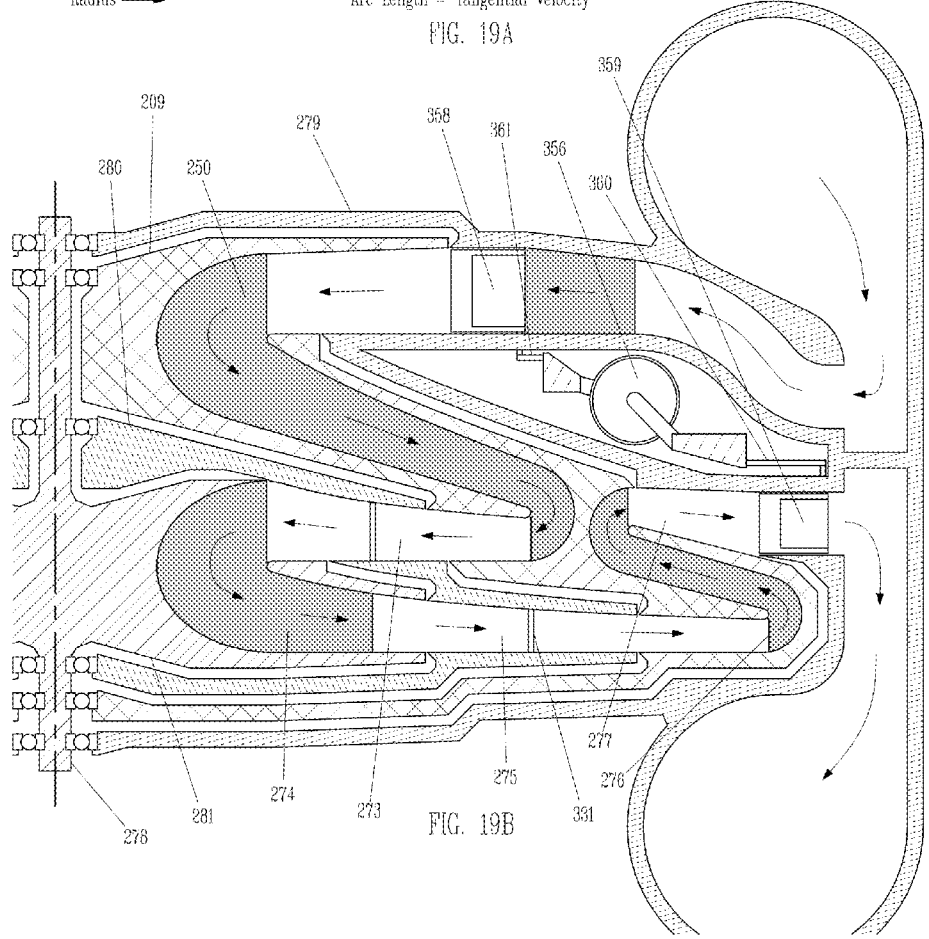
FIG. 19B is a cross-section of the second primary embodiment of the present invention, showing three independent rotating structures and a casing.

(FIG. 12) Overlaid plots of fluid rotational kinetic energy vs. fluid radius and of enthalpy vs. fluid radius show the various energy exchanges that occur within the compressor half of the first primary embodiment. In the plots, enthalpy and kinetic energy are shown to increase or decrease in unison across each impeller (e.g. 265 & 266), and are shown as having opposite slopes across each vortex (267 & 268). Enthalpy shows an expected net increase across this adiabatic compression, while kinetic energy is stepped up to the higher values at inner radii and is stepped back down at outer radii. The reader should note that the intake enthalpy 269 is not the lowest 270 in the machine, and the exhaust enthalpy 271 is not the highest 272. These same plots, with flow arrows reversed, describe the adiabatic expansion in the turbine half.

6.2.2—Second Primary Embodiment (FIGS. 19A, 19B, 21A through 24B) The second primary embodiment is a compressor in which one impeller receives external power input on a shaft, perhaps from an electric motor or other mechanical power source. The second primary embodiment is also a turbine in which one impeller produces external power output on a shaft, perhaps to turn a generator or otherwise act as a mechanical power source. All other impellers in this embodiment must power (or be powered by) each other. Other than these features, the second primary embodiment functions in a manner similar to the first. When operating as a compressor, it: (1) spins up working fluid at inner radii through one or more outward-flow spin-up impellers 250 and one or more inward-flow vortices 273, (2) generates centripetal pressure rise through one or more outward-flow process impellers 274 and one or more outward-flow vortices 275, and (3) slows fluid rotation back down at outer radii through one or more inward-flow spin-down impellers 276 and one or more outward-flow vortices 277. When operating as a turbine, it performs these exact steps in reversed flow: spin-up at outer radii, pressure drop through inward flow, and slow-down at inner radii. The process impeller 274 is secured to the input/output shaft 278. Each inward-flow spin-down impeller 276 that is downstream of the fastest impeller powers a dedicated outward-flow spin-up impeller 250 that is upstream of the fastest. Each driven and driving pair of impellers is carried on an independent rotating structure. As before, each rotating structure is enclosed within the next structure out, and each spins faster than the one enclosing it, with the outermost structure being enclosed by the casing 279. The complete assembly shows 3 independent rotating structures 209, 280, 281, which each have their own drawing sheet. The quantity of total fluid pressure rise and drop that can be provided by the second primary embodiment is limited by the speed of the input/output shaft.

The input/output shaft is secured to the high-speed process impeller because that impeller is responsible for performing the compression or expansion process. The spin-down impellers downstream of the process impeller are used to recover some of the fluid kinetic energy that leaves the process impeller and recycle that energy back into the flow via the spin-up impellers. Any kinetic energy wastage is viewed as a percentage of the input/output shaft power in calculating overall energy efficiency.

Because all impellers other than the process impeller must power each other, their configuration is constrained by the unique problem of radial spread. Radial spread happens because: (1) impeller powers must be balanced between driven and driving impellers, and (2) all vortices between two particular rotating structures must have the same exit/entry spin ratio. Impeller power (with straight radial blades) equals blade outer edge radius squared minus blade inner edge radius squared, multiplied by the set's angular velocity squared and by its fluid mass flow rate. Because each rotating structure has a uniform angular velocity and because all impellers in the second primary embodiment experience the same fluid mass flow rate, balancing of impeller powers between driven and driving impellers requires that one impeller's outer blade radius squared minus inner blade radius squared must equal that of the other impeller. For rotating structures having one impeller further from the rotational axis than the other, this means that the impeller further out must have a smaller leading-to-trailing-edge radial distance than the impeller closer in. Meanwhile, fluid vortices further from the rotational axis must cover a larger radial distance than vortices closer in if both are to have the same exit/entry spin ratio.

(FIGS. 35A and 35B) Now consider the basic architecture of the second primary embodiment: the high-speed process impeller 282 places its trailing edges at some radial distance from its leading edges, and the two fluid vortices 283, 284 that separate it from the two second fastest impellers add to that radial difference because both vortices must have the same exit/entry spin ratio. The two second-fastest impellers 285, 286 then further add to that radial distance because their powers must balance, and so forth to the next two fluid vortices 287, 288 and the third-fastest impellers 289, 290, if they exist. This is radial spread, and it results in one of two machine geometries: (1) the flow path 291 on one side of the process impeller gets further from the rotational axis 292 across every impeller-vortex pair, or (2) the flow path 293 on the other side of the process impeller gets closer to the rotational axis 294 across every impeller-vortex pair. The drawings of the second primary embodiment show it as having that first radial spread geometry and therefore locating the process impeller at the machine's inner radii. The inventor chose to illustrate this option because it has a fundamental energy efficiency advantage over the second spread geometry. In turn, the second radial spread geometry has an input/output torque advantage over the first, so both geometries can be viable options.

Figure 20:
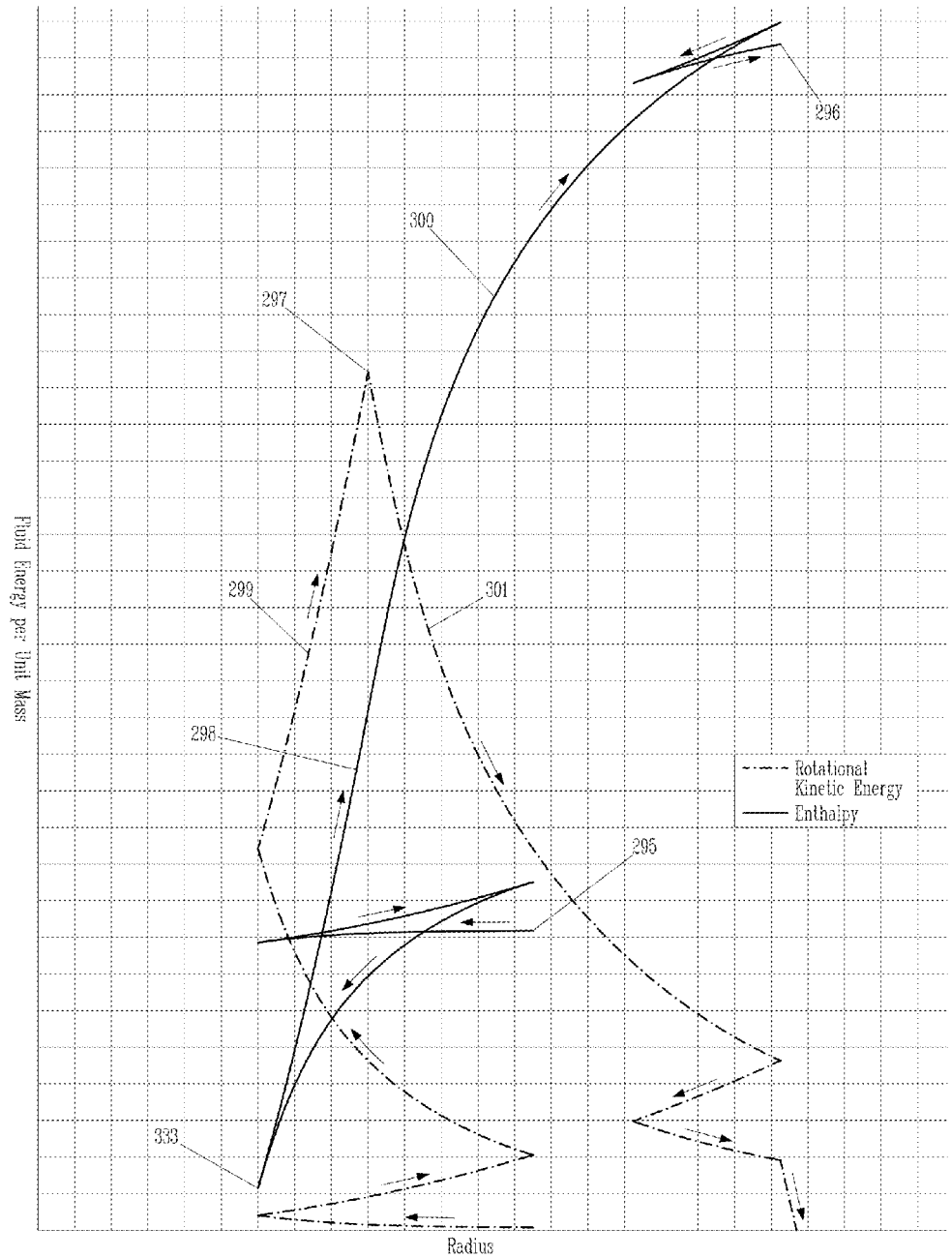
FIG. 20 is a dual plot of fluid kinetic energy and enthalpy vs. fluid radius representing flow through the second primary embodiment of the present invention.
Figures 21A, 21B:
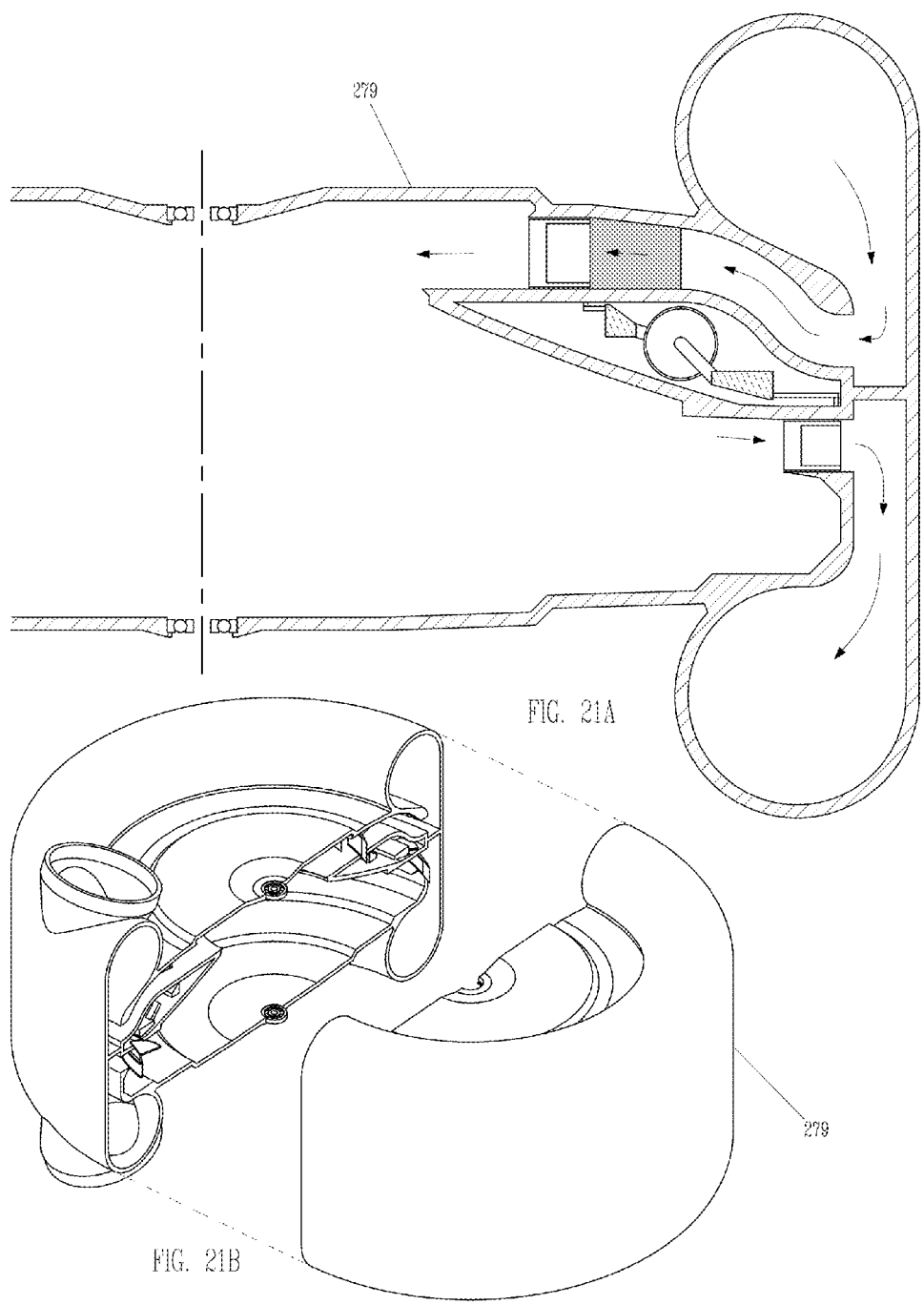
FIG. 21A is a cross-section of the casing of the second primary embodiment.
FIG. 21B is an exploded perspective view of the casing of FIG. 21A.
Figure 22A:
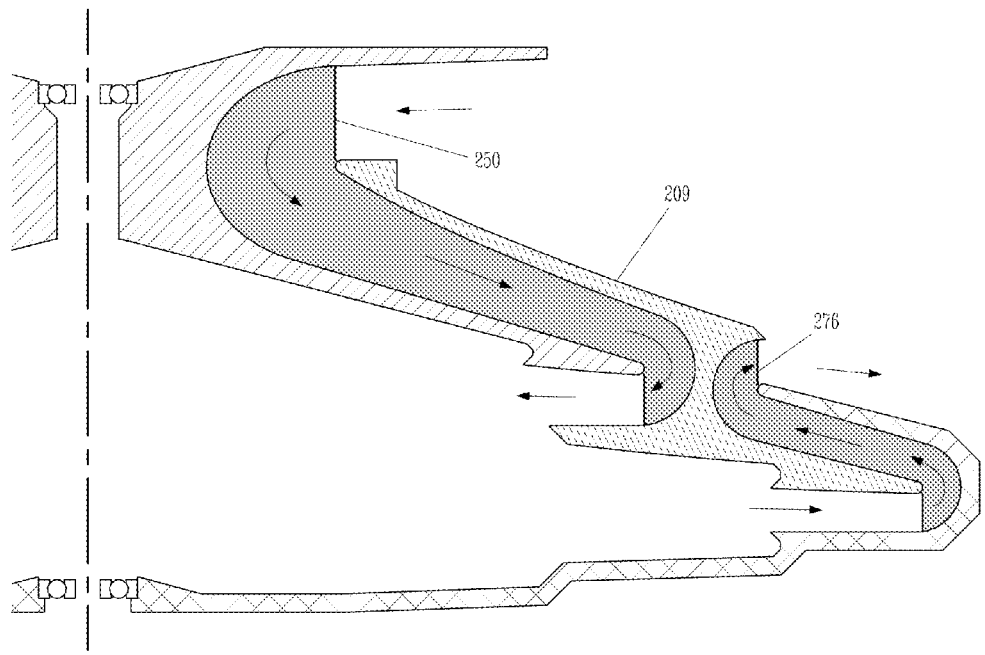
FIG. 22A is a cross-section of the rotating structure of the low-speed outer impellers of the second primary embodiment.
Figure 22B:
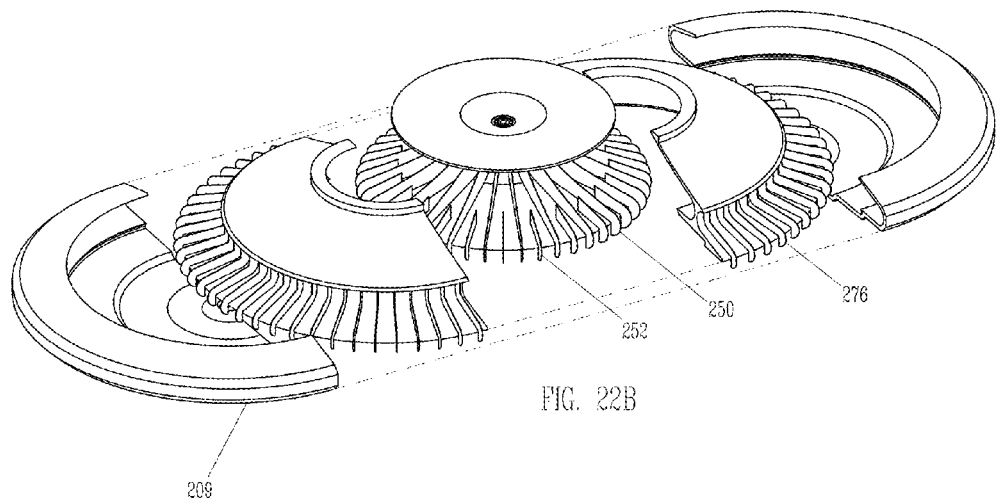
FIG. 22B is an exploded perspective view of the rotating structure of FIG. 22A.
Figure 23A:
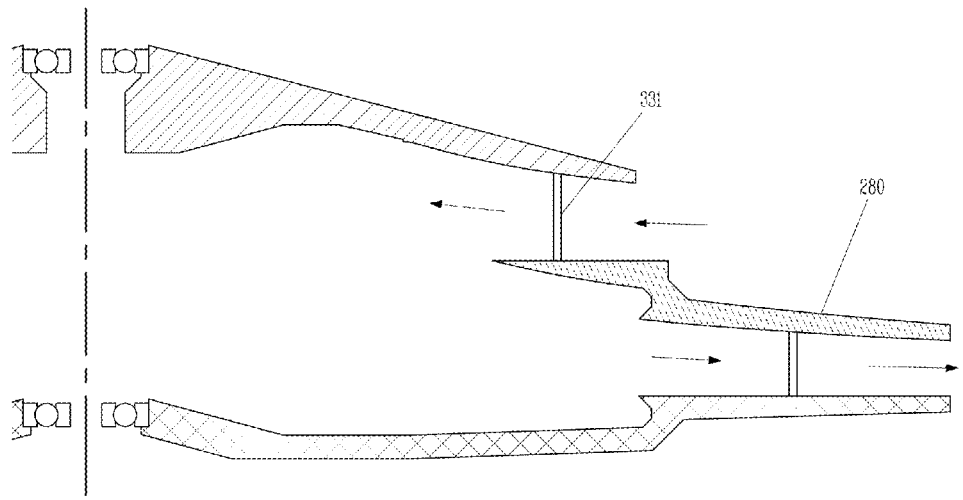
FIG. 23A is a cross-section of the freewheeling mid-speed rotating structure of the second primary embodiment.
Figure 23B:
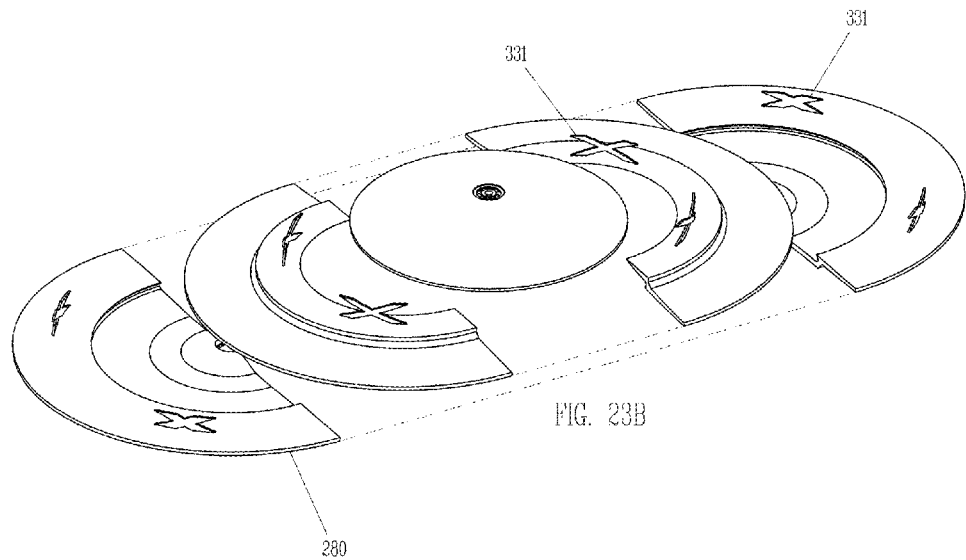
FIG. 23B is an exploded perspective view of the rotating structure of FIG. 23A.
Figure 24A:
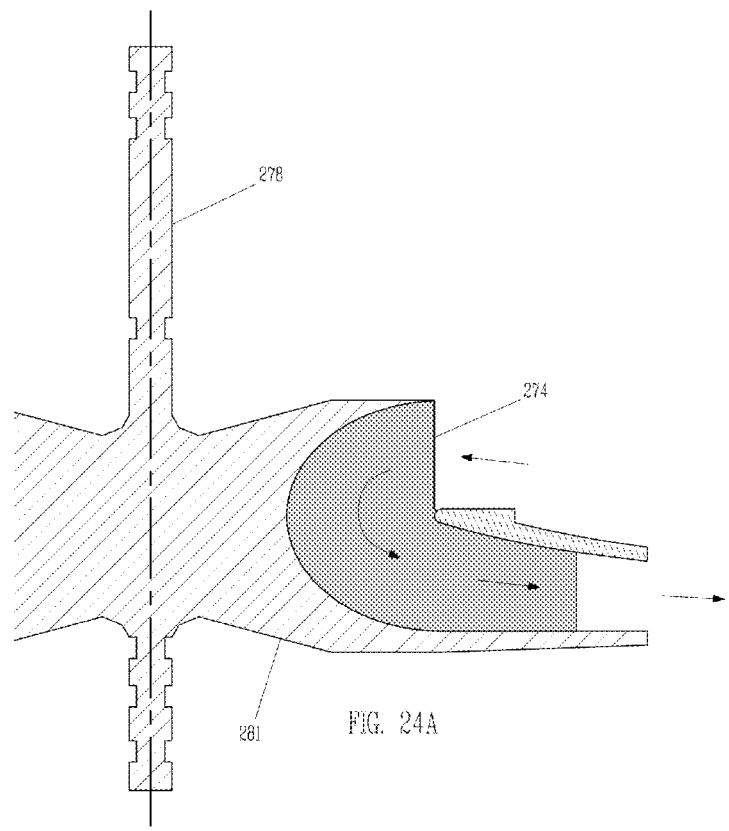
FIG. 24A is a cross-section of the input/output shaft and rotating structure of the high-speed inner impeller of the second primary embodiment.
Figure 24B:
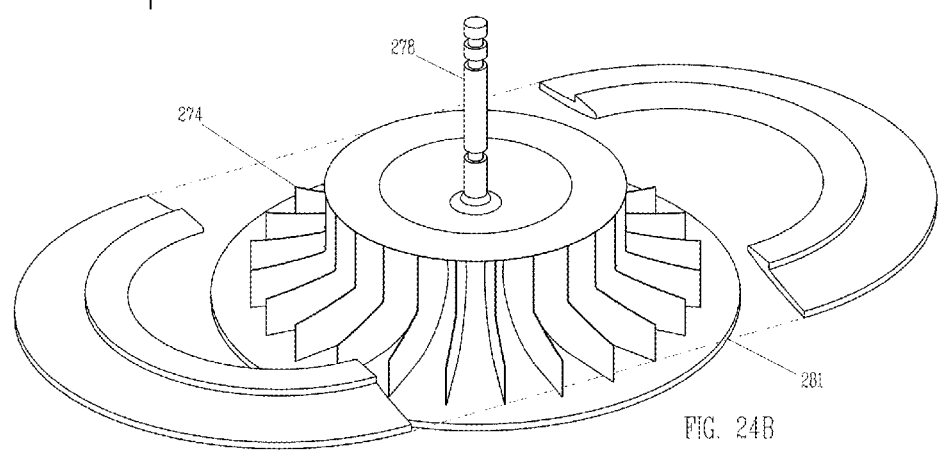
FIG. 24B is an exploded perspective view of the shaft and rotating structure of FIG. 24A.
Figures 25A, 25B:
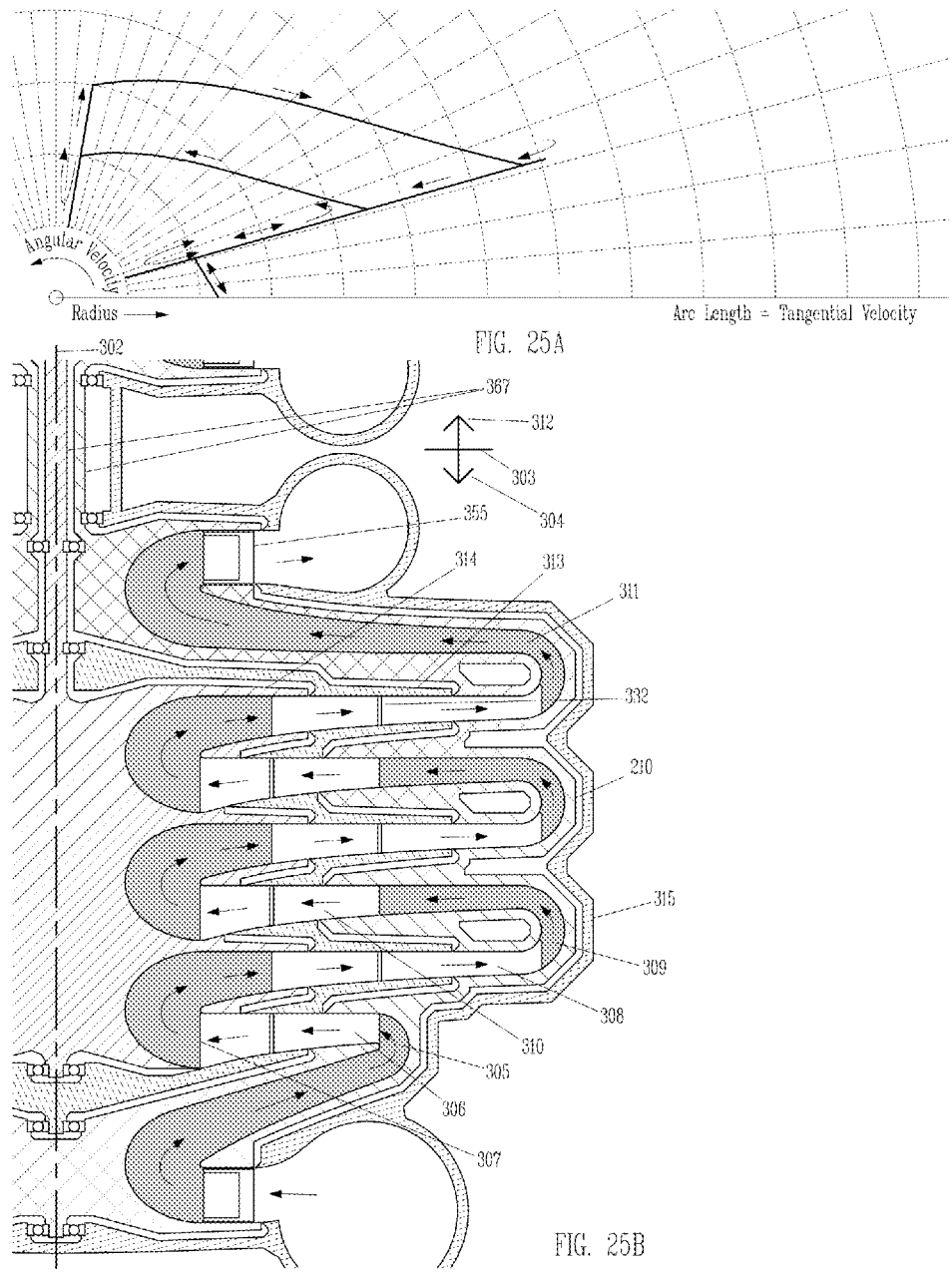
FIG. 25A is a polar coordinate plot of fluid angular velocity vs. fluid radius representing flow through the compressor half of the third primary embodiment of the present invention.
FIG. 25B is a cross-section of the third primary embodiment of the present invention, showing three independent rotating structures and a casing.

(FIG. 20) Plots of fluid kinetic energy and enthalpy for the second primary embodiment show that total enthalpy increase from inlet 295 to outlet 296 is smaller relative to maximum impeller tip kinetic energy 297, when compared to the first primary embodiment. As before, enthalpy and kinetic energy increase or decrease in unison across each impeller (e.g. 298 & 299), and have opposite slopes across each vortex (300 & 301). As before, these same plots in reverse describe the adiabatic expansion performed by the second primary embodiment when operating as a turbine.

6.2.3—Third Primary Embodiment (FIGS. 25A, 25B, 27A through 30B) The third primary embodiment is similar to the first in that it is a compressor being driven by a turbine, the turbine and compressor again having a common rotational axis 302 and being mirror images of one another across a plane of symmetry 303. Unlike the first and second primary embodiments, which generate fluid pressure change across a single large radial displacement, the third primary embodiment generates fluid pressure change as the net product of several consecutive radial displacements of alternating directions. In the compressor half 304 of this embodiment, working fluid: (1) spins up through one or more outward-flow spin-up impellers 305 and one or more inward-flow vortices 306, (2) crosses a centripetal pressure rise through one or more outward-flow process impellers 307 and one or more outward-flow vortices 308, and then (3) crosses a smaller centripetal pressure drop through one or more inward-flow spin-down impellers 309 and one or more inward-flow vortices 310 to return to inner radii where it can repeat step 2 further down the rotational axis. After enough cycles between steps 2 and 3, the fluid finally slows down through one or more inward-flow spin-down impellers 311 and possibly one or more outward-flow vortices (not shown). The process impeller(s) involved in step 2 add a large amount of energy to the flow, while the spin-down impeller(s) involved in step 3 take some of that energy back out. As before, the turbine half 312 performs these exact steps in reversed flow. The linking of compressor to turbine to form a complete machine allows the low-power step 3 spin-down impellers of the compressor to drive those of the turbine, and allows the high-power step 2 process impellers of the turbine to drive those of the compressor. Again, impellers are grouped by speed to be carried on common rotating structures that span both machine halves and provide means for shaft power transfer. The drawings show 3 independent rotating structures 210, 313, 314 enclosed within a casing 315, each having its own drawing sheet. Drawings of the third primary embodiment show only the compressor half of the assembly and each structure. The quantity of total fluid pressure rise and drop that can be provided by the third primary embodiment is limited only by how many outward-and-inward radial cycles it can include. The drawings show an assembly having 3 outward-and-inward radial cycles.

The large central radial displacements of the first and second primary embodiments inevitably dictate a machine of larger relative diameter and smaller relative axial length. The repeated radial cycling of the third primary embodiment sets up a machine of smaller relative diameter and larger relative axial length. This correlates with the typical proportions of existing gas turbines, steam turbines and some other turbomachines, so the third primary embodiment can serve as a drop-in replacement for such equipment, able to fit into existing compartments, nacelles, buildings, etc.

The third primary embodiment might be adapted to be capable of power input/output on a single shaft, providing an alternative to the second primary embodiment. This would require the use of mechanical gears, such as a planetary gear system, to exchange shaft power between the process impellers and the outer radii impellers so as to eliminate the need for the second symmetrical half of the machine.

Figure 26:
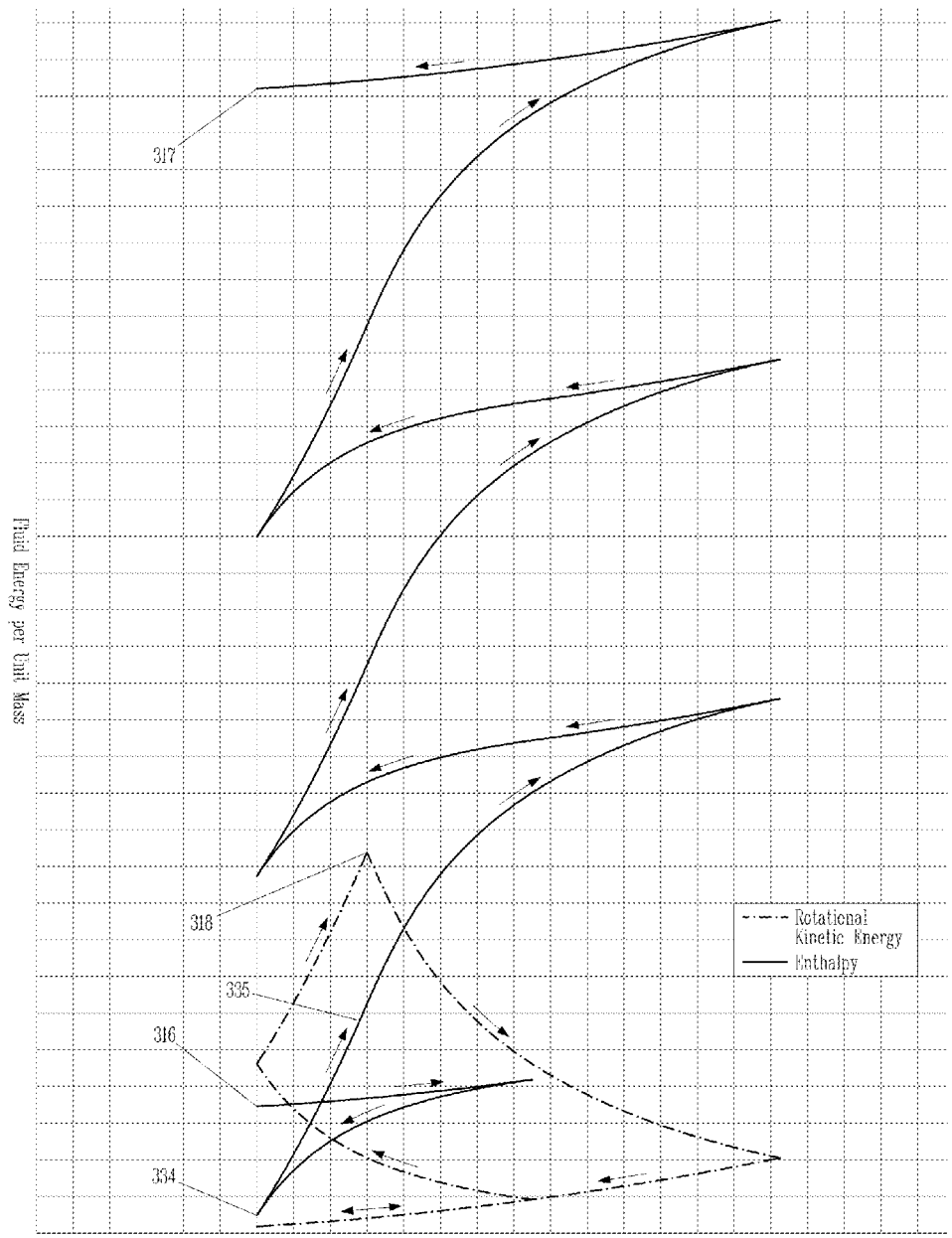
FIG. 26 is a dual plot of fluid kinetic energy and enthalpy vs. fluid radius representing flow through the compressor half of the third primary embodiment of the present invention.
Figure 28A:
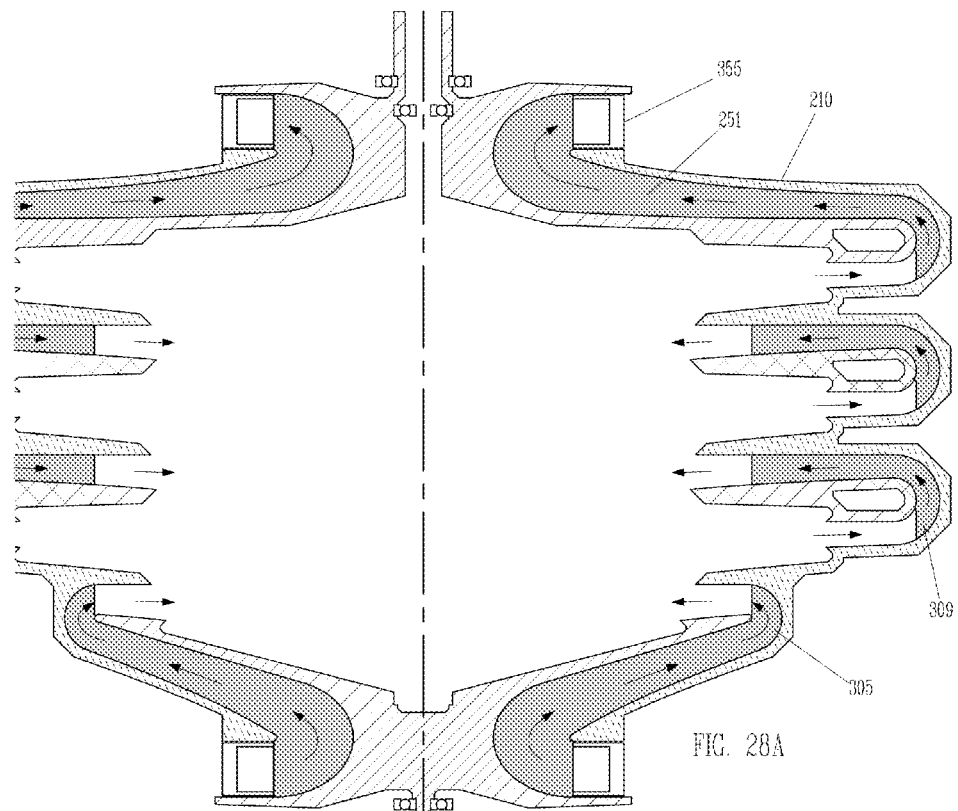
FIG. 28A is a cross-section of the rotating structure of the low-speed outer impellers of the third primary embodiment.
Figure 28B:
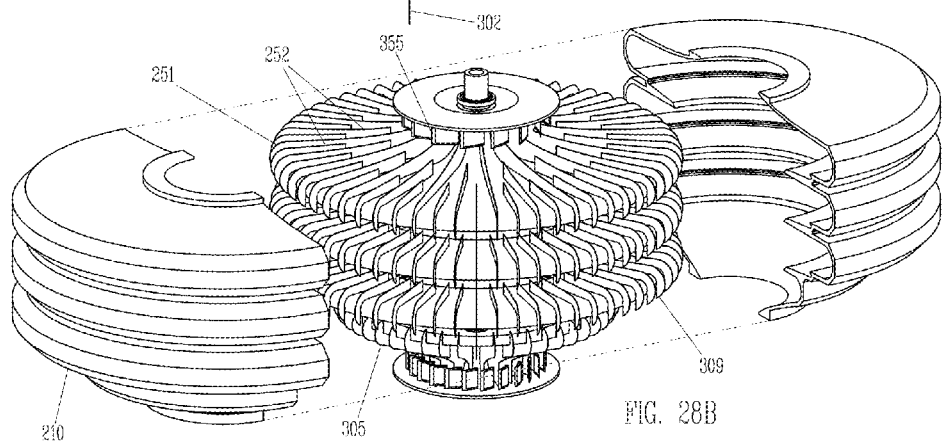
FIG. 28B is an exploded perspective view of the rotating structure of FIG. 28A.
Figure 29A:
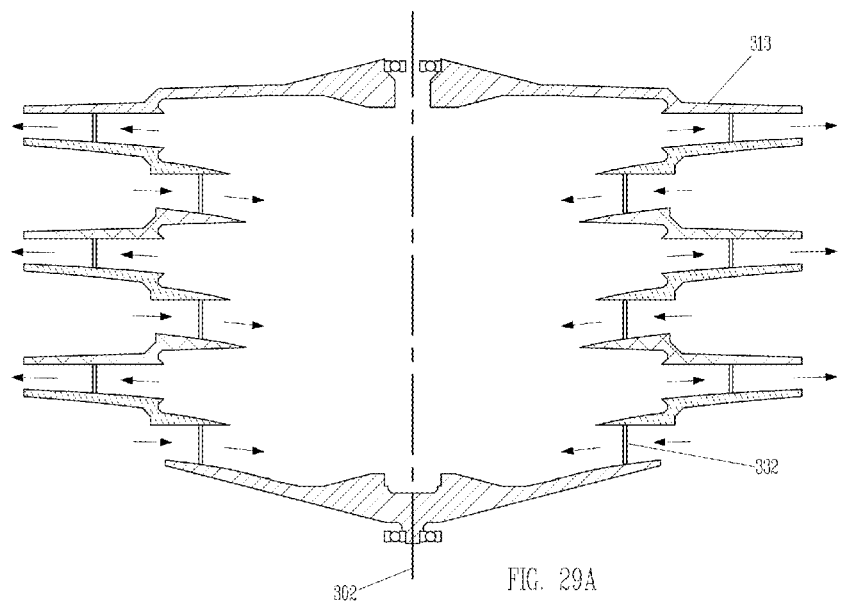
FIG. 29A is a cross-section of the freewheeling mid-speed rotating structure of the third primary embodiment.
Figure 29B:
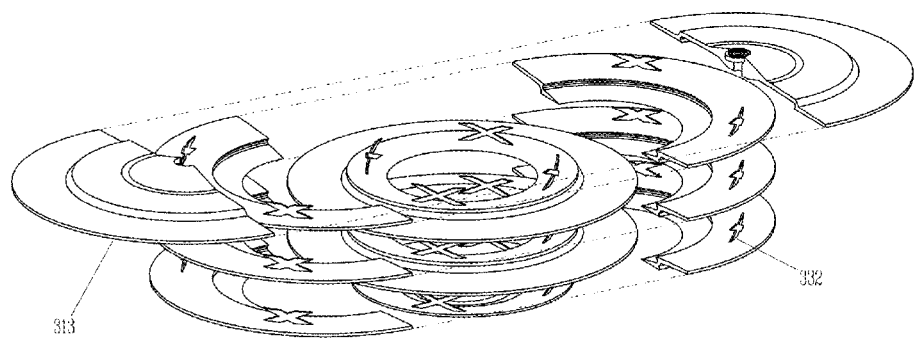
FIG. 29B is an exploded perspective view of the rotating structure of FIG. 29A.
Figure 31A:
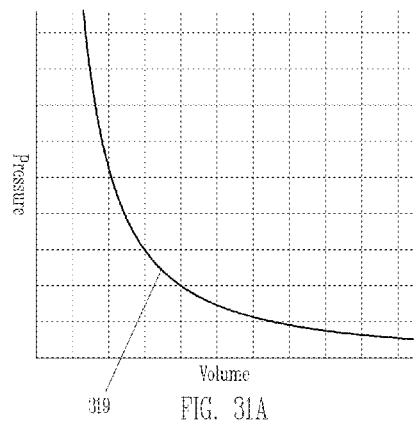
FIG. 31A is a typical thermodynamic plot of gas pressure vs. gas volume for a typical adiabatic compression or expansion.
Figure 31B:
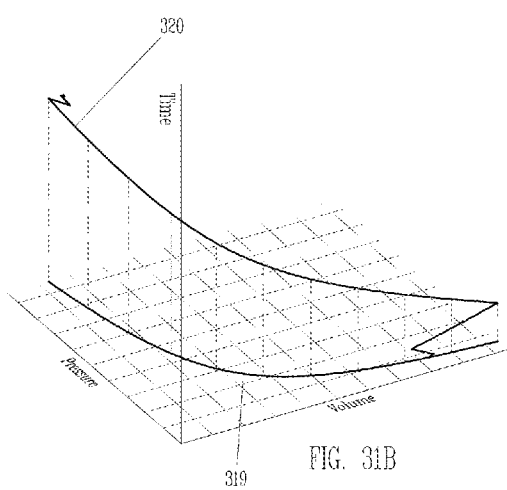
FIG. 31B is a perspective view of a 3D plot of pressure vs. volume vs. time representing flow through the compressor half of the first primary embodiment.
Figure 31C:
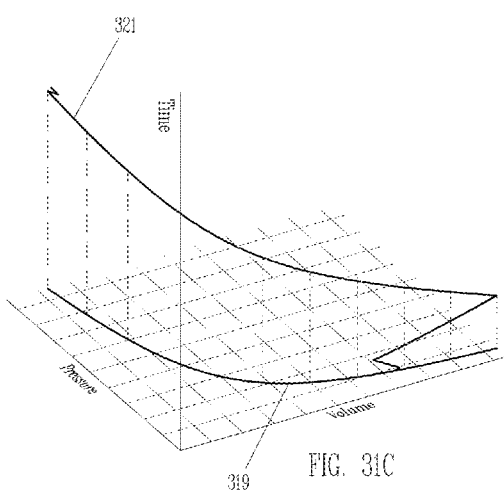
FIG. 31C is a perspective view of a 3D plot of pressure vs. volume vs. time representing flow through the second primary embodiment.
Figure 31D:
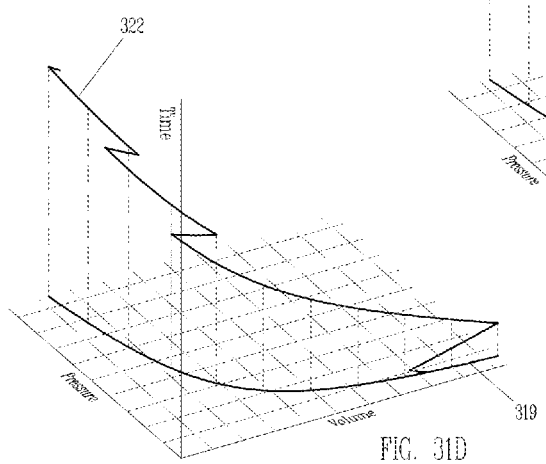
FIG. 31D is a perspective view of a 3D plot of pressure vs. volume vs. time representing flow through the compressor half of the third primary embodiment.

(FIG. 26) Plots of fluid rotational kinetic energy and enthalpy for the third primary embodiment illustrate its unique advantage: large enthalpy increase from inlet 316 to outlet 317 for a given maximum impeller tip kinetic energy 318, thanks to repeated outward-and-inward radial cycling. The enthalpy plot shows 3 radial cycles consistent with the depicted embodiment. As before, these plots with reversed flow arrows describe the adiabatic expansion in the turbine half.

(FIGS. 31A through 31D) As previously mentioned, all fluid compression and expansion processes in the present invention are assumed to be adiabatic, and likely appear as a standard adiabatic curve 319 if depicted on a standard pressure-volume plot. If plotted in three dimensions with time on the z-axis, however, the progression of fluid properties through the first 320, second 321, and third primary embodiments 322 are revealed as being somewhat meandering, showing a two-steps-forward-one-step-back motion along the adiabatic curve wherever inward-and-outward radial cycling is needed within each embodiment.

Consideration should be given to the dynamic restoring forces associated with impeller speed deviations that enable each rotating structure to maintain a stable angular velocity. Suppose a given rotating structure within a velocity-stepping turbomachine is spinning at its design speed relative to its neighboring structures and has balanced powers between its driving and driven impellers. If that structure were to slow down slightly for some reason, fluid flow at the leading edges of each of its impeller blades would be rotating slightly faster than those blades and would impart a slight force on each blade in the direction of rotation as fluid rotation is slightly slowed upon entering each impeller. The result would be a slight reduction of impeller power in driven impellers and a slight increase of impeller power in driving impellers, and that power imbalance would act to speed up the structure. Similarly, a slight increase in speed would create an impeller power imbalance that would act to slow the rotating structure.

Figure 36:
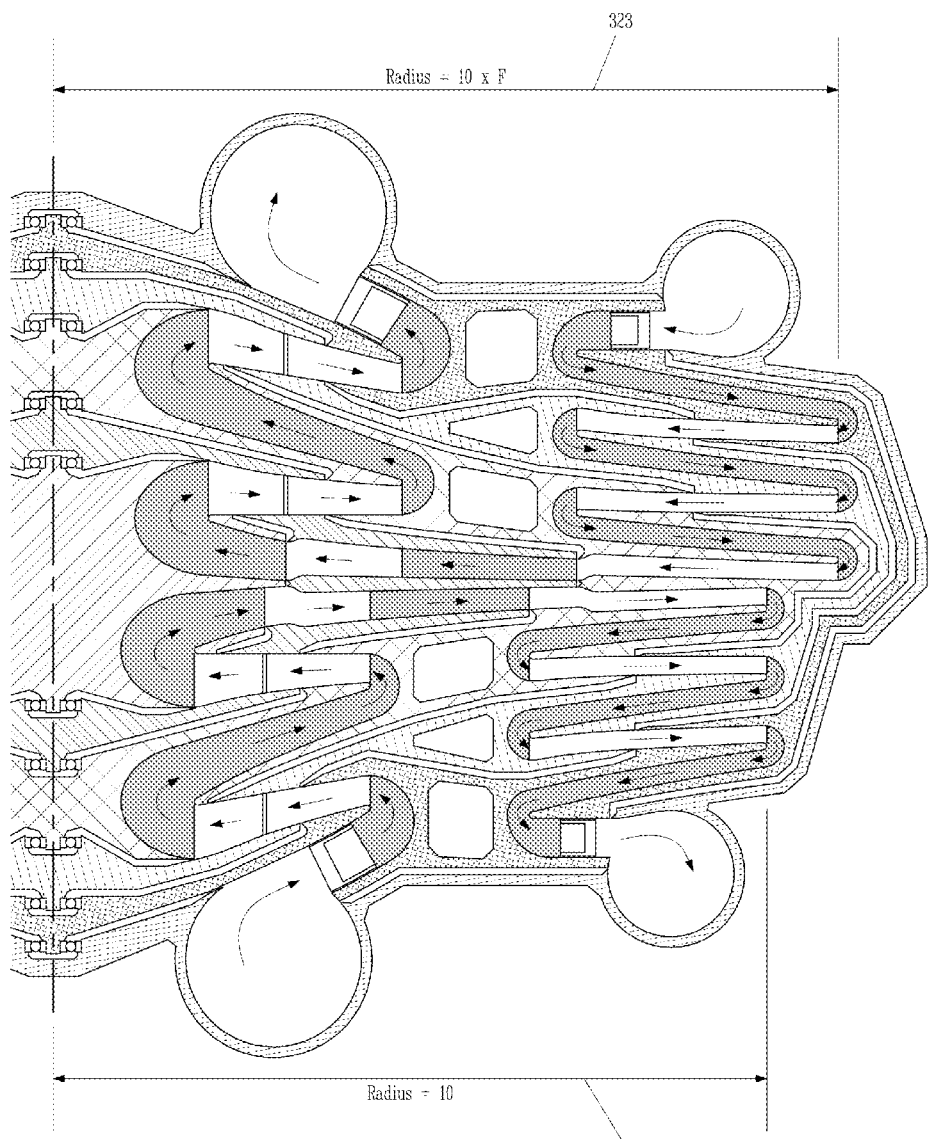
FIG. 36 is a cross-section of a variation of the first primary embodiment in which one half is radially enlarged over the other half.

6.2.4—Non-Symmetrical First and Third Primary Embodiments (FIG. 36) Balancing of driving and driven impeller powers in the first and third primary embodiments, with their two symmetrical halves, requires that fluid flow rates are equal for both halves and that none of the rotating structures experience significant bearing friction, seal rubbing, or any other substantial drag. If either condition is not met, the first and third primary embodiments can be re-balanced if one machine half is enlarged in the radial direction by some uniform percentage over the other half. As previously stated, impeller power is proportional to (valid for all embodiments) blade outer radius squared minus blade inner radius squared. If the respective radii 323 of all blade leading and trailing edges in one machine half are increased over their counterpart radii 324 in the other half by some uniform factor F, the impeller powers per unit fluid mass flow of all impellers in that larger half are multiplied by $F^2$. This radial enlarging of one machine half can be used to re-balance impeller powers if: (1) the two halves carry unequal fluid mass flow rates, namely a flow rate in the smaller half that is $F^2$ times the flow rate in the larger half, or (2) a net drag force on the rotating structures resulting from bearing friction, seal rubbing, or other drag mechanisms that brings total shaft power consumption to $F^2$ times the total shaft power production in a symmetrical machine. Although the drawing shows a non-symmetrical form of the first primary embodiment only, the concept applies to the third primary embodiment in the same manner.

Unequal fluid mass flow rates can occur in the two halves of the first or third primary embodiments if each half is handling its own distinct fluid stream, especially if the two streams are of different fluids. Unequal flow rates can also occur in a device performing a complete thermodynamic cycle if substantial fluid mass flow is being added or removed between compressor and turbine. This would be the case if cycle power input/output were being provided by a fraction of the machine's flow rate acting across the full cycle pressure ratio (e.g., compressor bleed power) instead of the more common full machine flow rate acting across the exhaust-to-ambient pressure difference. This would provide an engine whose output is directly available in the form of high-pressure flow.

If a non-symmetrical form of the first or third primary embodiments is being used to compensate for bearing or seal friction or some other drag, power lost in each structure should be small percentage of total shaft power being transmitted. If so, the radial scaling factor F of one machine half over the other can be very close to one, that is, the larger half need only be slightly larger than the smaller half. NOTE: compensating for bearing or seal friction in this manner will work in one flow direction only. If flow is reversed, non-symmetrical impeller power imbalance adds to frictional power loss instead of subtracting from it.

6.2.5—Multi-Staging

As is frequently done with existing technology, velocity-stepping turbomachines can be multi-staged: multiple independent machines are arranged in series along a working fluid flow path. This has the advantage of generating much larger total fluid pressure rise or drop than is possible across individual machines.

Where the first primary embodiment is used in a thermodynamic cycle, multi-staging can increase overall cycle pressure ratios, which is a valuable improvement for end uses where individual machines are constrained in allowable total diameter or allowable maximum rotor speed. Where the two halves of the first primary embodiment are each used to handle their own distinct fluid streams, one stream can navigate multiple machines in series while the other stream is split up to traverse those same machines in parallel, so that large flow rates across small pressure differences can be converted into small flow rates across large pressure differences or vice-versa.

Figure 37:
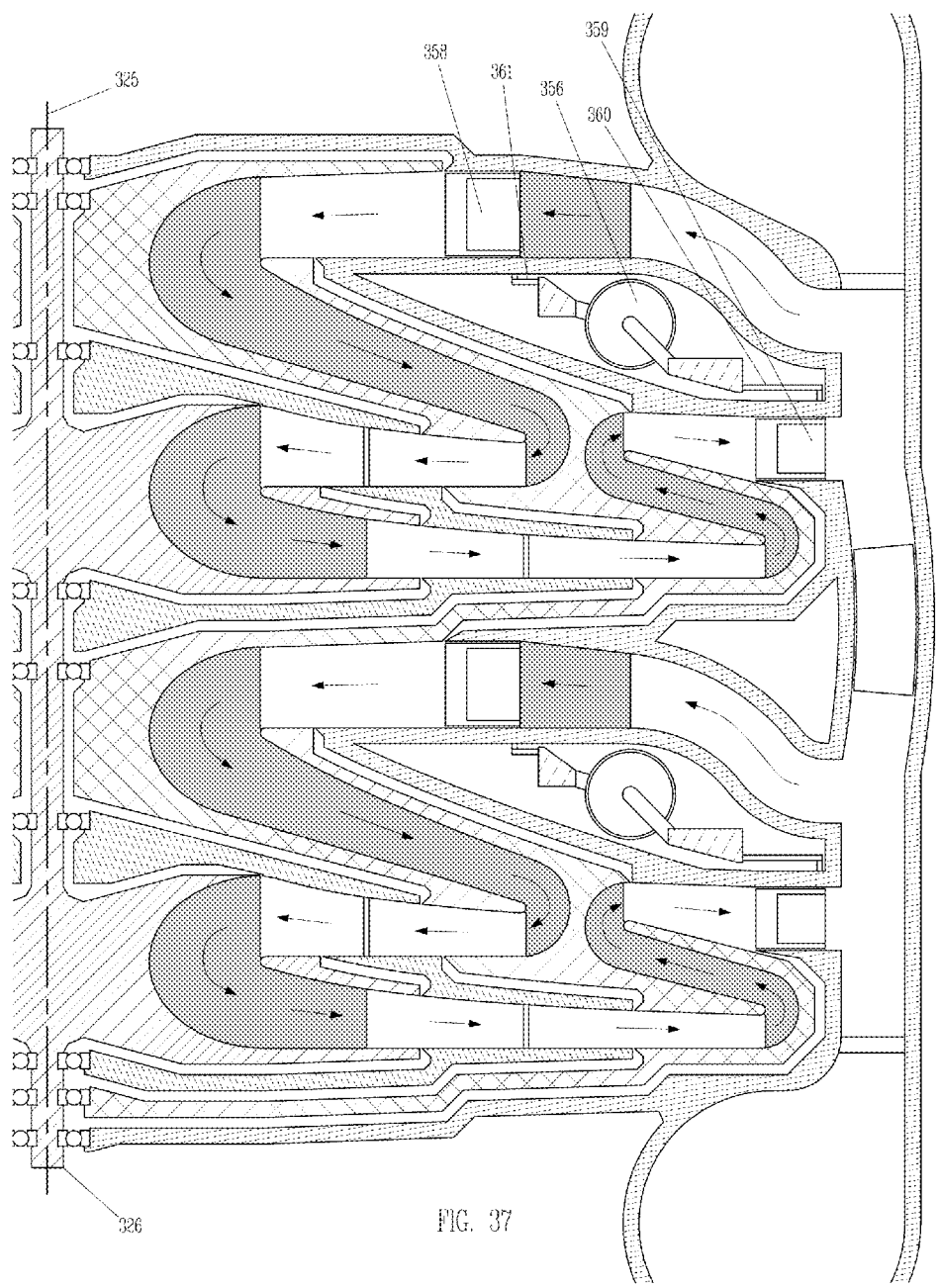
FIG. 37 is a cross-section of a two-stage variation of the second primary embodiment.
Figure 38A:
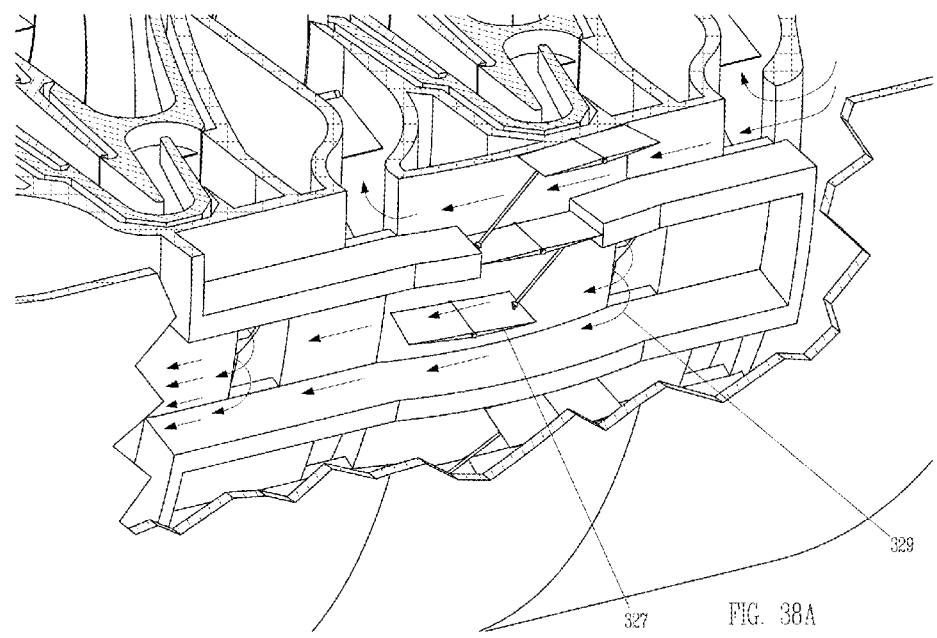
FIG. 38A is a cut-away perspective view of a valving system for the two-stage variation of the second primary embodiment, that valving system set for parallel flow through the two stages.
Figure 38B:
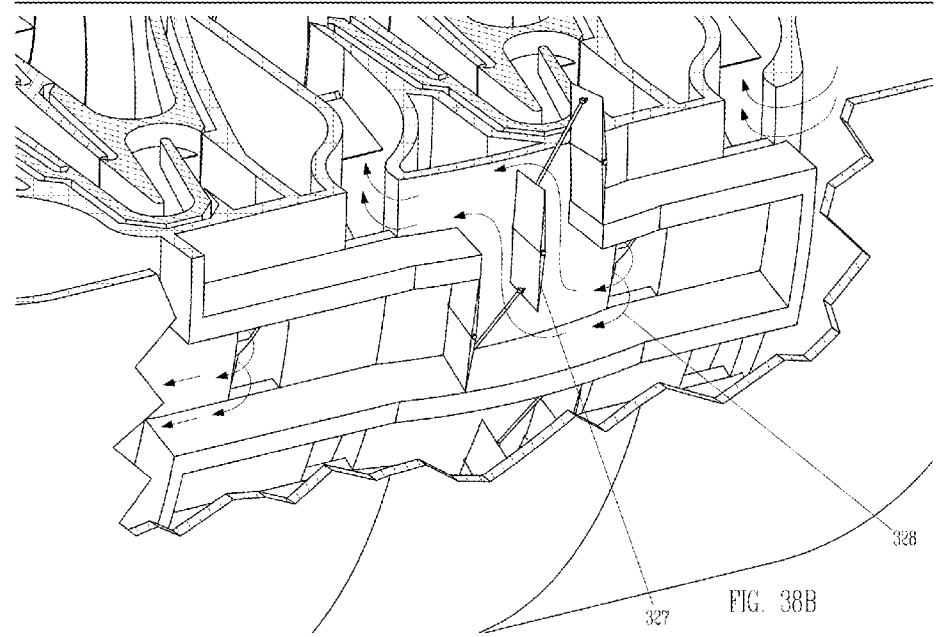
FIG. 38B is the valving system of FIG. 38A, set for series flow through the two stages.

(FIGS. 37 through 38B) Multi-staging is particularly useful to applications of the second primary embodiment, whose maximum fluid pressure rise or drop is inherently limited. Multiple machines can be oriented on a common rotational axis 325 so as to use a common input/output shaft 326. Furthermore, a system of valving 327 can allow fluid flow to selectively switch from series 328 to series/parallel to parallel 329 flow paths through the machines to provide a kind of multi-speed fluid transmission, which may prove useful for ground vehicle propulsion.

The third primary embodiment already incorporates multi-staging into its basic configuration. Total fluid pressure change across this embodiment is limited only by the number of inward-and-outward radial cycles it can contain. If mechanical gearing is used to provide the third primary embodiment with a single-shaft power input/output capability, a valving system similar to that proposed for the second primary embodiment can be used to selectively switch between series and parallel flow paths as needed to provide a multi-speed fluid transmission.

6.2.6—Structural Bridging Across Flow Paths (FIGS. 15A, 15B, 17A and 17B) Within all primary embodiments, radial flow passages through impellers and bladeless annular volumes have greater axial width at smaller radii and lesser axial width at larger radii, so as to provide approximately constant flow cross-sectional area throughout the machine (machines handling compressible fluids can use reduced flow cross-sectional areas in high-pressure sections). If each of the slower rotating structures in the first primary embodiment has inner and outer impellers, the wider flow passages through the inner impellers and vortices add up to a machine having a large axial dimension near its hub. For a more compact package, inner impellers can be eliminated from every other rotating structure and replaced by flow path bridges 330. Flow path bridges must link together the rotor sections that would otherwise be linked, and carry the structural loads that would otherwise be carried, by the blade sets in the eliminated impellers. The bridges must have sufficient stiffness to maintain alignment between the rotor sections they link together, and must withstand the centrifugal loads associated with their rotational speeds, all while creating the smallest possible flow disturbances in the fluid passages. For example, each bridge might consist of two or more crossing helical elements, which carry hoop stress resulting from centripetal loading and cancel each other's tangential component of tensile force. Their bulk is concentrated around a single radius, which is the radius of the leading edges of the impeller blades they eliminate. At that radius, the bridges are rotating at nearly the same speed as the fluid that is flowing past them, so drag on the flow is minimized. For every inner impeller that is replaced by a flow path bridge, two adjacent radial flow passages are eliminated and the machine's axial dimension shrinks by an amount slightly less than the width of the two passages.

(FIGS. 19B, 22A through 23B) Reduction of overall axial dimension may be more important for the second primary embodiment than for the first, because the second may be in greater need of multi-staging and because the multiple stages must share a common rotational axis if they are to use a common input/output shaft. To that end, the second primary embodiment's axial dimension can be minimized if it uses only one spin-up impeller 250 to spin up fluid and one spin-down impeller 276 to slow it back down, in addition to the process impeller 274 that provides power input/output. The vortices that separate the three impellers will likely have large exit/entry spin ratios, possibly resulting in high fluid shearing rates on flow surfaces within those sections, as previously discussed. To reduce those fluid shearing rates, a third mid-speed rotating structure 280 that has flow path bridges 331 but no impellers can be inserted between the low-speed outer structure and the high-speed input/output impeller and shaft. This mid-speed structure, which performs no significant energy transfer with the fluid, will simply freewheel in the flow and provide annular walls of intermediate angular velocity within the fluid vortices, reducing fluid shearing rates at those walls. Machines whose fluid vortices have very high exit/entry spin ratios may benefit from using more than one mid-speed freewheeling rotor.

(FIGS. 25B, 29A and 29B) Although the third primary embodiment need not devote a significant fraction of its total axial extents to fluid spin-up and spin-down operations, it may need to employ fluid vortices of large exit/entry spin ratios within its inward and outward radial cycles. This embodiment may therefore also benefit from the addition of a mid-speed rotating structure 313 incorporating flow path bridges 332 for the same reason: to reduce the fluid shearing rates at annular walls. Again, machines whose fluid vortices have very high exit/entry spin ratios may need more than one mid-speed structure.

6.2.7—Icing and Flash Boiling in Low-Pressure Zones (FIGS. 12, 20 and 26) In each of the three plots of enthalpy vs. fluid radius representing the three primary embodiments (which all show compressor flows), there is a noticeable enthalpy drop 270, 333, 334 downstream of the intake 269, 295, 316 and immediately upstream of the first steep ascent 265, 298, 335 of the enthalpy curve. In each of these embodiments, working fluid pressure is dropping well below intake pressure at some point along the flow path. In all three cases, the largest pressure drop occurs across the fluid vortex that is immediately upstream of the inner process impeller, and is the consequence of using that vortex to spin up the fluid to those high impeller speeds. In all three cases, the result is a zone of fluid at the inner radii of the process impeller whose pressure is well below the machine's intake pressure. Wherever local fluid pressure is lower than at intake, icing can occur if the working fluid is moist atmosphere, or flash boiling can occur if the working fluid is a liquid near its boiling point. Atmospheric icing can result in ice accumulations on flow surfaces, which can disturb smooth fluid flow and/or cause mass imbalance in rotors. Flash boiling can choke off fluid flow rate and/or cause physical damage to flow surfaces.

Figure 39:
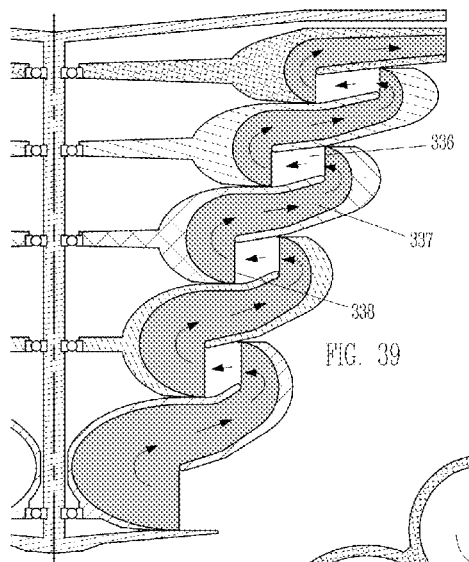
FIG. 39 is a cross-section of an assembly similar to that of FIG. 9B, here configured to prevent low fluid pressures at the inner radii of the faster impellers.
Figure 40:
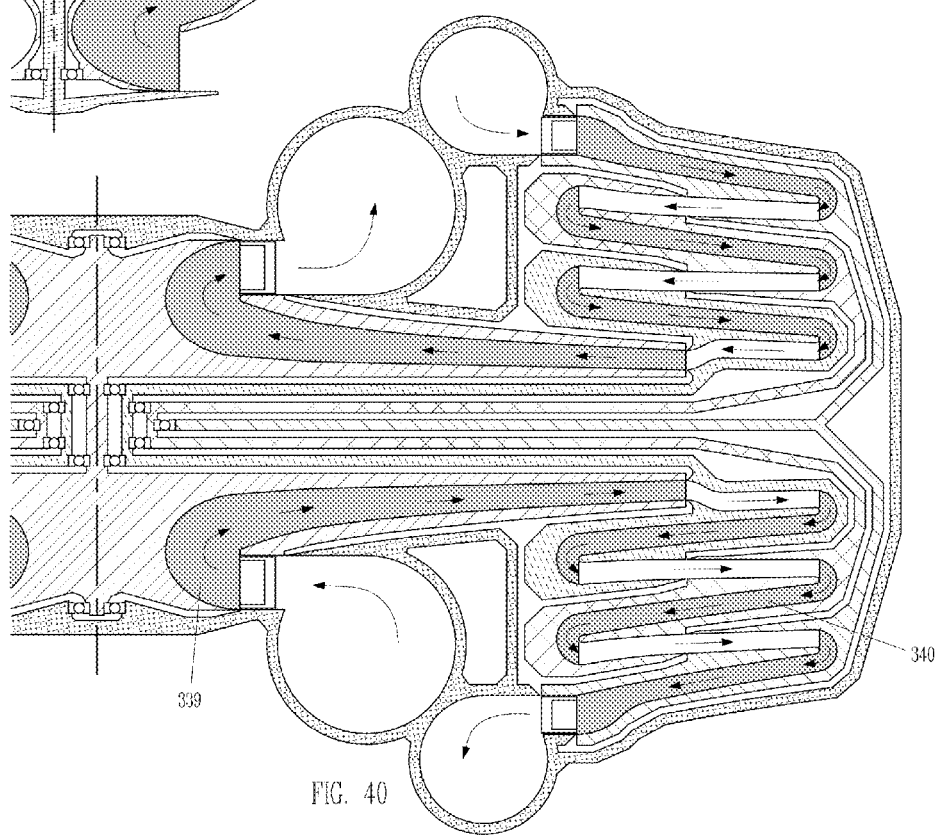
FIG. 40 is a cross-section of a pre-pressurizing variation of the first primary embodiment, which has no inner-radii fluid vortices.

(FIGS. 39 and 40) To prevent the undesirable effects of low pressures in certain working fluids, two methods are useful: (1) within the spin-up section of the machine, reduce the outer/inner radius ratio of each fluid vortex 336 below that of the spin-up impellers 337 until fluid pressure at each vortex inner radius 338 no longer drops below intake pressure. This method results in each spin-up impeller (and the inner process impeller) being positioned at larger radii than the last upstream impeller. (2) Employ multi-staging to pre-pressurize the working fluid. This method requires the low-pressure compressor to do without a spin-up section and instead rely on a slower-speed process impeller 339 having a very large outer/inner radius ratio, paired with an outer-radii spin-down section 340. Without a spin-up section, this compressor has no significant low-pressure zones, and its large-radius-ratio process impeller can build up enough fluid pressure to eliminate undesirable effects within the high-pressure compressor downstream.

6.3) Angular Velocity Regulators

6.3.1—Role & Operation

In the previous descriptions of basic impeller-vortex assemblies, working fluid is assumed to posses some tangential velocity T prior to entering the first impeller. Indeed it is true that impeller-vortex flow paths are only capable of transitioning fluid between low and high-speed rotation, not between zero and high-speed rotation.

Since it can be assumed that fluid entering the intake of a velocity-stepping turbomachine will have negligible net rotation about the machine's axis, and since the use of a spiral intake structure to create that rotation would undesirably couple rotational speed to fluid flow rate, some means for transitioning fluid between zero and low speed rotation must be included as part of the present invention. This is the role of the angular velocity regulator.

From a functional perspective, the angular velocity regulator can be thought of as a combination of a pressure regulating valve and a nozzle, in that it imposes a specific quantity of fluid pressure drop to the flow passing through it, and uses that pressure drop to accelerate the flow to a corresponding exit velocity.

The angular velocity regulator must apply a tangential velocity to the fluid flowing through it, and that velocity must be proportional to the speed of the slowest rotating structure in the machine, to either facilitate smooth, straight flow into the first upstream spin-up impeller or to cancel out the rotation of fluid that has left the last downstream spin-down impeller. These tasks are needed to maintain a steady power balance between the driving and driven impellers of the slowest rotating structure. These tasks must be consistently performed across a wide range of possible fluid flow rates as well as during complete flow reversal, in keeping with the claimed flexibility of the present invention.

Figure 41A:
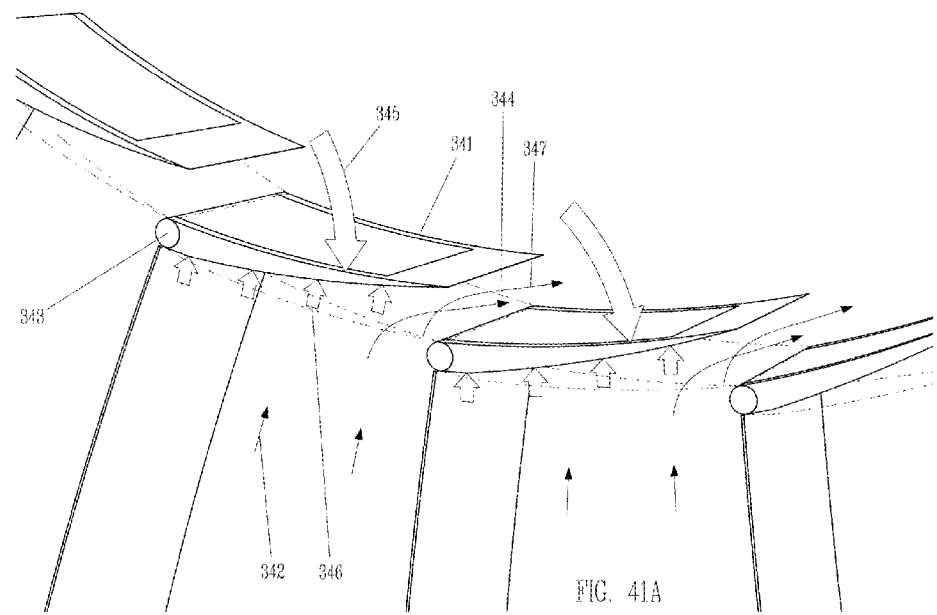
FIG. 41A is a perspective view of several vanes of an angular velocity regulator, showing regulating force and opposing fluid pressure being applied to each vane.

(FIG. 41A) The regulator consists of an axisymmetric set of overlapping vanes 341 centered on the machine's rotational axis and placed in the flow of working fluid 342, which all pivot around their leading edges 343 and are all generally angled toward the direction of intended fluid rotation. The spaces between each adjacent pair of vanes form converging flow passages 344, this being the only use of such passages in velocity-stepping turbomachines. A regulating force 345 is applied to each of the vanes, pushing them to pivot toward more tangential orientations, thereby narrowing flow passages and increasing flow obstruction. Flow obstruction in turn causes pressure build-up 346 upstream of the vanes, pushing them to pivot toward more radial orientations, thereby enlarging flow passages and decreasing flow obstruction. Once equilibrium is achieved, regulating force is counter-balanced by the pressure difference across the vanes, and that difference is converted into fluid tangential velocity 347 via the converging flow passages, so control over regulating force establishes control over fluid tangential velocity. In most end uses, regulating force should be largely independent of vane pivot angle, because vane pivot angle will vary with fluid flow rate while fluid angular velocity leaving the regulator should generally be independent of fluid flow rate. The pivoting range of motion should generally be as small as possible, and can be reduced by locating the regulator vanes within a flow section of enlarged cross-section area. NOTE: in this application of converging flow passages, flow-pressure coupling is not a concern provided that regulating force is independent of vane pivot angle, and velocity-dependent loss will be proportional to the pressure difference across the vanes, which is a very small percentage of the total pressure difference across the entire machine.

Since the regulator's exit velocity must be proportional to the speed of the slowest impellers, regulating force must vary with impeller speed. This can be accomplished with hydraulic or pneumatic force application by using a valve to maintain hydraulic or pneumatic system pressure proportional to total fluid pressure rise or drop across the turbomachine, because regulating force should be kept proportional to total machine pressure rise or drop (both are proportional to the square of impeller speed). If electro-mechanical force application is used, a sensor must provide impeller speed information to an electronic control unit, which will calculate the necessary regulating force.

Angular velocity regulators can be mounted to the stationary casing with regulating force applied by hydraulic, pneumatic, or electro-mechanical means or by calibrated spring, or they can be mounted to the slowest rotating structure with regulating force applied by electro-mechanical or centrifugal means or by calibrated spring. The type of regulator use will determine the best type of mount and regulating force. Stationary regulators must control the angular velocity of fluid entering the first upstream spin-up impeller so as to facilitate smooth flow into those impeller blades. Where stationary regulators are used without flow reversal capability, fluid angular velocity leaving the last downstream spin-down impeller can be dissipated into the machine casing. Rotating regulators must induce a fluid tangential motion against the rotational direction to cancel out the rotation of fluid leaving the last downstream spin-down impeller, in order to counter-balance the shaft power consumption caused by non-rotating fluid entering the first upstream spin-up impeller. Where rotating regulators are used without flow reversal capability, the blades of the first upstream spin-up impeller can use simple rounded leading edges (much like the leading edges of a subsonic aircraft wing) to accommodate varying fluid approach vectors. Regardless of the mounting location, it is generally desirable to locate the vanes of the angular velocity regulator at the trailing edges of a rotating or stationary blade set or some other axisymmetric set of barriers to tangential flow. Otherwise the fluid entering the regulator may already have some unknown angular velocity relative to the vanes, which would add to, or subtract from, the angular velocity imparted by the regulator, compromising the known relationship between regulating force and the regulator's exit velocity.

Figure 41B:
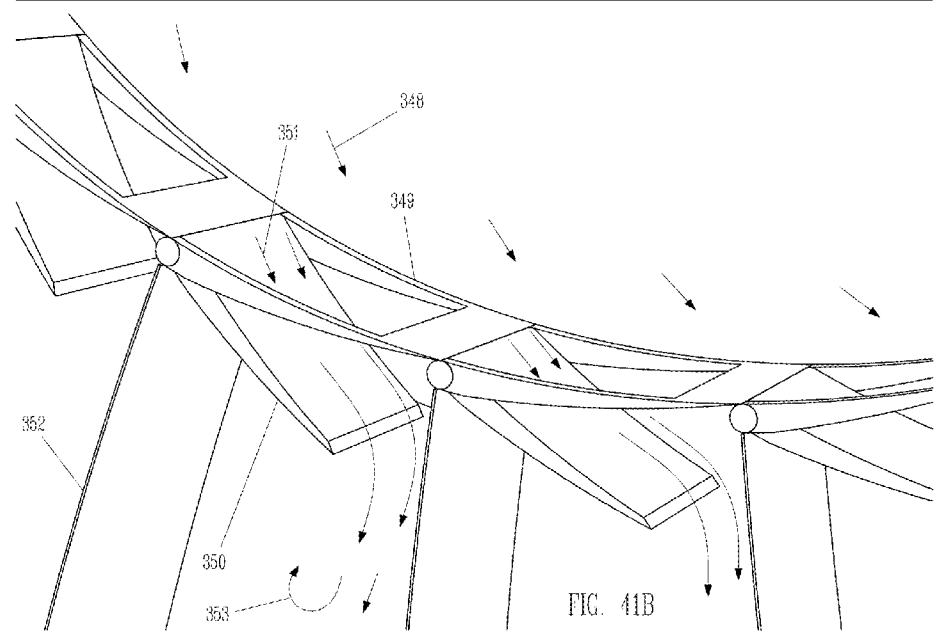
FIG. 41B is the regulator vanes of FIG. 41A, under reversed flow conditions.

(FIG. 41B) Under reversed flow 348 conditions, the angular velocity regulator will lose the cross-vane pressure difference that opposes the regulating force. As a result, those vanes will pivot to a closed position 349 and will become a barrier to reversed fluid flow. For applications of the present invention in which reversed flow is undesirable, the regulator can therefore double as a one-way valve for working fluid. Where reversed flow is desirable, each vane of the regulator will contain a smaller reversing flap 350 that also pivots about its leading edge and opens in a direction opposite that of the vane. The reversed flow that closes the vanes will open the reversing flaps to provide flow paths 351 through the regulator. The flaps will pivot to align with approaching flow vectors, so as to smoothly guide fluid into the blades 352 or other circumferential barriers located (now) downstream. In this way reversing flaps transition reversed flow from a state of relative angular velocity entering the regulator to a state of zero relative rotation leaving the regulator (a sequence opposite that during normal flow). Although such a transition involves turbulent kinetic energy dissipation 353 downstream of the flaps and is therefore less energy efficient than the equivalent performed by a set of diverging flow passages, once again the total energy lost in the transition is a very small percentage of the total energy transfer of the entire machine, and the flow-pressure coupling associated with diverging flow passages can be completely avoided.

6.3.2—Regulators as Speed Governors

Many end uses of the first and third primary embodiments, such as those involving a thermodynamic cycle, may require a speed governor to control impeller speeds within the machine. The angular velocity regulators can serve double-duty as speed governors. By controlling the angular velocity of fluid entering or leaving the slowest rotating structure, regulators can control that structure's impeller power balance and therefore its rotational speed (see previous discussion of restoring forces associated with impeller speed deviations). As the speed of every structure in a velocity-stepping turbomachine is some constant multiple of the speed of the structure enclosing it, control over the slowest structure's speed equals control over all speeds in the machine. In this application regulating force is determined by desired rotor speed, not actual rotor speed. NOTE: for machines intended to handle reversed flow, two regulators must be equipped to act as speed governors, one in each flow direction.

Because the present invention is not constrained by flow-pressure coupling, it can easily perform thermodynamic cycles of variable pressure ratio (a potentially valuable feature) if provided with angular velocity regulators that can provide variable speed governing. This requires active manipulation of the regulating force acting on the vanes of the regulators, the force being in proportion to the desired impeller speed. Active manipulation of regulating force can be accomplished via a control valve if force application is hydraulic or pneumatic, or it can be accomplished via an electronic control unit if force application is electro-mechanical. Since the control valve or ECU will be stationary, the angular velocity regulator being manipulated should also be stationary, unless the communication path from control to regulator can jump from stationary to rotating parts (e.g. an electrical signal).

For end uses of the present invention in which speed governing is necessary but variable speed governing is not, regulating force can be applied to regulator vanes via calibrated springs. The springs can provide a constant, pre-determined force, which equals a steady and known regulator exit velocity, and therefore a known governed speed. Regulators using calibrated springs can be stationary, or they can be rotating if vanes are mass-balanced about their pivots to eliminate any centrifugal effects.

6.3.3—Regulators Using Centrifugal Regulating Force (FIGS. 11B, 14A, 14B, 25B, 28A and 28B) Any rotating angular velocity regulators that do not double as speed governors can use centrifugal force as regulating force, a method far simpler than hydraulic, pneumatic, electro-mechanical or calibrated spring methods. If regulator vanes are mounted to the slowest rotating structure such that their pivot axes are substantially parallel to the rotational axis, and if each vane has some mass imbalance about its pivot axis, the centrifugal force associated with the structure's speed will seek to pull the vane's heavy end away from the rotational axis. Vanes 354 which handle inward radial flow already locate their bulk on the correct side of their pivot axes, and vane mass can be fine-tuned to provide a force corresponding to the proper fluid angular velocity output. Vanes 355 that handle outward radial flow locate their bulk on the incorrect side of their pivot axes, and so will each include a counterweight on the opposite side of their pivots. Counterweight mass can be fine-tuned to provide a force corresponding to the proper fluid angular velocity output. The centrifugal method is effective across a wide range of impeller speeds because both regulating force and centrifugal force are proportional to the square of impeller speed; so the regulator's exit velocity can always be kept proportional to impeller speed.

Figure 42:
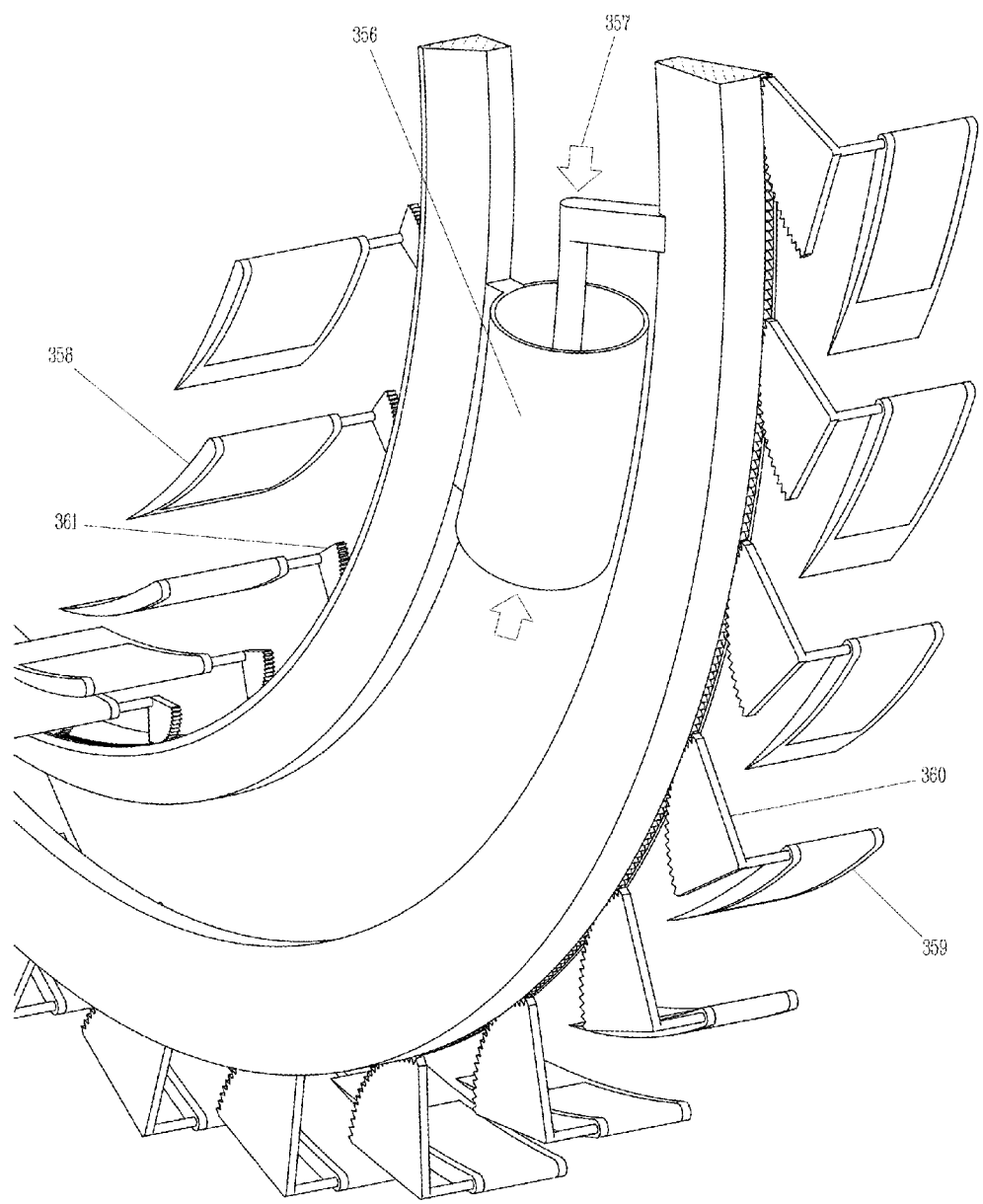
FIG. 42 is a perspective view of a common system for applying regulating force to both angular velocity regulators of the second primary embodiment.

6.3.4—Regulators for Second Primary Embodiment (FIGS. 19B, 37 and 42) The second primary embodiment of the present invention imposes unique requirements on its angular velocity regulators. Speed governing is not required, as the input-output shaft speed will determine all other speeds. Unfortunately, the second embodiment cannot employ rotating regulators with their simple option of centrifugal regulating force unless the machine is being used strictly as a turbine. This limitation is due to the radial distance between the spin-up and spin-down impellers, which would preclude effective counter-balancing of the shaft power produced by an outer-radii rotating regulator when the machine is operating as a compressor. Stationary regulators must therefore be used if the second embodiment is to operate as a compressor. Where flow reversal capability is required, two stationary regulators will be needed. Since the architecture of the second embodiment allows the two regulators to be in proximity to each other, the two can share a common hydraulic, pneumatic or electro-mechanical system in which a linkage 356 applies regulating force 357 on one regulator by pushing against the fully closed position of the other. Regulating force applied to the small-radii regulator 358 must be less than that applied to the large-radii regulator 359 due to the reduced fluid angular velocity required of the former versus the latter, so the common mechanism must apply force to the latter through a longer effective lever arm 360, and to the former through a shorter effective lever arm 361.

Figure 43:
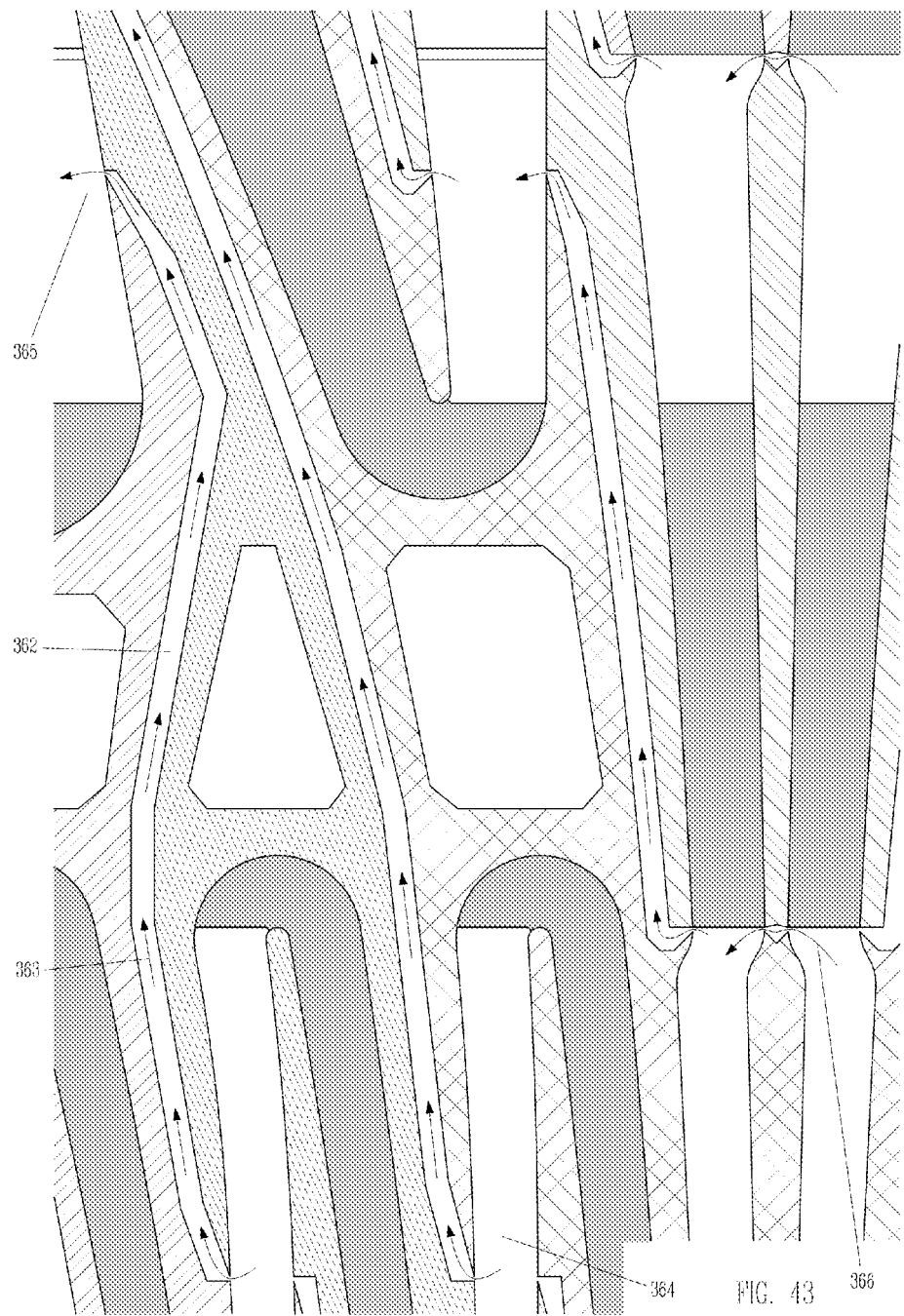
FIG. 43 is a cross-section of the mid-radius area of the first primary embodiment, showing paths of pressure-driven fluid leakage between rotating structures.

6.4) Working Fluid Leakage (FIG. 43) The present invention employs multiple rotating structures that are typically enclosed inside one another and are contained in a casing. Because relative motion exists between all of these components, some degree of mechanical clearance or gap must separate each rotating structure from its neighbors and from the casing. Such gaps 362 inevitably become pathways for working fluid leakage 363, which is driven from higher fluid pressures at the machine's outer radii 364 toward lower fluid pressures at its inner radii 365. Within the first and third primary embodiments, working fluid will also leak 366 across the plane of symmetry (between turbine and compressor sides) due to pressure differences between the sides. In the third primary embodiment, working fluid will leak in the axial direction from the machine's high-pressure end to its low-pressure end. Leakage of working fluid from higher to lower-pressure regions is undesirable as it represents a waste of energy and a loss of device efficiency. Where the first or third primary embodiments are used to handle two separate streams of different types of fluids, leakage across the plane of symmetry will result in contamination of one fluid type by the other.

(FIG. 25B) This specification does not call out any particular method for sealing against working fluid leakage. The best practices used by manufacturers of gas and steam turbines are likely to be suitable for use in the present invention. Where efficiency loss is the only concern, the sealing apparatus need only restrict leakage to a sufficiently small flow rate. Where contamination of one fluid type by another must be prevented, a more effective sealing apparatus may be needed, perhaps one incorporating an intermediate low-pressure volume into which both fluids can leak and be separated from one another afterward. Leakage across the plane of symmetry of the first or third primary embodiments can also be slowed through use of small-diameter shafts 367 to connect impellers in one half to their symmetrical counterparts in the other half, as shafts would present a smaller sealing perimeter than large-diameter discs.

6.5) Heat Transfer Through Machine Structure

Just as pressure-driven leakage of working fluid through clearances will adversely impact machine efficiency, so too will temperature-driven conduction of thermal energy through rotating structures and casing. Whenever compressible working fluids are used in the present invention, higher fluid temperatures will accompany higher pressures at outer radii while inner radii host lower fluid temperatures and pressures. Like fluid leakage, thermal energy will flow radially inward. In the third primary embodiment, thermal energy will also flow axially through rotating structures from the high-pressure end of the machine to the low-pressure end.

(FIG. 11B) Thermal energy conduction should generally be minimized in pursuit of the highest possible machine efficiencies. The mid-radius cavities 368 shown within several rotating structures of the first primary embodiment assist toward that goal: in addition to reducing structural mass, the cavities serve to reduce the solid cross-sectional areas of the structures at those radii and therefore restrict conductive heat flow from outer to inner radii. A further step might be the insertion of insulating material or baffle structures into those cavities, unless they contain a vacuum, to block fluid convection currents whose motion would be greatly assisted by centripetal acceleration. Where feasible, rotating structures can be constructed of lower-conductivity materials such as fiber composites. These structures can also be built up from multiple concentric or axial sections that are bolted together so as to place multiple low-conductivity mechanical joints along the thermal conduction path, where allowed by stress concerns.

Figure 44A:
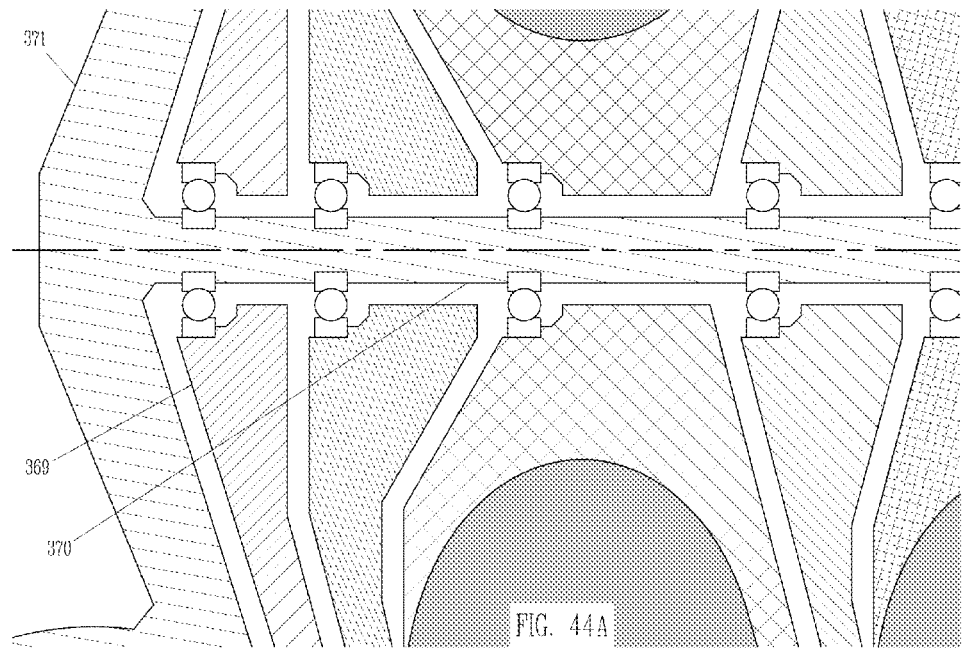
FIG. 44A is a cross-section of the hub area of the first primary embodiment, using the rotor-on-axle bearing configuration.
Figure 44B:
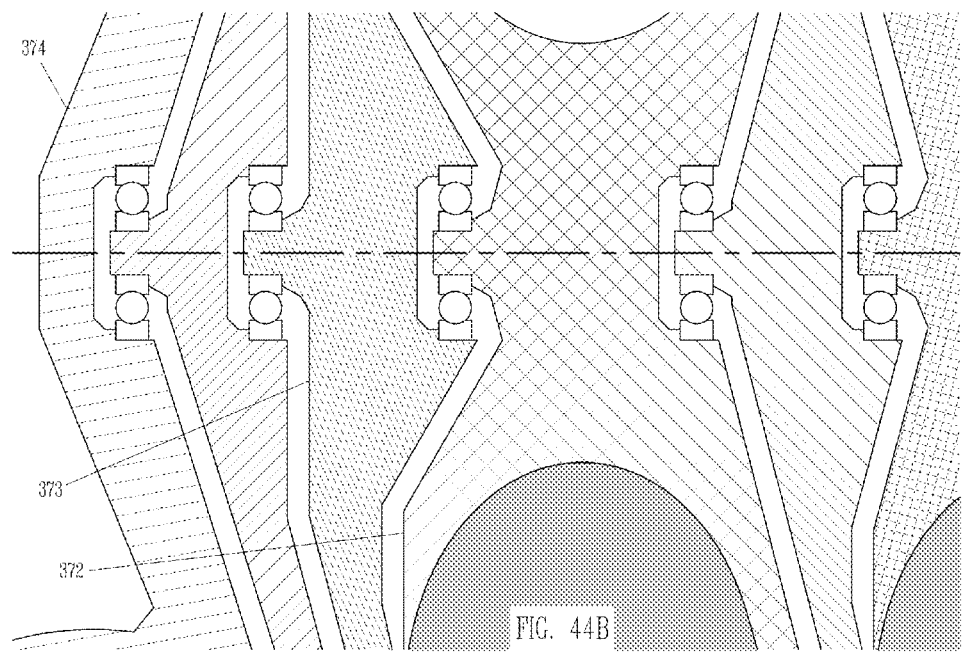
FIG. 44B shows the hub area of FIG. 44A, using the rotor-on-rotor bearing configuration.

6.6) Bearings (FIGS. 44A and 44B) Each independent rotating structure in a velocity-stepping turbomachine must be carried on its own set of bearings so that it may rotate at its own unique speed, and those bearings must maintain component alignments within sufficiently small tolerances to enable sealing systems, efficient blade tip clearances, etc. Bearings may be subjected to axial loads resulting from blade forces or from fluid pressure distributions on rotating structures. Being located in the hub of each rotor, bearings are surrounded by the lowest fluid temperatures in the entire machine. Two different bearing system architectures are available: (1) The rotor-on-axle system in which all rotating structures 369 are carried on a common axle 370, that axle usually being integrated into the machine casing 371 except in the second primary embodiment. Each bearing's speed equals the full angular velocity of the structure it carries. (2) The rotor-on-rotor system in which each rotating structure 372 is carried on the structure 373 that encloses it, the casing 374 carrying the entire assembly. Each bearing's speed equals the angular velocity difference between the structure it carries and the next one out.

(FIG. 19B) The rotor-on-axle bearing system has the advantage of a common stationary axle, which may be useful as a conduit for continuous lubricant flow to the bearings if needed, or as a mounting location for speed sensors. The rotor-on-rotor bearing system has several advantages: (1) rolling-element bearing DN numbers can be lower because bearings only bridge the speed differences between adjacent structures, and because bearing diameters can be smaller if they don't need to fit around a common axle, (2) centrifugal stresses in the hubs of rotating structures can be lower because those hubs need not include central holes to accommodate a common axle, and (3) pressure-driven leakage flow that would otherwise seek to pass through central holes in each hub is blocked by solid hubs. The drawings show the first primary embodiment and half of the third primary embodiment as using the rotor-on-rotor bearing system. The second primary embodiment and the other half of the third primary embodiment are both shown as using a modification of the rotor-on-axle system in which the high-speed input/output shaft 278 acts as a common axle. The reader should note that complex rotordynamic interactions could occur during operation of the rotor-on-rotor system or the modified rotor-on-axle system.

Although the drawings in this specification show rolling-element bearings, the operating conditions associated with certain end uses of the present invention may favor other bearing types such as aerostatic, hydrostatic or hydrodynamic fluid film bearings or active magnetic bearings.

6.7) Structural Failure Containment

Moving parts within turbomachines generally rotate at high speeds, frequently at the highest speeds allowed by material stress limits. These parts can be under huge centrifugal loads and can contain enormous amounts of kinetic energy when rotating at speed. If a high-speed moving component suffers structural failure during machine operation, fragments of that component are thrown radially outward in all directions at those enormous kinetic energy levels. These high-energy fragments can shred nearby people and equipment, if allowed to leave the machine's outer casing. Structural failure containment is therefore an important safety feature of any turbomachine.

The basic architecture of the present invention provides a key external benefit in this regard. The primary embodiments generally enclose faster rotating structures within multiple slower rotating structures, as a means to reduce the mechanical complexity required for a certain configuration of radial-flow impellers. This arrangement puts the fastest and therefore highest-failure-risk structures deep in the heart of the machine and surrounds them with multiple layers of slower, lower-stress structures. Should one of the inner, faster rotating structures disintegrate under centrifugal force, the large kinetic energy of its fragments can be absorbed into the destruction of the slower surrounding structures before reaching the casing. The casing can therefore do without most or all of the structural reinforcement that would otherwise be needed to guarantee failure containment. The slower rotating structures can perform double-duty as sacrificial containment barriers.

6.8) Noise

High noise levels have long been an operational issue for many types of turbomachines. Chief among the causes is the dynamic fluctuation occurring in the flow pattern around each blade (rotating and stationary) every time it passes through the wake of an upstream blade. Because the blades in a set are usually closely spaced, and because turbomachines frequently operate at very high RPM, each blade passes through many, many other blade wakes every second. The resulting high-frequency fluctuations around each blade give rise to the loud, high-pitched whine that is associated with many types of turbomachine. Some of the high acoustic frequencies present are known to cause discomfort to people.

The present invention offers two crucial improvements toward the goal of noise reduction: lower wake passage frequencies, and wake dissipation within bladeless annular volumes. Wake passage frequencies are lower because each impeller is only moving moderately faster or slower than the immediate upstream impeller. If the speed difference between the wakes and the blades passing through them is small, the wake passage frequency is low. Lower acoustic frequencies are less likely to be unpleasant to people nearby.

All blade wakes are significantly dissipated within the bladeless annular volumes that are downstream of almost every impeller. This is largely because each fluid particle takes a relatively long spiraling path through each volume, during which the flow velocity deficits within blade wakes can be more broadly distributed throughout the adjacent fluid before the downstream impeller entrance is reached. If each blade experiences weaker wakes from upstream blades, flow fluctuations are less intense and generate less noise.

7.) END USES OF THE INVENTION

Practical applications of velocity-stepping turbomachines that have been contemplated by the inventor as of the date of this document are listed here.

Where the present invention is configured as a reversible brayton cycle heat engine and/or heat pump, engine efficiency and heat pump performance coefficient can both closely approximate that of the ideal brayton cycle, with built-in tolerance of independent variations in flow rates and cycle pressure ratios. Some practical end uses are: (1) an open-cycle engine whose heat source is fuel combustion or other chemical reaction, geothermal heat or concentrated sunlight. (2) A closed-cycle engine whose heat source is a nuclear reaction or concentrated sunlight in space, or whose heat source and sink are marine thermal layers as in an OTEC system. (3) An open-cycle heat pump and/or air conditioner for houses and other buildings, its open atmospheric cycle eliminating one of its two heat exchangers and broadening its range of useful climates. (4) An open-cycle refrigerator for residential or commercial use.

Where the present invention is constructed as a reversible heat engine and/or heat pump that can operate between ambient and cryogenic temperatures, high efficiency and/or performance coefficient and operational flexibility are retained. Some practical end uses are: (1) Liquefaction of natural gas and maintenance of LNG temperatures via refrigeration, including energy retrieval during re-gasification. (2) Liquefaction of all common industrial gases and maintenance of liquid temperatures via refrigeration, including energy retrieval during re-gasification. (3) Maintenance of cryogenic superconducting electrical elements environment via refrigeration. (4) Small or large-scale energy storage using liquefied air, in which energy is stored using an open-cycle cryogenic refrigerator, and is retrieved using that same refrigerator operating in reversed flow as an open-cycle cryogenic heat engine.

Where the present invention is configured as a high-efficiency single-stage or multi-stage reversible pump/motor, some practical end uses are: (1) single-shaft power input from electric motors or output to generators. (2) Hydraulic or pneumatic tractive powering of cars, trucks, trains, etc. with built-in regenerative braking capability, and with built-in multi-speed transmission capability if pump/motor is multi-staged with series-to-parallel valve switching. (3) Hydraulic or pneumatic power distribution within vehicles, equipment, factories or other power-intensive mechanical systems. (4) Hydroelectric turbines with built-in flow reversal capability for energy storage. (5) Gas compressors and liquid pumps for pipeline transmission, industrial processes, etc. (6) Fuel and oxidizer turbopumps for liquid-fueled rocket engines.

Some other miscellaneous end uses are: (1) High-efficiency distillation of seawater or contaminated water and extraction of water from sewage, by using a multi-staged compressor/turbine assembly first to reduce source liquid pressure until water content boils off at ambient temperatures, and second to use centrifugal means (and possibly fractional distillation) to separate water vapor from contaminants carried with it, and third to re-pressurize the pure vapor and liquid water. This system must of course include a heat exchanger to transfer the latent heat of vaporization from condensing water vapor to boiling source liquid. (2) Condensation of atmospheric water vapor for locations where other water sources are not practical or available, by using multi-staged intercooled compression (and subsequent expansion) of atmospheric air, or by using refrigeration. (3) Separation of atmospheric air to produce pure constituent gases. (4) Separation of atmospheric carbon dioxide at a viable sequestration site using multi-staged intercooled compression (and subsequent expansion) of atmospheric air, thereby eliminating the need to transport the gas from concentrated source (power plant) to sequestration site.

I claim:

1. A method of operating a turbomachine having a compressor and a turbine, comprising:
providing a compressor and a turbine having a common rotational axis and being linked together by shafts or similar driving means;

said compressor ingesting a fluid flow and directing the flow to enter a first spin-up impeller at radius A from said rotational axis;

the flow then exiting said first spin-up impeller at radius B from said rotational axis, where said radius B is greater than radius A;

the flow then entering a first bladeless annular volume at radius B and at angular velocity V1 and exiting said first volume at radius C from said rotational axis and at angular velocity V2, where said radius C is less than radius B and said angular velocity V2 is greater than V1 by action of angular momentum conservation;

said first bladeless annular volume being axially adjacent to said first spin-up impeller;

the flow then entering a first process impeller at radius C and exiting said first process impeller at radius D from said rotational axis, where said radius D is greater than radius C;

said first process impeller being axially adjacent to said first bladeless annular volume.

2. The method of operating a turbomachine of claim 1, further comprising:

the flow then entering a second bladeless annular volume at radius D from said rotational axis and at angular velocity V3 and exiting said second volume at radius E from said rotational axis and at angular velocity V4, where said radius E is greater than radius D and said angular velocity V4 is less than V3 by action of angular momentum conservation; said second volume being radially adjacent to said first process impeller.

3. The method of operating a turbomachine of claim 2, where V3 is substantially equal to V2.

4. The method of operating a turbomachine of claim 2, further comprising:

the flow then entering a first spin-down impeller at radius E from said rotational axis and exiting said first spin-down impeller at radius F from said rotational axis, where said radius F is less than radius E;

said first spin-down impeller being axially adjacent to said second bladeless annular volume.

5. The method of operating a turbomachine of claim 4, further comprising:

the flow then entering a third bladeless annular volume at radius F from said rotational axis and at angular velocity V5 and exiting said third volume at radius G from said rotational axis and at angular velocity V6, where said radius G is greater than radius F and said angular velocity V6 is less than V5 by action of angular momentum conservation.

6. The method of operating a turbomachine of claim 5, where V5 is substantially equal to V4.

7. The method of operating a turbomachine of claim 5, further comprising:

said third volume being axially adjacent to said first spin-down impeller;

the flow then exiting said compressor.

8. The method of operating a turbomachine of claim 5, where said turbine operates in the respective reverse order from said compressor with the fluid flow direction in said turbine being opposite that in said compressor.

9. The method of operating a turbomachine of claim 5, where said turbine is a mirror image of said compressor and operates in the respective reverse order from said compressor.

10. The method of operating a turbomachine of claim 9, wherein each impeller in said turbine is driven by or is driving its counterpart in the compressor.

11. The method of operating a turbomachine of claim 1, further comprising:

the flow being directed through one or more additional spin-up impellers after entering said compressor and prior to entering said first process impeller;

the flow being directed through a bladeless annular volume in a radially inward direction after exiting each spin-up impeller and prior to entering the next impeller.

12. The method of operating a turbomachine of claim 11, where said turbine is a mirror image of said compressor and operates in the respective reverse flow order from said compressor.

13. The method of operating a turbomachine of claim 2, further comprising:

the flow being directed through one or more additional process impellers after exiting said second bladeless annular volume and prior to entering said first spin-down impeller;

wherein the flow is directed through a bladeless annular volume in a radially outward direction after exiting each respective process impeller and prior to entering a next subsequent impeller.

14. The method of operating a turbomachine of claim 5, further comprising:

the flow being directed through at least one additional spin-down impellers after exiting said third bladeless annular volume and prior to exiting said compressor;

wherein the flow is directed through a bladeless annular volume in a radially outward direction after exiting each spin-down impeller and prior to entering a next impeller or prior to exiting said compressor.

15. The method of operating a turbomachine of claim 8, where the radial dimensions of said turbine are a direct linear function of their corresponding respective radial dimensions in said compressor.

16. The method of operating a turbomachine of claim 11, where one or more spin-up impellers are replaced by structural bridges that span axially across one or more bladeless annular volumes to connect two or more sections of a rotating structure.

17. The method of operating a turbomachine of claim 1, where the bearings that carry each impeller and each associated rotating structures are mounted to stationary structure.

18. The method of operating a turbomachine of claim 1, where bearings that carry each impeller and associated rotating structures are mounted to the next slower rotating structure;

wherein the bearings carrying the slowest impeller and associated rotating structure is mounted to a stationary structure.

19. The method of operating a turbomachine of claim 10, wherein the flow is directed through angular velocity regulators upon entering said compressor and wherein the flow is directed through angular velocity regulators upon entering said turbine.

20. The method of operating a turbomachine of claim 19, where the flow is directed through a bladeless annular volume after exiting said angular velocity regulator and prior to entering said first spin-up impeller.

21. The method of operating a turbomachine of claim 4, further comprising:

the flow exiting said first spin-down impeller is then directed through a bladeless annular volume in a radially inward direction;

wherein the flow then enters a second process impeller.

22. The method of operating a turbomachine of claim 21, further comprising:

the flow exiting said second process impeller is directed through another radial flow cycle of radially outward bladeless annular volume, then a spin-down impeller, then a radially inward bladeless annular volume to a third process impeller.

\* \* \* \* \*